United States Patent

Pagé et al.

[11] Patent Number: 5,812,768
[45] Date of Patent: Sep. 22, 1998

[54] SYSTEM FOR ALLOCATING ADAPTOR TO SERVER BY DETERMINING FROM EMBEDDED FOREIGN PROTOCOL COMMANDS IN CLIENT REQUEST IF THE ADAPTER SERVICE MATCHES THE FOREIGN PROTOCOL

[75] Inventors: Peter Pagé, Darmstadt; Ruediger Warns, Alsbach; Terence Graham Kennedy; Omid Ejtemai-Jandaghi, both of Darmstadt, all of Germany

[73] Assignee: Software AG, Eberstadt, Germany

[21] Appl. No.: 659,618

[22] Filed: Jun. 6, 1996

Related U.S. Application Data

[63] Continuation of Ser. No. 274,557, Jul. 12, 1994, abandoned, which is a continuation of Ser. No. 969,722, Oct. 30, 1992, Pat. No. 5,329,619.

[51] Int. Cl.$^6$ .................................................. G06F 13/00
[52] U.S. Cl. .................................... 395/200.09; 395/680
[58] Field of Search ................... 395/200.01, 200.02, 395/200.03, 200.05, 200.09, 200.1, 200.11, 200.16, 200.12, 601, 610, 615, 603, 621, 680, 682, 683, 500

[56] References Cited

U.S. PATENT DOCUMENTS

| | | | |
|---|---|---|---|
| 4,556,974 | 12/1985 | Kozlik ...................................... | 370/457 |
| 4,604,686 | 8/1986 | Reiter et al. ............................. | 395/500 |
| 4,649,535 | 3/1987 | Ulug ........................................ | 370/451 |
| 4,682,326 | 7/1987 | Ulug ........................................ | 370/257 |
| 4,689,786 | 8/1987 | Sidhu et al. ............................. | 370/255 |
| 4,725,834 | 2/1988 | Chang et al. ........................ | 340/825.5 |
| 4,745,598 | 5/1988 | Ulug ........................................ | 370/455 |
| 4,777,595 | 10/1988 | Strecker et al. .................... | 395/200.17 |
| 4,789,982 | 12/1988 | Coden ...................................... | 370/451 |
| 4,797,881 | 1/1989 | Ben-Artzi ................................ | 370/402 |
| 4,811,334 | 3/1989 | Matt ........................................ | 370/259 |
| 4,930,123 | 5/1990 | Shimizu ................................... | 370/389 |
| 4,975,914 | 12/1990 | Ashton et al. ....................... | 395/182.02 |
| 5,109,515 | 4/1992 | Laggis ..................................... | 395/610 |
| 5,136,716 | 8/1992 | George et al. ...................... | 395/200.06 |

(List continued on next page.)

FOREIGN PATENT DOCUMENTS

| | | |
|---|---|---|
| 0 600 235 A1 | 10/1993 | European Pat. Off. . |
| WO 91/5417 | 4/1991 | WIPO . |

OTHER PUBLICATIONS

Horizon Strategies Incorporated, "Presentation To The Object Management Group".
Object Management Group and X/Open, "The Common Object Request Broker: Architecture and Specification," pp. 13–44.
Software AG, "Entire Broker Reference Manual: Beta Test Version".
McMillan Publishing Company, "Local Networks", 1990, pp. 40–43, 379–380, 407–412, 421–422.
A Yellow–Pages Service for a Local–Area Network, Larry L. Peterson, pp. 235–242.
"Local Networks", by William Stallings, 1990, pp. 40–43, 379–380, 407–412, and 421–422.
"Yellow–Pages Service for a Local–Area Network", by Larry Peterson, 1988, pp. 235–242.

*Primary Examiner*—Moustafa M. Meky
*Attorney, Agent, or Firm*—Howrey & Simon; Jeffrey I. Auerbach; Joseph P. Lavelle

[57] ABSTRACT

An object interface is disclosed that supports three modes of inter-object communication—message processing (store and forward), conversational communication, and remote procedure call. A service broker manages service requests from, and responsive services provided by, a plurality of clients and servers, respectively, which may reside on different hardware platforms and operating systems and may be connected to computer networks having different network architectures and associated communications protocols. The broker manages the service offerings from servers and service requests from clients, and clients and servers communicate and exchange information with one another via the broker. The service broker includes different application programming interfaces for allowing participants to access the functionality of the service broker.

13 Claims, 32 Drawing Sheets

U.S. PATENT DOCUMENTS

| | | | |
|---|---|---|---|
| 5,218,697 | 6/1993 | Chung | 395/200.18 |
| 5,224,098 | 6/1993 | Bird et al. | 370/469 |
| 5,249,290 | 9/1993 | Heizer | 395/675 |
| 5,249,293 | 9/1993 | Schreiber et al. | 395/200.03 |
| 5,257,369 | 10/1993 | Skeen et al. | 395/680 |
| 5,265,250 | 11/1993 | Andrade et al. | 395/671 |
| 5,280,610 | 1/1994 | Travis et al. | 395/614 |
| 5,313,581 | 5/1994 | Giokas et al. | 395/800 |
| 5,329,619 | 7/1994 | Page et al. | 395/200.01 |
| 5,341,477 | 8/1994 | Pitkin et al. | 395/200.09 |
| 5,408,602 | 4/1995 | Giokas et al. | 395/329 |
| 5,497,463 | 3/1996 | Stein et al. | 395/200.03 |
| 5,524,253 | 6/1996 | Pham et al. | 395/800 |
| 5,546,584 | 8/1996 | Lundin et al. | 395/683 |
| 5,557,798 | 9/1996 | Skeen et al. | 395/235 |

SYSTEM FOR ALLOCATING ADAPTOR TO SERVER BY DETERMINING FROM EMBEDDED FOREIGN PROTOCOL COMMANDS IN CLIENT REQUEST IF THE ADAPTER SERVICE MATCHES THE FOREIGN PROTOCOL

This application is a continuation of application Ser. No. 08/274,557, filed on 12 Jul. 1994, now abandoned, which is a continuation of application Ser. No. 07/969,772, filed Oct. 30, 1992, now U.S. Pat. No. 5,329,619.

BACKGROUND OF THE INVENTION

The invention relates to computer networks, and specifically to a service broker for clients and servers operating in a heterogeneous computing environment.

It is increasingly common to interconnect multiple computing systems into a computer network, such as a local area network ("LAN") or wide area network ("WAN"). In a computer network, a number of computers are joined together to exchange information and share resources. A network is a distributed computing environment in which networked computers provide users with the capabilities of access to distributed resources, such as remote files and databases or printers and of distributed processing, in which an application may be processed on two or more computing systems. In such a distributed computing environment, a computing application's component functions may reside on different machines but work together. For example, each work station or personal computer ("PC") in the network often provides user interface processing and local analysis and processing, while larger, host computers may maintain a large set of files and coordinate access to large databases.

In the distributed computing environment, each application must be able to communicate and exchange information with other applications or machines in the environment. If all the machines are based on the same hardware platform, use the same operating system, and are interconnected using a single network architecture and communication protocol, connection and communication between applications and/or machines is straightforward. However, this ideal is seldom achieved. There are many different (and often mutually incompatible) computer network architectures (such as SNA, OSI, TCP/IP, DECnet, and LANs), hardware platforms (such as IBM, DEC, WANG, and Apple), operating systems (such as UNIX, OS/2, MS-DOS, VMS, and MVS), and application languages (such as COBOL, FORTRAN, PL1, C, and NATURAL). This heterogeneity presents an obstacle to the connectivity and interoperability of the systems.

FIG. 1 illustrates schematically such a heterogeneous distributed computing environment. The environment includes several "participant." Each participant may be a "client" or a "server." A participant is a "client" when it is requesting a service accessible somewhere within the computing environment. A participant is a "server" when it is providing a requested service to a client. For example, a client may be an application program, while a server may be a database, file, or program. The computing environment shown in FIG. 1 is shown for purposes of illustration as having two clients 4a and 4b and a server 6c joined together as a first LAN 5, and a two servers 6a and 6b joined together as a second LAN 7. However, each of the clients 4 and servers 6 may act as a client or a server, depending on whether it is requesting or supplying services.

The system of FIG. 1 is heterogeneous because each of the clients 4 and servers 6 may be applications running on different hardware platforms under different operating systems, and/or within different computer networks. For example, the computer for client 4a may be an IBM midrange computer running the OS/400 operating system, the computer for client 4b may be an IBM PC running MS-DOS or OS/2, while the computer for server 6a may be a UNIX-based work station, the computer for server 6b might be a DEC mainframe computer, and the computer for server 6c might be work station running IBM's OS/2. Other computing systems might also be connected, such as a work station running Microsoft Windows or an Apple Macintosh. LAN 5 might be based on IBM's System Network Architecture ("SNA") and IBM's Logical Unit 6.2 ("LU 6.2") communications protocol, while LAN 7 might be based on a different architecture, such as OSI and its associated communications protocol. The communications protocol is a defined set of procedural rules which computers use to communicate across a network.

The use of different hardware platforms, operating systems, or network architectures and their associated communications protocols inhibits the useful exchange of information between clients and servers in a heterogeneous environment, such as that shown in FIG. 1.

Effective operation of the heterogeneous computing environment of FIG. 1, with its different and incompatible hardware, software, and network architectures, requires some mechanism for matching service requests from clients with the appropriate service offerings from servers and for managing the communications between clients and servers.

Developers of software applications that would be used in client-server relationships face three problems: software portability (platform independence); network transparency; and reliable data delivery (store-and-forward operation). These problems have not yet been adequately addressed. Simply providing a common interface, such as the Transmission Control Protocol/Internet Protocol (TCP/IP), only addresses part of the problem. Rather, the correct functionality must be provided to client-server application developers to allow applications to be developed on a "logical" platform with transparent communication across networks and with reliable data delivery.

U.S. Pat. No. 5,109,515 to Laggis ("Laggis") discloses an apparatus for interconnecting DOS-based PCs, UNIX-based intermediate computers (acting as servers), and a mainframe computer. to provide the PCs services available on the servers and/or mainframe. Each PC is connected to a server via a patch. Patch 21 traps calls by PC applications to services on a server or mainframe. The trapped requests are directed to driver 31 on the associated server. Driver 31 collects the trapped requests from PCs and directs these to user level request server 32 on the server. Request server 32 performs file and resource serving and locking services to make requested resources available to the PC's operating system. Request server 32 calls on NETSVR process 33 to find resources on other servers and on APISVR to get the services on the mainframe. The request server 32 returns notes to patch 21, which forwards trapped user requests to PC's operating system to service the request. The PC's operating system views the server as a peripheral. Laggis is concerned only with file transfer between a PC (running PC-DOS) and a mainframe via a UNIX system.

U.S. Pat. No. 4,604,686 to Reiter, et al. ("Reiter") discloses an interface for inteconnecting user terminals 12 and diverse processors running different types of databases 14. The interface is a file-driven computer program for controlling access to the many databases by the user terminals. The interface is loaded with files having information relating to interfaces used with different processors, query languages, and data base managers, and information on the location of each kind of on formation and method of retrieval. A user at one of the user terminals makes a request for specific information to the interface. The interface in turn couples to each required data base (mimicking an asynchronous terminal), retrieving the data. Reiter provides remote access to heterogeneous computer systems in the form of asynchronous terminal emulation. Reiter controls data retrieval from these systems by a user-written command procedure, and presents the data in specific formats on the user terminal, again controlled by user-written command procedures. Reiter thus describes a very specific means to automate dial-up, logon, data access, and screen formatting procedures.

There is thus a need for a system that facilitates cooperative processing among application programs in a heterogeneous computing environment and that provides store-and-forward messaging, conversational program-to-program communication and remote procedure calls. Such a system should support communication between applications independent of operating system, hardware, network/communication protocol, and programming language.

SUMMARY OF THE INVENTION

The drawbacks of the prior art are overcome by the method and apparatus of the invention. An object interface is provided that supports three modes of inter-object communication—message processing (store and forward), conversational communication, and remote procedure call. A service broker manages service requests from, and responsive services provided by, a plurality of clients and servers, respectively, which may reside on different hardware platforms and operating systems and may be connected to computer networks having different network architectures and associated communications protocols. The broker manages the service offerings from servers and service requests from clients, and clients and servers communicate and exchange information with one another via the broker. The service broker includes different application programming interfaces for allowing participants to access the functionality of the service broker.

An adapter may also be provided as a gateway to convert a foreign communications protocol to the function server protocol to allow applications programs to access the service broker functionality even though they are not compatible with the application program interface and function server protocol of the invention. The broker also provides services such as directory and naming services, message queuing, and accounting. The directory service includes a list of all available service offerings, while the naming service maps the logical name of each server and client to real addresses to allow the broker to match client service requests with actual service offering by servers. The message queuing service allows for store and forward type asynchronous request processing in which the client need not wait for the server to respond before continuing processing.

DETAILED DESCRIPTION

TABLE OF CONTENTS

I. THE HETEROGENEOUS ENVIRONMENT
II. COMMUNICATION WITH THE SERVICE BROKER
    A. Client/Server Processing Types
    B. The FSP and the LAPI
    C. Parameter-String HAPI
    D. Structure HAPI
    E. Pre-Compilers and Integrated Functions
    F. Client/Server Implementations
    G. Network Data Conversion
III. THE SERVICE BROKER'S STRUCTURE
    A. Overall Data Structure and Broker Environment
    B. Participant and Communication Data Structures
    C. Timeout Handling
    D. Communication and Storage Handling
    E. Client/Server Attributes
IV. BROKER COMMUNICATION FUNCTIONS
    A. User Functions
    B. Administrator Functions
    C. Operator Functions
V. ATTENDANT BROKER FEATURES AND SERVICES
    A. Inherent Broker Features
    B. Internal Broker Services
    C. Implementation of Communication Types
    D. Adapters
VI. OTHER FEATURES
    A. Reliable Operation
    B. Multiple and External Brokers
    C. Service Dispatcher
    D. Session Manager Gateway
VII. EXAMPLES
    A. Registration
    B. Non-conversational or Connectionless Request
    C. Conversational Request
    D. Time Out
    E. Reliable Conversations

I. THE HETEROGENEOUS ENVIRONMENT

Figure 1:
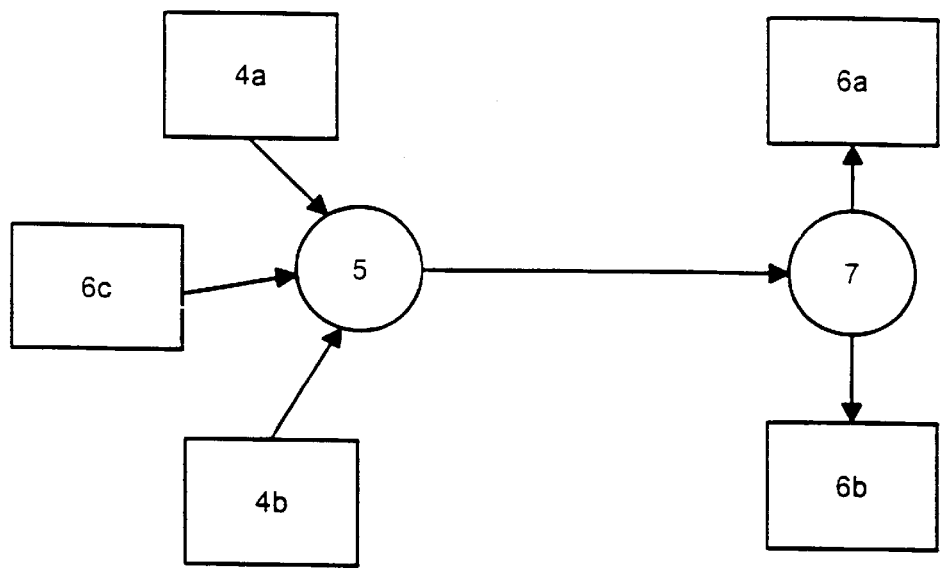
FIG. 1 is a schematic illustration of a heterogeneous environment.
Figure 2:
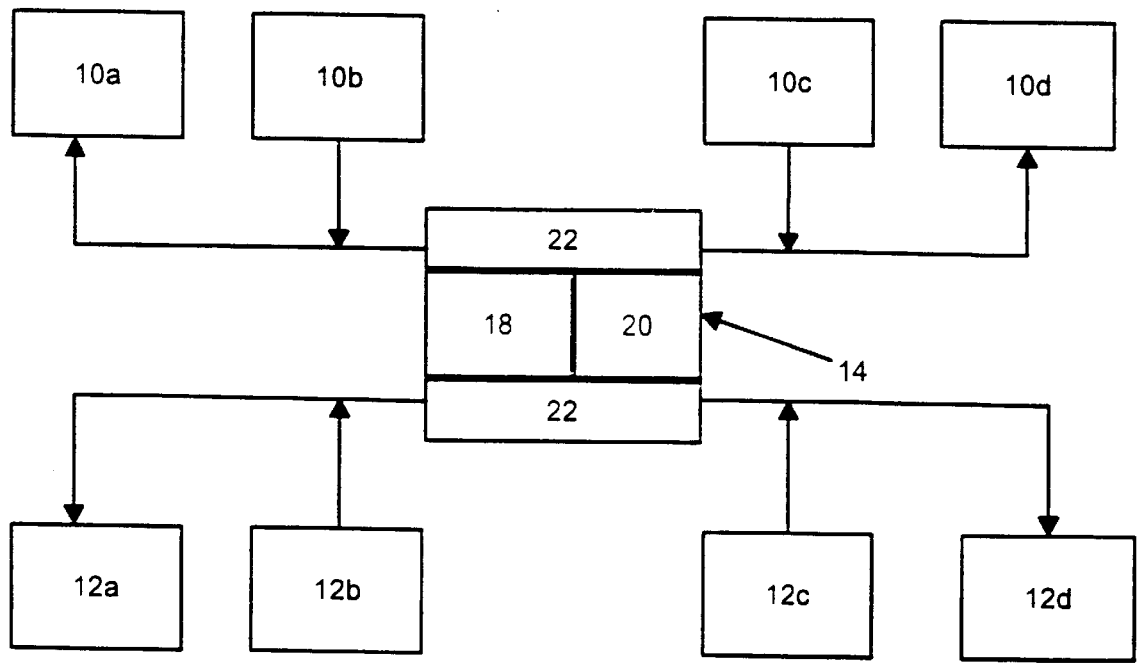
FIG. 2 is a schematic illustration of the service broker of the invention in a heterogeneous environment.

FIG. 2 illustrates a distributed computing system including clients 10a–10d, which are interconnected to servers 12a–12d via a communications network 22 and service broker 14. Each of the clients 10 and servers 12 may operate as a client or a server, depending on whether it is requesting or supplying services. In this example, clients 10a and 10b are nodes of a first LAN, while clients 10c and 10d are nodes of a second LAN. Similarly, servers 12a and 12b, and 12c and 12d are nodes of third and fourth LANs, respectively. Each of the four LANs are based on a different network architecture, utilizing a different communications protocol, while each of clients 10 and servers 12 run different operating systems.

Service broker 14 manages requests by any participant for services provided by some other participant. Service broker 14 provides transparent service links between the clients and servers and allows users to tie together the heterogeneous environment of FIG. 2.

Thus, to request a service function, a client issues a call to a subroutine. The subroutine then establishes the link to the local or remote server via the service broker. Client requests can be execute synchronously or asynchronously. In the synchronous request, the client process waits for processing of the service before it continues with its own processing. A typical example of synchronous request processing is a data base request. When a client sends a request to a data base server, its own process is stopped until the server delivers the data.

In contrast, asynchronous processing means that the client process is posted (resumed) again when the service request has been accepted by the service broker. This frees the client for further activity. For example, a print server receives an asynchronous request (i.e., a client initiates a print without waiting for it be completed). The immediate continuation of the client process makes it impossible to check whether the request has been executed.

Two options exist for checking the completion of client requests. First, a client can ask for a reliable transfer—a broker confirmation. The client can then rely on the fact that the service request will be processed as soon as possible. When the broker has accepted the request, the latter is stored in a queue within the broker environment. The broker will notify the client when the server has accepted the request. Alternatively, the client can demand a server confirmation. This means that the server must notify the client as to the result (that is, the completion status, error code, etc.) of its server request. It is also possible to force both the broker and the server to notify the client.

A client program can be a transaction under such environments as COMPLETE, CICS, IMS/DC, TSO, or CMS (IBM) or TIAM or UTM (Siemens). Alternatively, it can be a process under such environments as UNIX, DEC/VMS, OS/2, Window 3, or MS-DOS. Client programs can be implemented in many different languages, such as NATURAL, COBOL, C, C++, PL/1, or FORTRAN.

A server is a program routine representing one or more functions, and can be either connectionless or connection-oriented. A server can exist in any environment that is accessible via the communication network. A connectionless server is not able to establish a session. Its functionality is limited to the execution of a single client request. Connection-oriented servers, in contrast, are able to communicate with their clients to process multiple related requests. Multiple functions that are triggered or selected by a function specification can be integrated into the same server. It is also possible to specify that a request is to be executed synchronously or a synchronously.

Service dispatcher 18 establishes conversation sessions with the broker 16 and to activate the appropriate services. The service dispatcher 18 enables clients' requests by triggering the appropriate server(s).

Service broker 14 also provides a number of services 20, such as directory services, security services, and accounting services.

II. COMMUNICATION WITH THE SERVICE BROKER

A. Client/Server Processing Types

Figure 3A:
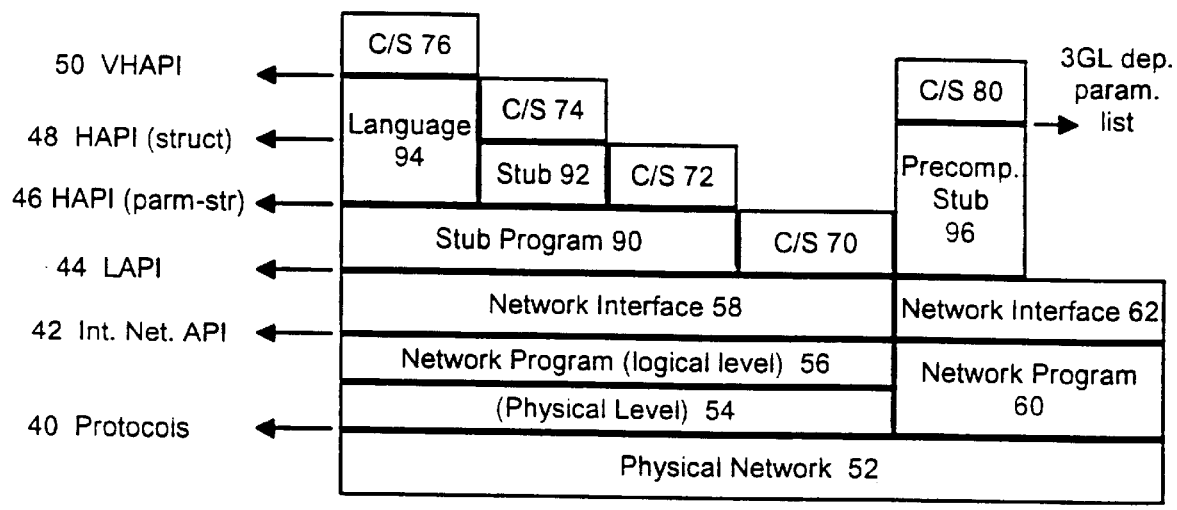
FIG. 3a is a schematic illustration of the communication layers by which a participant communicates with the service broker.
Figure 3B:
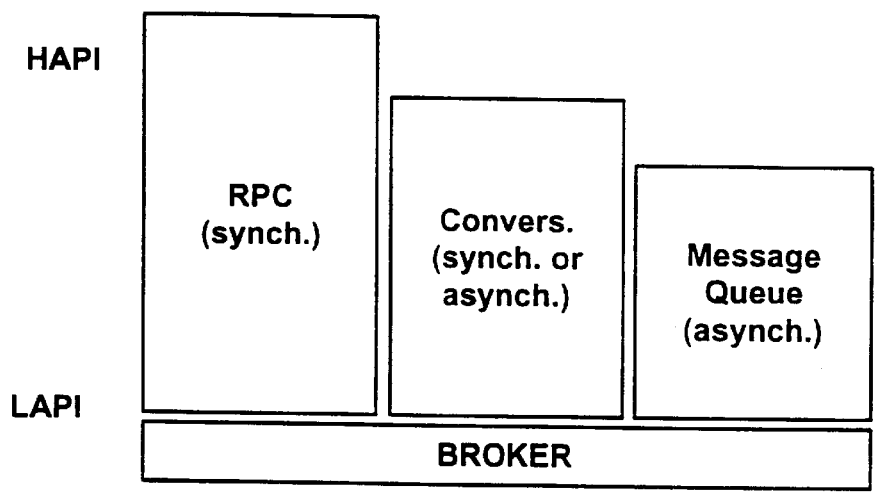
FIG. 3b is a block diagram illustrating the application programming interfaces.

Service requests handled by the broker can be divided into three types, as illustrated in FIG. 3B. These request types are remote procedure call ("RPC"), conversational, and message queue.

To the program logic of an application, an RPC is equivalent to a call to a local subroutine—the application executes a call statement, passes control and the appropriate parameters to the called procedure, and waits for control to be passed back from the called procedure. However, unlike a local procedure call, in an RPC the called procedure does not reside within the application (or in the computing machine on which the application is running), but instead is a service provided by a remote participant in the network.

Figure 5A:
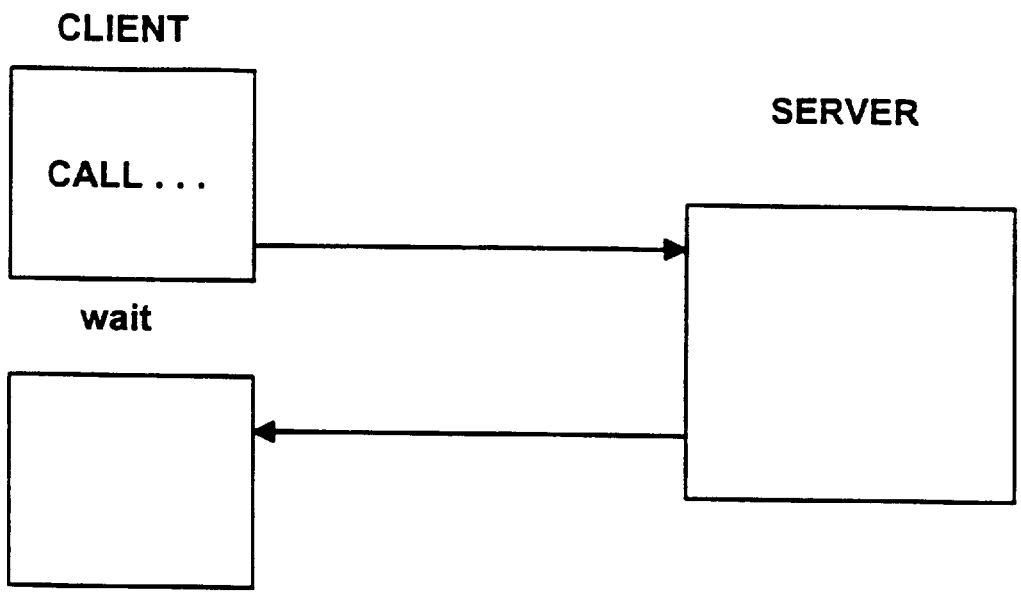
FIGS. 5A, 5B, and 6 are block diagrams illustrating various types of request processing.

As illustrated in FIG. 5A, the RPC is a synchronous request, in that the client waits for the server to execute the requested remote procedure and return control to the client before the client continues processing. Thus, RPCs do not establish a session with the called procedure—there is no connection or communication between the client and server, and the RPC environment is logically terminated when the request has been processed.

Figure 5B:
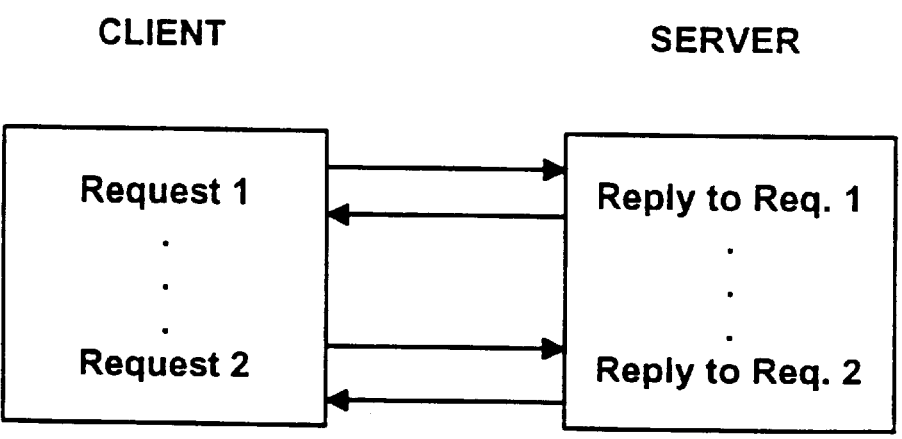

In contrast, in a conversational session, illustrated schematically in FIG. 5B, the server maintains the data and execution status context to perform sequences of client requests that are dependent on each other (for example, a data transfer server). A conversational server can perform different functions that are then selected and activated on the basis of the "function" designated in the request. Conversational server sessions must be terminated explicitly by the client program. The service broker monitors the status of conversational servers to time out services that are still active but no longer used.

Figure 6:
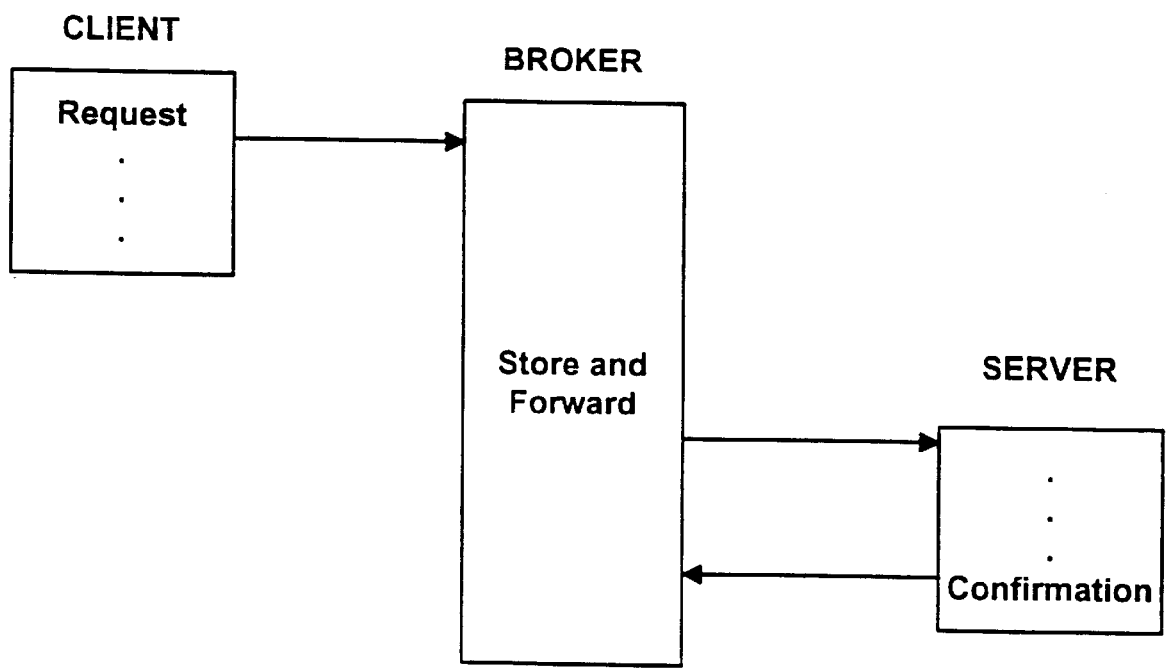

The third type of service request is message queue request, which utilizes the message queuing function of the service broker, as illustrated in FIG. 6. With this type of request, the server can run asynchronously, without being "connected" to the client and the client does not wait for the server to respond to the request before continuing processing. The message queue allows for "store and forward" client requests. The message queue is described below.

Any of the service requests described above can be communicated to the broker in a variety of ways, as discussed below.

B. The FSP and the LAPI

Each participant that requests a service from, or provides a service to, another participant must communicate with the service broker 14. This communication is provided by communication network 22. Communication between devices across a LAN or WAN takes place over a physical medium (wire or fiber-optic cable, satellite or microwave link, etc.), shown in FIG. 3A as physical network 52. The content of the communication is carried by signals that are arranged according to a physical communication protocol 40 (such as SNA (LU 6.2), TCP/IP, DECnet, and LANs). To provide communication between participants and the service broker 14 that is independent of the physical communications protocol 40, one or more higher communication layers are required.

Accordingly, the communications network 22 provides a communication layer between the participants (and broker) and the physical network 52. One example of a product that provides this communication layer is NET-WORK, available commercially from Software, A.G. As shown in FIG. 3A, in this product the communication layer is divided into a network program layer and a network interface program layer 58, with an internal network application program interface ("API") 42 by which the network program communicates with the network interface program 58. The network program layer is further divided into a physical level 54 and a logical level 56. Other products may implement the communication layer differently, as indicated schematically in FIG. 3A by network program 60 and network interface program 62.

The communication layer operates on a protocol referred to herein as the function server protocol ("FSP"), and presents a low-level application program interface ("LAPI") 44 to the participants and the broker. The communication layer thus provides a common service request format to the participants and then conveys the requests in the appropriate protocol format to the physical network.

The FSP is thus the common communication protocol to which the service broker and each participant must adhere at the LAPI 44. The FSP format may be any suitable format. For example, in the NET-WORK product of Software A.G., the FSP format is a set of control blocks.

The service broker works directly with the LAPI by accepting and transmitting information directly in FSP control blocks. A participant may also work directly in FSP control blocks, as indicated schematically in FIG. 3A as client/server 70. However, it is cumbersome for the developer of client/server 70 to adhere to the FSP format. It is more convenient for the developer to deal with a higher-level API ("HAPI") that can accept more flexible and more easily implemented command structures. Further, since each of the participants can be based on different hardware platforms and operating systems, and written in different application languages, the desired communications transparency would be lost if each participant were required to conform directly to the FSP via the LAPI. Accordingly, as shown in FIG. 3A, each participant can communicate via an HAPI. The HAPIs are described in the following sections.

C. Parameter-String HAPI

As illustrated schematically in FIG. 3A, to provide an HAPI with which participants can communicate, another layer must be introduced above the LAPI. This layer can be, for example, stub program 90. As will be evident to the artisan, the stub program 90 simply provides a conversion between the FSP control block format and a desired HAPI. In a preferred embodiment, the first HAPI is a parameter string HAPI. The stub program 90 thus converts between the FSP control blocks and a parameter string format, which conversion can be implemented in a variety of ways evident to the artisan.

A participant such as client server 72 may thus communicate with the broker via the parameter string HAPI, and the developer need only write the client/server application so as to be able to generate the parameter string format, described below.

1. Parameter-String Format

In the preferred embodiment, the parameter string HAPI consists of a command string followed by a terminating character, followed by any required buffer pointers. Thus, the parameter string HAPI can be expressed in the form:

<command string>·<(→send buffer)><(→receive buffer)> where the brackets (< >) enclose optional parameters. The <command string> is Keyword (or field) oriented, consisting of a sequence of Keyword=Value tokens, separated by commas, such as:

ƒ=send, uid=me, cid=new, sn=aserver, sc=aclass, sv=doit, sl=80

The Keywords can be in any order, and only those keywords that are necessary for the specified function and for which a default is not established need to be supplied. Multiple occurrences of keywords are treated as errors to avoid confusion. The Values need only be of the appropriate length to convey the information and may be null if this is meaningful for a particular keyword. Values many not exceed the published maximum length and must conform to the defined format for the keyword. The default action of the service broker is to return any keyword values by overwriting the command string from the beginning. This provides high transmission efficiency. Alternatively, if desired the service broker can overwrite in place.

2. Field Definitions

The Keywords (or fields) can be grouped into three categories. First are the broker fields, which are those that are of interest only for broker functions. These fields have reserved names and must be used in any direct communication with the broker. Second are client/server communication fields, which are used by the broker in the maintenance of client/server conversations. These fields also have reserved names and the client and server must use the same fields to describe the service request and the response. Third are the fields in which the broker has no explicit interest (because they are of significance only to the client and server)—these are "broker-transparent" fields.

The keywords or fields passed via the parameter string HAPI are identified in the following table and described below.

| Field Name (abbrev.) | Description | Input/Output | Cat. | Fmt |
|---|---|---|---|---|
| FUNCTION (F) | The function to be brokered. | I | 1 | A16 |
| SERVER-NAME (SN) | Logical name of the server | I | 1 | A32 |
| SERVER-CLASS (SC) | Used to differentiate between simultaneously active servers with the same logical name | I | 1 | A32 |
| BROKER-ID (BID) | Unique identifier which is used to send a request to a Broker other than the default/local Broker | I | 1 | A32 |
| SERVICE (SV) | Classifies the service to be performed by a server if this server offers multiple services | I | 2 | A32 |
| USER-ID (UID) | Identification of the user, required to perform security checks | I | 2 | A32 |
| PASSWORD (PW) | Required for user authentication | I | 1 | A32 |
| WAIT (W) | For synchronous or asynchronous request processing for the RECEIVE and SEND function | I | 1 | A8 |
| ERROR-CODE (EC) | Errors detected by the Broker are returned in this field | I | 1 | A8 |
| CONV-ID (CID) | A unique conversation identifier, assigned by the Broker, used to continue a dialog. | I/O | 2 | A16 |
| OPTION (OP) | A field with various values depending on the requested function. | I/O | 1 | A32 |
| TOKEN (TK) | Allows the user to re-establish connection with existing conversations. | I | 2 | A32 |
| SECURITY-TOKEN (STK) | Provides a means uf user authentication. | I | 2 | A32 |

-continued

| Field Name (abbrev.) | Description | Input/Output | Cat. | Fmt |
|---|---|---|---|---|
| SEND-LENGTH (SL) | Specifies the length in bytes of the data to be forwarded by the broker. | I/O | 2 | A8 |
| RE-CEIVE-LENGTH (RL) | Specifies the length of data that the caller wants to receive. | I | 2 | A8 |
| EN-VIRON-MENT (ENV) | A read-only field that contains information required for Broker translation services (for example, EBCDIC to ASCII) | O | 1 | A32 |

The Function field identifies which function is to be performed by the broker. These functions are described in detail below.

The Server Name field identifies the logical name of the participant that provides the requested service. One of the broker's functions is to translate the logical name into the "real" address of the server.

The Server Class field identifies the name of the server type. Several like servers may be active simultaneously with different logical names.

The Broker-ID field identifies the broker. It is used when a client requires access to a server registered with a remote broker without directory assistance. This also accommodates the simultaneous use of more than one broker on the same platform.

The Service field defines the service to be performed by the server.

The User-ID field identifies the user and is required, for example, if the broker is providing security services.

The Password field is used to prevent unauthorized access to a service as part of the Security Services.

With the Wait field, the caller can choose between synchronous and asynchronous processing by using this field. It also determines the length of time spent waiting for a response from the various functions—the "time-out" value. The broker obtains the Min, Default, and Max allowable wait values from the Attribute file (if available). The administrator can set these values on a global or individual basis. Defined values include:

| Value | Meaning |
|---|---|
| YES | The caller has requested synchronous processing. The broker will not return control until the request has been processed or a "time-out" has occurred. |
| NO | The caller has requested asynchronous processing. The broker will return control without waiting. |
| MAX | The caller has requested synchronous processing. The broker sets the "time-out" value to the maximum set by the administrator. |
| n | The caller has requested synchronous processing. The broker will check that "n" is within the Min and Max settings allowable and then set the "time-out" value to "n." |

Errors detected by the broker are returned in the Error_Code field.

For all conversations a unique conversation identification is assigned by the broker. Both client and server must use this Conv_ID to continue a dialogue. Requests/responses are taken from the queue on a FIFO basis. To initiate a dialogue, Conv_ID=NEW must be given by the client (SEND) and by the server (RECEIVE). To initiate a non-conversational or connectionless request, the client (SEND) must use Conv_ID=NONE.

Defined values for the Conv_ID field include:

| Value | Valid with Function | Meaning |
|---|---|---|
| NEW | SEND | Initiates a new conversation -- the broker will give a unique new ID in return. |
| | RECEIVE | Returns the request/response for a new conversation |
| OLD | RECEIVE | Broker will return the request/response only for an existing conversation. |
| ANY | RECEIVE | Broker will return the request/response on the queue for any conversation (old or new) on a FIFO basis. |
| | EOC | Action will be applied to all conversations. |
| NONE | SEND | The broker will not initiate a new conversation. The caller's request will be forwarded and a response returned if one becomes available and the caller is waiting. A maximum of 1 response is allowed using this value. |
| n | SEND, RECEIVE DELETE, UNDO, EOC | The broker will process the SEND or RECEIVE for the particular conversation identified by "n." The action will only be applied to this conversation. |

The Option field has various values depending on the requested function. Defined values for the Option field include:

| Value | Valid with Function | Meaning |
|---|---|---|
| IMMED | DEREGISTER, EOC | The action is immediate and no further processing will be allowed. New requests will be refused and all conversations will be terminated. |
| QUIESCE | DEREGISTER | The broker will not accept any more new requests to start conversations. Existing conversations are allowed to continue within an administrator-defined time-out period. When all the existing conversations have been ended the broker takes the caller of the active list and performs clean up and termination activities. |
| | EOC | The broker will not accept any more SEND processing. RECEIVE processing will be allowed to continue until no more items exist or a time-out occurs. The conversation(s) are then ended. |
| NEXT | RECEIVE | The next unprocessed response/request on the queue is returned to the caller. |
| LAST | RECEIVE | The request previously processed is re-read and returned to the caller. |
| EOC | SEND | See function EOC for description of the use of this option with SEND. |
| HOLD | SEND, UNDO | Accumulates or removes records in a HOLD queue. |

The user token in the Token field allows the user to re-establish connection with existing conversations. If the user has several applications running in parallel originating from the same physical location using the same UID and it is necessary to support a possible change of physical location (e.g. the client's terminal goes down) without losing existing conversations then this field should be provided by the user when the conversation is initiated. If a new request from the user comes from a different location but with the appropriate Token, then the broker will reconnect the user with the previous environment. This is subject to validation if security is in effect. This is not needed by applications that mask the location from the broker or in circumstances when the broker can uniquely identify the reconnection.

The Security Token field is only valid for certain types of security systems and is only then required if security is in effect. It provides a convenient means of user authentication and is returned to the user following successful password verification. This is valid for the current session between the broker and a client/server only—when a client/server has timed-out or Deregistered, a new security token must be obtained.

The Send_Length field is necessary for SEND processing—it specifies the length (in bytes) of the data to be forwarded by the broker. The supplied data must be at least as long as the supplied length, as the broker does not pad the data. With SEND implying RECEIVE and no receive-length has been specified, the broker will use the supplied send buffer and this field to return the reply.

The Receive Length field specifies the length of the data the caller wishes to RECEIVE. an explicit receive buffer of at least this length must be provided if the field is specified. The broker allows that both send and receive buffers may be located in the same place. If the returned data is longer than the value of this field, the data will be truncated to fit the supplied buffer and an appropriate Error Code returned. If the data is shorter than the value of the field, the supplied buffer will be filled up to this length.

The Environment field is an informative (read only) field giving details of the environment under which another client/server is active. Its primary use is by the broker in applying translation services.

D. Structure HAPI

Although the parameter string format is more accessible to an application developer than the FSP control block format, in many programming languages generating a parameter string with appropriate separators is more difficult than other command structures. In many languages a more convenient mechanism is the Self-Defining Parameter Area ("SDPA"). The SDPA thus forms another HAPI, illustrated in FIG. 3A as the "struct" HAPI 46. If client/server 74 uses one of these SDPAs, a simple stub program 92 is used to convert the SDPA to the parameter-string format. The implementation of stub program 92 will be evident to the artisan.

At least two types of SDPA are contemplated. The first SDPA is presented as a "C" structure in Table 1, below.

The defines and notes for the first SDPA are illustrated in Table 2, below.

TABLE 2

The following #DEFINES apply:

| #define | BYTE | unsigned char |
|---|---|---|
| #define | S_UID | 32 |
| #define | S_OPTION | 32 |
| #define | S_TOKEN | 32 |
| #define | S_STOKEN | 32 |
| #define | S_CONVID | 16 |
| #define | S_ETBID | 32 |
| #define | S_SERVICE | 32 |
| #define | S_SERVER | 32 |
| #define | S_CLASS | 32 |
| #define | S_ENV | 32 |
| #define | S_PASSWORD | 32 |
| #define | S_WAIT | 8 |
| #define | S_ERROR | 8 |

Note 1 -- Function Values

| #define | SEND | 1 |
|---|---|---|
| #define | RECEIVE | 2 |
| #define | DELETE | 3 |
| #define | UNDO | 4 |
| #define | EOC | 5 |
| #define | REGISTER | 6 |
| #define | DEREGISTER | 7 |

Note 2 -- Option Values

| #define | MSG | 1 |
|---|---|---|
| #define | HOLD | 2 |
| #define | IMMED | 3 |
| #define | QUIESCE | 4 |
| #define | EOC | 5 |
| #define | ALL | 6 |
| #define | LAST | 7 |
| #define | NEXT | 8 |

The second type of SDPA, again presented as a "C" structure in Table 3, below, differs from the first type in the use of references to values rather than to the values themselves.

TABLE 1

```
typedef struct_SDPA
      BEGIN
            BYTE      sdpatype;                    /* Type of SDPA                      */
            BYTE      version;                     /* for backwards compatibility       */
            BYTE      length;                      /* length of SDPA in bytes           */
            BYTE      reserve;                     /* Reserved                          */
            BYTE      func;                        /* Function -- see Note 1            */
            BYTE      option;                      /* Option -- see Note 2              */
            BYTE      env(|S_ENV|);                /* Environment                       */
            char      server (|S_SERVER|)          /* Server name                       */
            char      class (|S_CLASS|)            /* Server class                      */
            char      service (|S_SERVICE|)        /* Service name                      */
            char      etbid (|S_ETBID|)            /* Target Broker                     */
            char      uid (|S_UID|)                /* Logical UID                       */
            char      token (|S_TOKEN|)            /* Security Token                    */
            char      stoken (|S_TOKEN|)           /* User Token                        */
            char      password (|S_PASSWORD|)      /* Password                          */
            char      server (|S_WAIT|)            /* Wait                              */
            char      server (|S_ERROR|)           /* Broker Error Code                 */
            char      server (|S_CONVID|)          /* Conversation ID                   */
            unsigned long l_send|);                /* Send buffer length                */
            unsigned long l_rec;                   /* Receive buffer length             */
            BYTE      send-buffer (|l_send|);      /* opt send buffer                   */
            BYTE      rec-buffer (|l_rec|O;        /* opt receive buffer                */
>) SDPA;
```

TABLE 3

```
typedef struct_SDPA
    BEGIN
        BYTE    sdpatype;              /* Type of SDPA                */
        BYTE    version;               /* for backwards compatibility */
        BYTE    length;                /* length of SDPA in bytes     */
        BYTE    reserve;               /* Reserved                    */
        BYTE    func;                  /* Function -- see Note 1      */
        BYTE    option;                /* Option -- see Note 2        */
        BYTE    env ({S_ENV});         /* ->Environment               */
        char    *server ({S_SERVER});  /* ->Server name               */
        char    *class ({S_CLASS});    /* ->Server class              */
        char    *service ({S_SERVICE});/* ->Service name              */
        char    *etbid ({S_ETBID});    /* ->Target Broker             */
        char    *uid ({S_UID});        /* ->Logical UID               */
        char    *token ({S_TOKEN});    /* ->UserToken                 */
        char    *stoken ({S_STOKEN});  /* ->Security Token            */
        char    *password ({S_PASSWORD});/* ->Password                */
        char    *server ({S_WAIT});    /* ->Wait                      */
        char    *server ({S_ERROR});   /* ->Broker Error Code         */
        char    *server ({S_CONVID});  /* ->Conversation ID           */
        unsigned long l _send;         /* Send buffer length          */
        unsigned long l _rec;          /* Receive buffer length       */
        BYTE    *send-buffer ({l_send});/* ->opt send buffer          */
        BYTE    *rec-buffer ({l_rec}O;  /* ->opt receive buffer       */
>) SDPA;
```

E. Pre-Compilers and Integrated Functions

Conceptually, another HAPI takes the form of a single programming language command, with the appropriate parameters in a parameter list. This type of HAPI can be achieved in two different ways. The first is to build the broker commands into the language. For example, a "SEND" statement can be built into the language so that a programmer simply writes a SEND statement and the programming language issues an appropriate parameter string to the parameter string HAPI 46. The integrated command represents a very high level API ("VHAPI") 50. The language can be viewed as providing a stub 90 to generate the appropriate parameter string.

Alternatively, the broker command can be imbedded in an application and a pre-compiler used before the application is compiled to convert the command into a call to a specially-written subroutine, which converts the call command into the appropriate format for one of the HAPIs or the LAPI. The application program and the subroutine are then compiled, with the compiled subroutine forming a stub 96 for the application program 80, as illustrated schematically in FIG. 3A.

F. Client/Server Implementations

Each type of service request (RPC, conversational, and message queue) can be implemented via the LAPI or any of the HAPIs described above. Examples of implementations for client and server programs for each type of service request are given below.

1. RPC a. Client Programs

Figure 4:
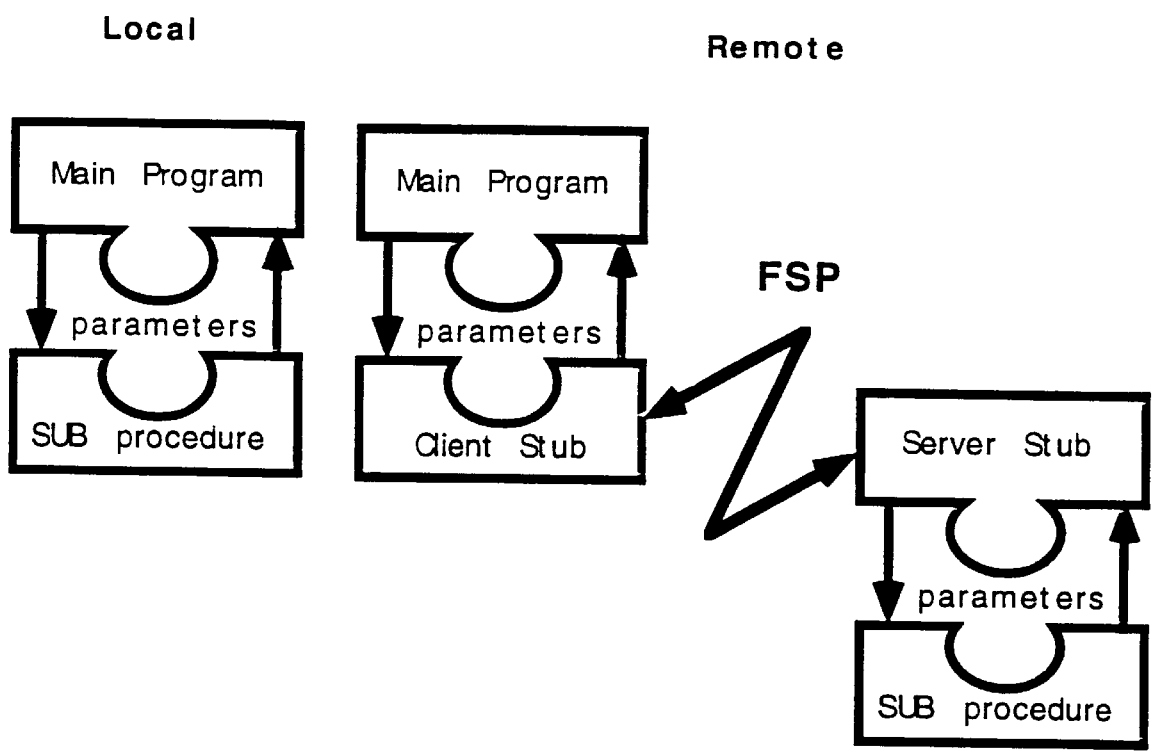
FIG. 4 is a schematic illustration of the use of stub programs in a remote procedure call.

An RPC can be implemented as a call to a subroutine. If an existing local subroutine implemented in a 3GL is to be processed as an RPC, the local subroutine must be replaced by a stub program with the same name. This stub program can be generated by a pre-compiler, as described above. However, as shown in FIG. 4, the stub procedure simply mimics the presence of the local procedure so that the client is unaware that the called procedure is not local. A symmetrical server stub is used with the server to provide the appropriate interface to the broker.

After the broker receives the request via the client stub, the called procedure in the remote environment is invoked by service dispatcher 18.

A pseudocode example for an RPC in a 3GL is given in Table 4, below.

TABLE 4

CALL "subroutine name" (parameters to be passed to the remote subroutine)

b. Server Program

An RPC server program can be written in a 3GL as a standard subroutine complying with the standards of the operational environment. This subroutine is dependent on the environment as long as it is implemented in a 3GL. Such servers must be described in the server directory if they are to be known by the broker. When a client request arrives, the broker activates the server in the appropriate environment via the dispatcher. As described above, the subroutine may have a server stub generated by a precompiler so that the server program can receive the remote parameters.

A pseudocode example for an RPC server written as a COBOL subprogram is given in Table 5, below.

TABLE 5

PROGRAM "A"

DATA DIVISION
WORKING-STORAGE SECTION

LINKAGE SECTION
01 parm-n1

PROCEDURE DIVISION

RETURN

In a programming language that enables the VHAPI, the invocation of a subprogram is identical in both local and remote operations. The language handles ail of the logic necessary to establish an RPC transparently. A pseudocode example of a 4GL (NATURAL) call statement is given below in Table 6 for a client and in Table 7 for a server.

TABLE 6

DEFINE DATA LOCAL
1 #NAME (A20)
1 #ADDRESS (A40)
END-DEFINE
.
.
CALLNAT "REMPROG" #NAME #ADDRESS
END

TABLE 7

DEFINE DATA PARAMETER
1 #NAME (A20)
1 #ADDRESS (A40)
.
DATA LOCAL
.
END-DEFINE
.
Processing Logic
.
END 2. Conversational and Messaging The implementation of conversation and messaging requests is handled symmetrically for clients and servers. A pseudocode example for a conversational server in a 3GL at the parameter string HAPI 46 or the structure HAPI 48 is given in Table 8, below.

TABLE 8

CALL "broker" parameter string or SDPA
(i.e., function, type of request end data to be passed)

Alternatively, the conversational or message queue request can simply be handled as a statement in a programming language that includes the desired function as a statement.

G. Network Data Conversion

Different network architectures and hardware platforms have different data representations and parameters. Communications network 22 may therefore perform data conversion from one network architecture/standard to another, such as by translating data between ASCII and EBCDIC formats and performing data compression/decompression and encryption/decryption.

III. THE SERVICE BROKER'S STRUCTURE

The core or kernel of the broker consists of an initialization routine, an internal dispatcher, a variable number of workers, and several managers. These parts of the kernel create and manage a set of data structures.

The Initialization routine establishes the broker environment. It first gets broker or default server attributes from an attribute file (if one exists). The routine then calculates the sizes of the various tables for the normal operating environment. The routine next obtains the necessary storage, then initiates and chains the various control blocks, queues, and tables, and sets a series of counters. The Initialization routine then sets up a virtual address entry (VAE) structure for the virtual storage manager. Next, the routine validates the various structures, then restores any reliable conversations from a reliable storage source. Finally, if all of the preceding steps are successful, the routine initiates the service dispatcher.

The Worker component(s) of the kernel are responsible for the processing of participant requests. A Worker consists of all the routines that deal with the various functions (described below), such as Register, Send, Receive, etc.

Upon startup, the internal dispatcher activates the required number of identical Workers (determined from the attribute file, if one exists, or a default number. The Dispatcher then activates the various managers (discussed below). If the managers are successfully activated, the Dispatcher activates any "internal" servers to provide attendant services, etc. Once this has been accomplished, the broker is ready to process requests.

Upon receiving a request, the Dispatcher selects a Worker that is waiting for work and passes the request to the Worker for processing. These requests are any of the available functions. The Dispatcher constantly monitors the status of all workers and the managers for changes in status and takes appropriate action when a status changes. The Dispatcher also takes the appropriate action if an Administrator/Operator command is actioned by a manager or an internal server.

The internal dispatcher is also responsible for the orderly shutdown of the system components upon receipt of the request from the Administrator/Operator. The dispatcher uses a Dispatcher Control Table (DCT) to coordinate its activities. A Worker Queue structure is used to pass requests to the worker components.

A. Overall Data Structure and Broker Environment

Figure 7A:
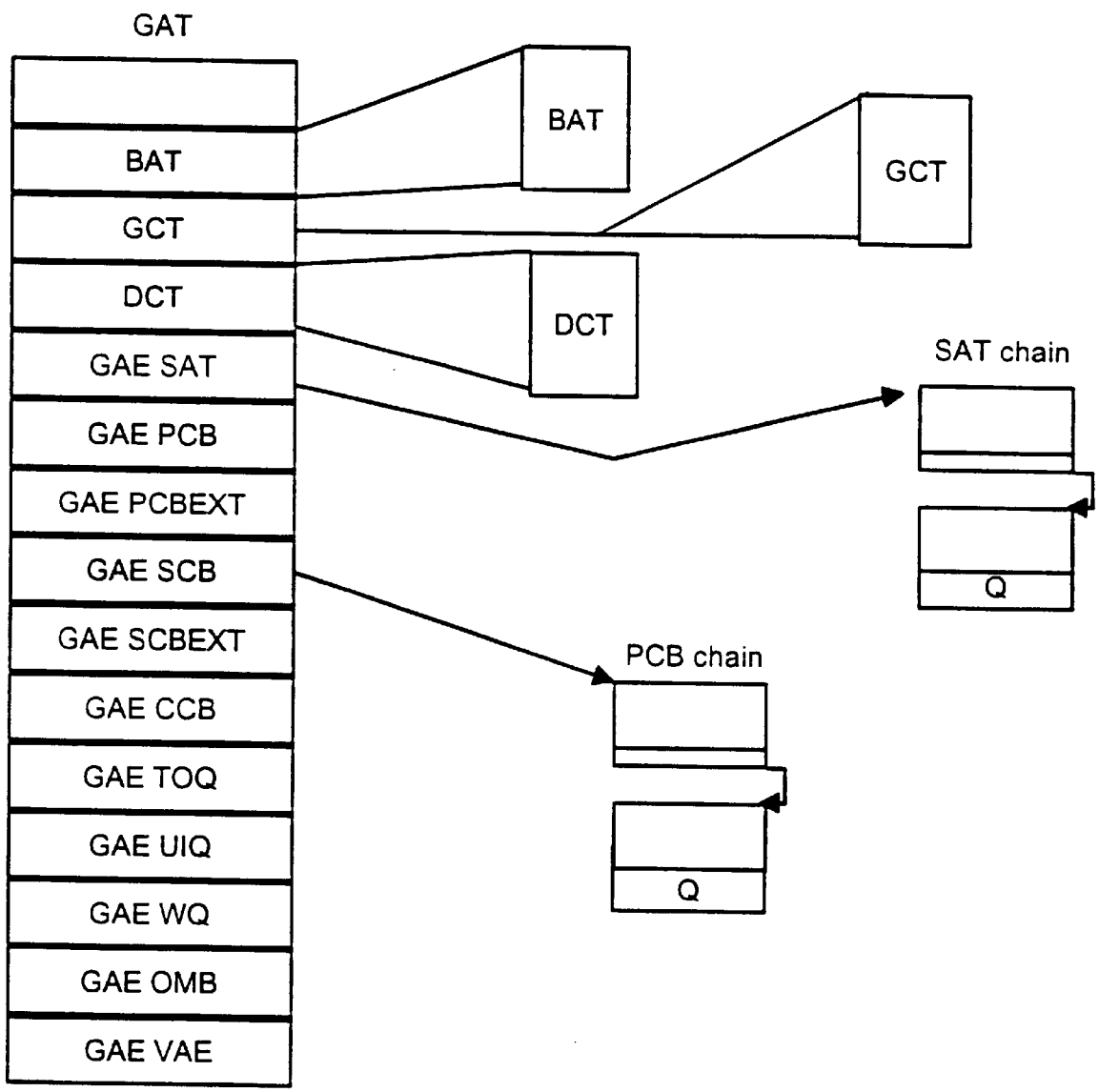
FIGS. 7A to 7G are block diagrams of the data structures used by the broker.
Figure 7B:
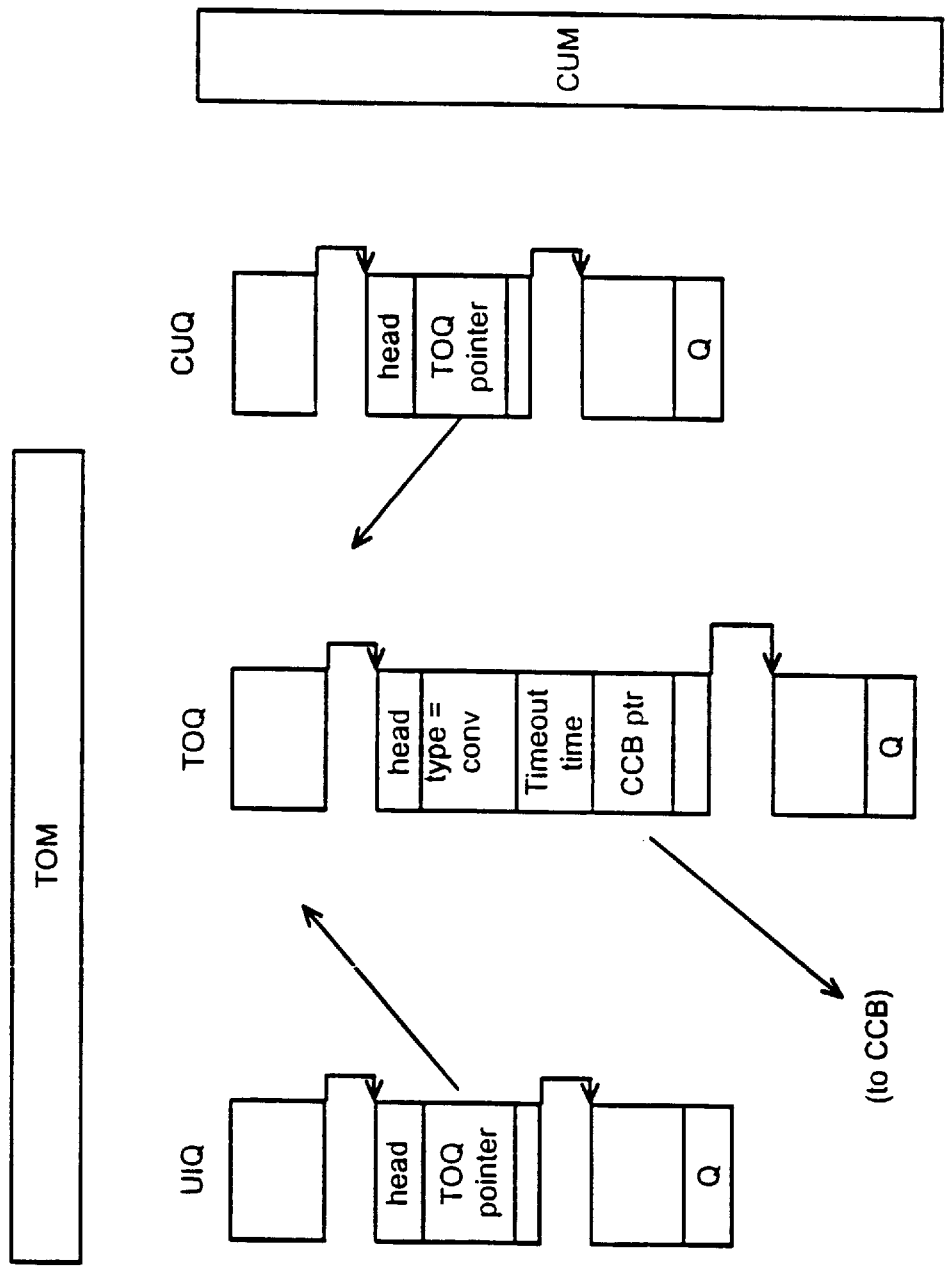

All of the data structures created and maintained by the broker and that define the broker environment are accessible via a single Global Address Table (GAT). The status of each of the other broker kernel components are held in the GAT. As illustrated in FIG. 7A, the GAT also includes the Broker Attribute Table (BAT), the Global Count Table (GCT), and the Dispatcher Control Table (DCT). In addition, the GAT includes a series of Global Address Entries (GAEs), one for each of the other broker structures.

The GAT is illustrated as a "C" structure in Table 9, below.

TABLE 9

```
typedef struct_GAT
    BEGIN
        struct_HEADER  header;                    /* standard header         */
        BYTE           vers(!S_VERS!);            /* Broker version          */
        BYTE           loadtime(S_LOADTIME!);     /* Broker load time        */
        LWORD          bstatus;                   /* Current broker status   */
        LWORD          cumstat;                   /* CUM status              */
        LWORD          tomstat;                   /* TOM status              */
        LWORD          comstat;                   /* COM status              */
        LWORD          wkrstat;                   /* WKR status              */
        BYTE           *store;                    /* Start of virtual store  */
```

TABLE 9-continued

|  |  |  |  |  |
|---|---|---|---|---|
| struct_BFPTR | efile; | /* | trace levels | */ |
| long | nerrmsg; | /* | elog file pointer | */ |
| struct_ERRMSGS | *errmsgs; | /* | number of error messages | */ |
| struct_KEY | *apikeys; | /* | pointer to allowed API keywords | */ |
| struct_KEY | *satkeys; | /* | pointer to allowed SAT keywords | */ |
| struct_KEY | *batkeys; | /* | pointer to allowed BAT keywords | */ |
| struct_BAT | bat; | /* | Broker attribute/defaults | */ |
| struct_GCT | gct; | /* | GCT - Global counts | */ |
| struct_DCT | dct; | /* | DCT - dispatcher control | */ |
| struct_GAE | sat; | /* | SAT entry | */ |
| struct_GAE | pcb; | /* | pcb entry | */ |
| struct_GAE | pcbext; | /* | pcbext entry | */ |
| struct_GAE | scb; | /* | scb entry | */ |
| struct_GAE | scbext; | /* | scbext entry | */ |
| struct_GAE | ccb; | /* | ccb entry | */ |
| struct_GAE | toq; | /* | toq entry | */ |
| struct_GAE | uiq; | /* | uiq entry | */ |
| struct_GAE | cuq; | /* | cuq entry | */ |
| struct_GAE | wq; | /* | wq entry | */ |
| struct_GAE | omb; | /* | omb entry | */ |
| struct_GAE | vae; | /* | vae entry | */ |
| LALIGN | lalign; | /* | Ensure GAT aligned | */ |
| END GAT; |  |  |  |  |

BROKER ATTRIBUTE TABLE

The fields in this table reflect the attributes that determine the internal environment (e.g., table sizes) in which the broker is currently operating. The BAT is illustrated in Table 10, below.

GLOBAL COUNT TABLE

The Global Count table (GCT) contains various counts used in broker operation. The GCT is illustrated in Table 11, below.

TABLE 10

|  |  |  |  |  |
|---|---|---|---|---|
| typedef struct_BAT |  |  |  |  |
| BEGIN |  |  |  |  |
| struct_HEADER | header: | /* | standard header | */ |
| char | bid(!S_ETBID!); | /* | This broker's ID | */ |
| BYTE | spec(!S_BATSPEC!); | /* | Specification flags | */ |
| long | maxvs; | /* | Maximum virtual storage allowance | */ |
| long | nwkrs; | /* | Number of workers | */ |
| long | alloc; | /* | Default allocation size | */ |
| long | split; | /* | Default split size | */ |
| long | totalp; | /* | Total participants | */ |
| long | normp; | /* | Normal number of participants | */ |
| long | totalsv; | /* | Total services | */ |
| long | normsv: | /* | Normal services | */ |
| long | totalcv; | /* | Total conversations | */ |
| long | normcv; | /* | Normal conversations | */ |
| long | avenm; | /* | Average number of conc msgs | */ |
| long | avemsgi; | /* | Average message length | */ |
| END BAT: |  |  |  |  |

TABLE 11

|  |  |  |  |  |
|---|---|---|---|---|
| typedef struct_GCT |  |  |  |  |
| BEGIN |  |  |  |  |
| struct_HEADER | header; | /* | standard header | */ |
| long | convid; | /* | current convid | */ |
| long | nfbytes; | /* | remaining virtual store | */ |
| long | nwkrs; | /* | number of workers | */ |
| long | ombseqn; | /* | omb sequence number | */ |
| long | nfomb; | /* | number of free ombs | */ |
| long | ntoq; | /* | number active in TOQ | */ |
| long | nuiq; | /* | number active in UIQ | */ |
| long | ncuq; | /* | number active in CUQ | */ |
| long | nftoq; | /* | number of free TOQs | */ |
| long | nfpcb; | /* | number of free PCBs | */ |
| long | nfsat; | /* | number of free SATs | */ |
| long | nfvae; | /* | number of free VAEs | */ |

TABLE 11-continued

|  |  |  |  |  |
|---|---|---|---|---|
| long | nfscb; | /* | number of free SCBs | */ |
| long | nfccb; | /* | number of free CCBs | */ |
| long | nfpcbex; | /* | number of free PCBEXTs | */ |
| long | nfscbex; | /* | number of free CCBEXTs | */ |
| END GCT; |  |  |  |  |

DISPATCHER CONTROL TABLE

The Dispatcher Control table (DCT) consists of various component status, communication, and flag words, together with a pointer to the WQ structure. This structure is used by the internal dispatcher to control the various components (TOM, CUM, COM, and workers) and to distribute the requests among the workers.

Figure 7C:
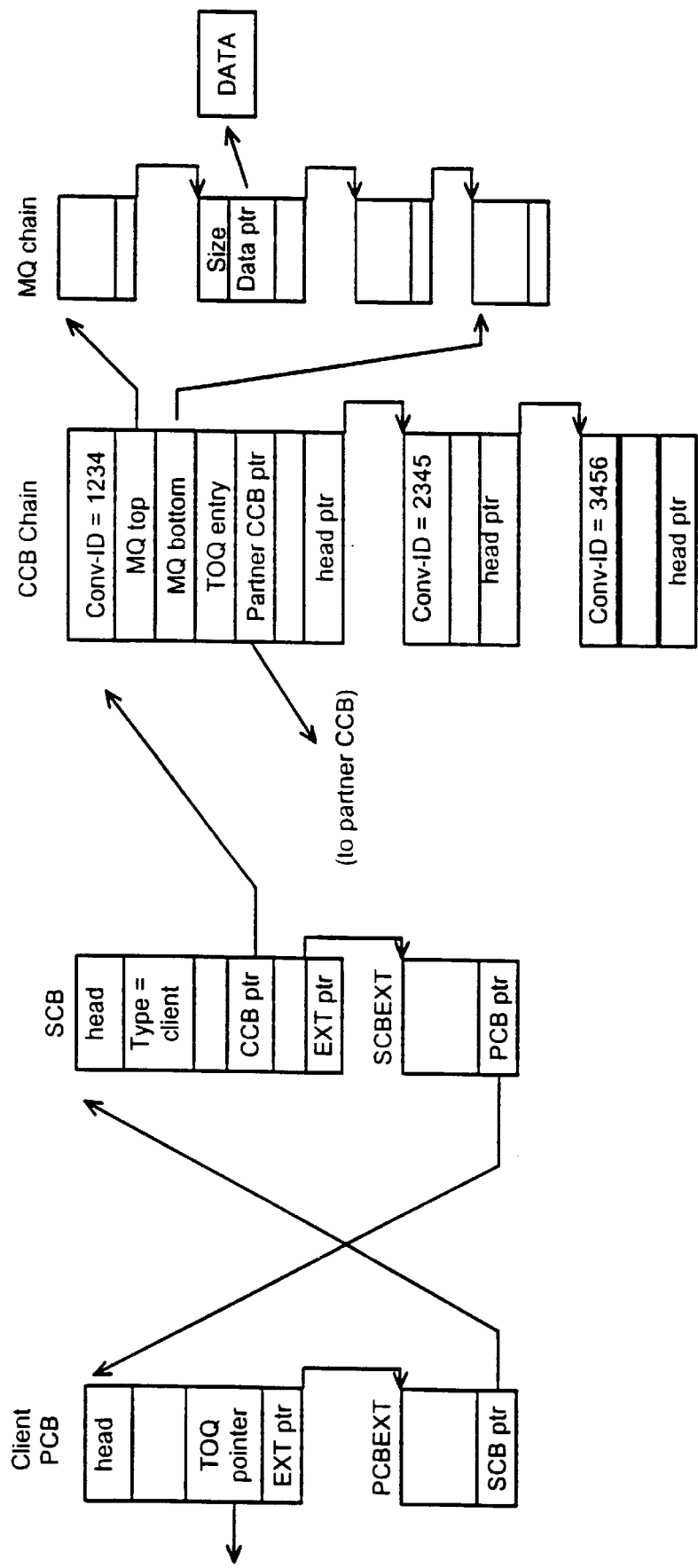
Figure 7D:
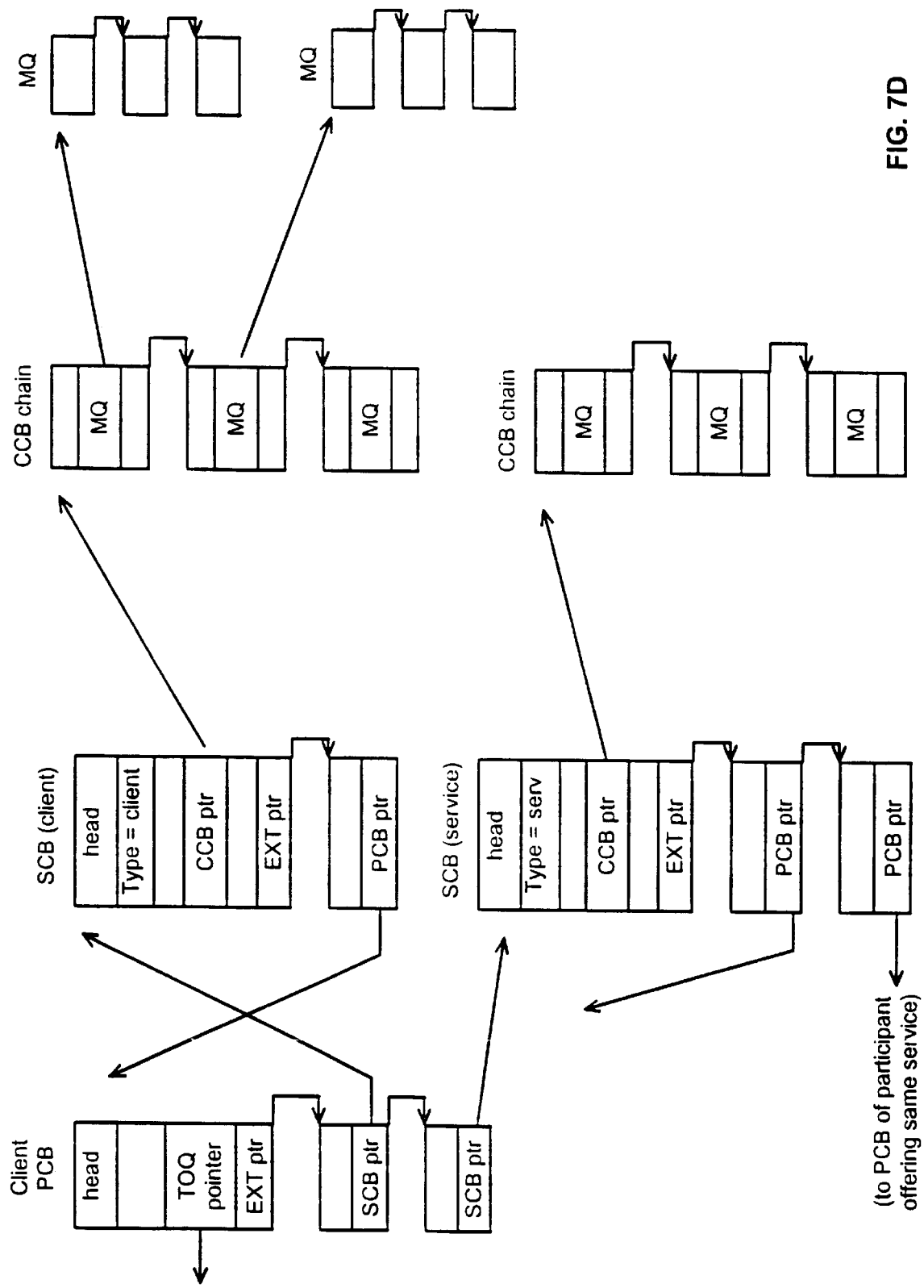
Figure 7E:
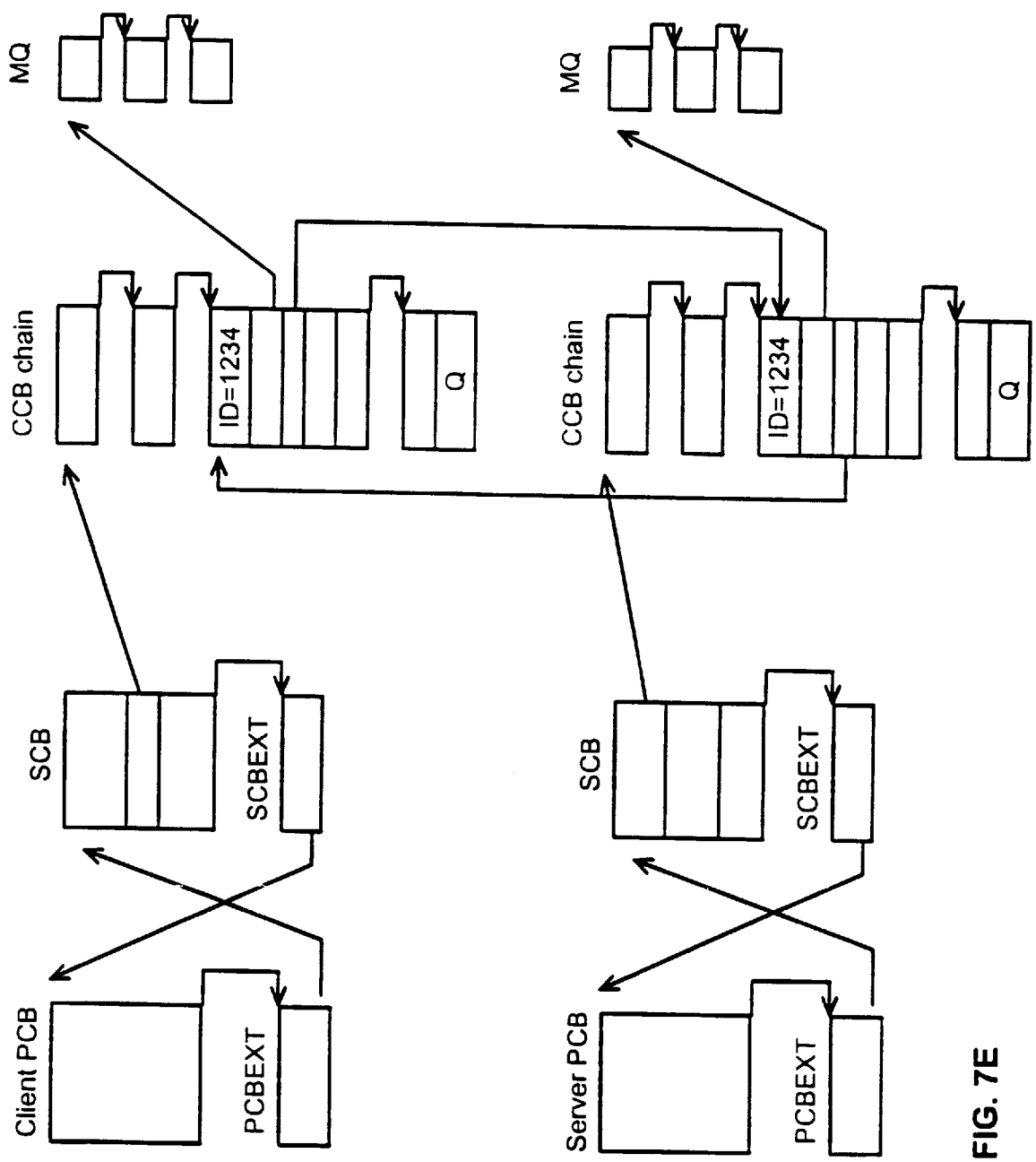
Figure 7F:
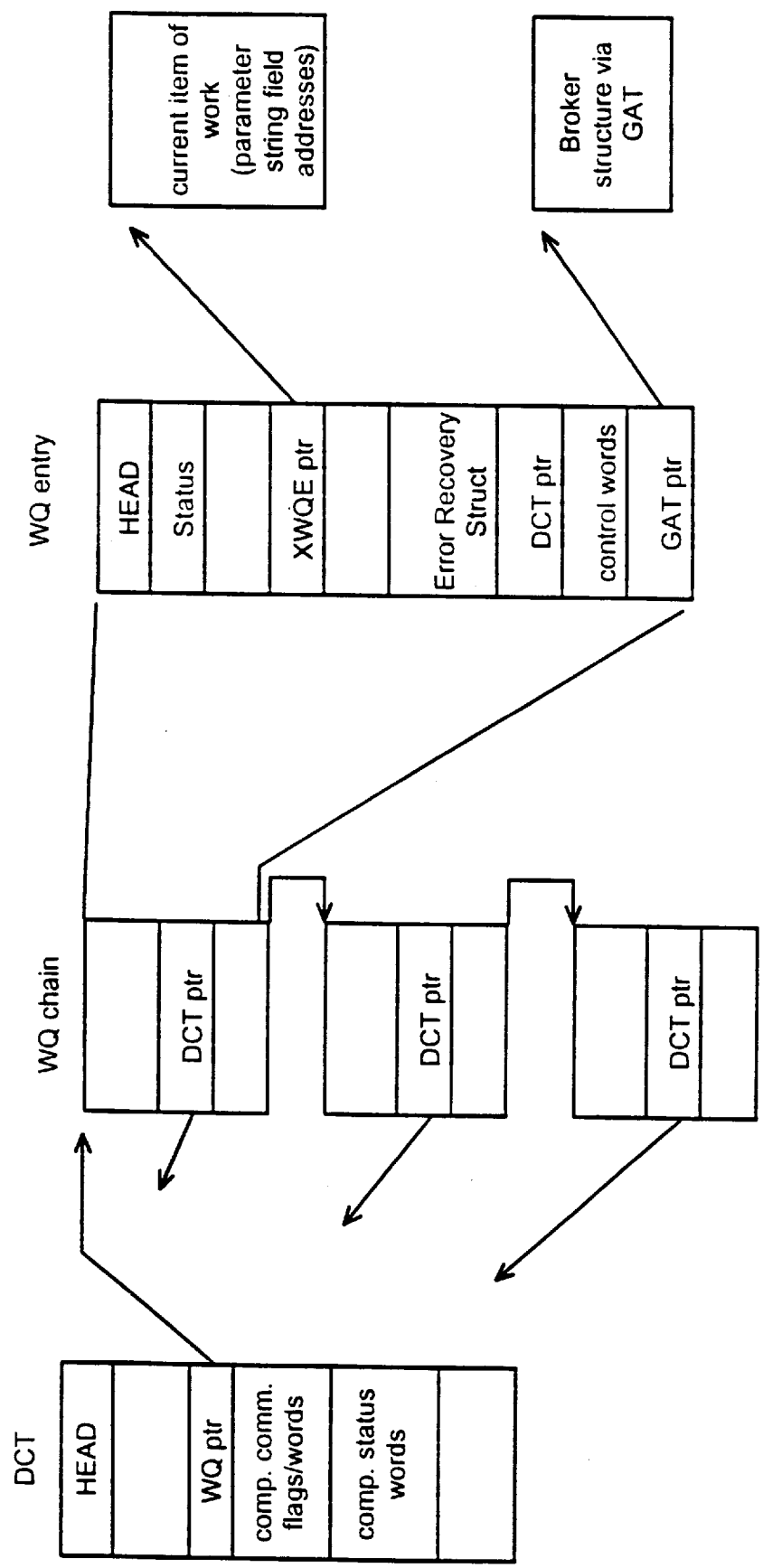

The structure of the DCT, and its relationship to the WQ (discussed below) is illustrated in FIG. 7F. The DCT is also illustrated as a "C" structure in Table 12, below.

TABLE 12

```
typedef struct_DCT
    BEGIN
        struct_HEADER  header;    /*  standard header                  */
        struct_WQ      *wqtop;    /*  pointer to top of broker WQ      */
        XWQH           *xwqh;     /*  pointer tc XCOM WQ header        */
        BYTE           free1;     /*  free byte for alignment          */
        BYTE           free2;     /*  free byte for alignment          */
        BOOLEAN        compost;   /*  com posted by wkrerr             */
        BOOLEAN        posted;    /*  dp posted by worker              */
        ECB            dpecb;     /*  dispatcher ecb (for wkrs)        */
        ECB            cumecb;    /*  CUM ECB                          */
        ECB            tomecb;    /*  TOM ECR                          */
        ECB            comecb;    /*  COM ECB                          */
        CUMERP         cumep;     /*  CUM error parameter structure    */
        TOMERP         tomep      /*  TOM error parameter structure    */
        COMERP         comep;     /*  COM error parameter structure    */
        LWORD          cumstat;   /*  CUM status                       */
        LWORD          tomstat:   /*  TOM status                       */
        LWORD          comstat;   /*  COM status                       */
        LWORD          wkrstat;   /*  WKR status                       */
    END DCT;
```

GLOBAL ADDRESS ENTRY

The standard structure used to address and control the various linked lists is the Global Address Entry (GAE). The GAE is illustrated in Table 13, below.

TABLE 13

```
typedef struct_GAE
    BEGIN
        struc_HEADER   *header;   /*  Standard header                  */
        BYTE           *top       /*  Pointer to top of chain/table    */
        int            max_ent;   /*  Maximum number of entries        */
        int            n_ent;     /*  Number of entries                */
        int            s_ent;     /*  Size in bytes of entry           */
        int            i_ent;     /*  Initial number of entries        */
        int            e_ent;     /*  Existing (???) number of entries */
        BOOLEAN        chained;   /*  chain or flat table              */
        struct_HEADER  *e_chain;  /*  Pointer to END_OF_CHAIN          */
    END GAE;
```

B. Participant and Communication Data Structures

At any given time, each participant may be offering (as a server) and/or requesting (as a client) one or more services simultaneously, and each service may be offered or requested by more than one client or server at once. Thus, there may be multiple services used or offered by each participant simultaneously, and there may be multiple communications taking place for each service. The service broker keeps track of this complex interaction of multiple participants, services, and conversations by maintaining the relevant information and parameters in several linked list data structures, including control blocks, tables, and queues.

As shown in FIG. 7C, a Participant Control Block (PCB) is created for each participant. For each service offered by the participant, a corresponding Service Control Block (SCB) is created, and for each conversation that involves that service, a corresponding conversation control block (CCB) is created. An additional SCB is also created for each participant operating as a client to control the services that the client will receive (as is the case in FIG. 7C, which shows a SCB for a client). Each CCB in turn includes pointers to a Message Queue (MQ), which includes pointers to data (such as a send or receive buffer).

Each control block includes several parameters or variables, which may be set or initialized by the broker to identify the participant, service, or conversation. Each group of control blocks (participant, service, and conversation) is arranged as a linked list. When a participant "registers" with the service broker (via the "REGISTER" function) the broker adds the participant and each of its service offerings (if any) to the linked list by allocating PCB and SCB(s), if such blocks have not already been allocated for that participant and those services.

Each PCB includes values for parameters including a flag for locking, an entry status, a user's logical ID and user token, a pseudo physical ID, the type of the participant, a pointer to the Timeout Queue (discussed below), a pointer to a waiting server, and a pointer to a corresponding PCB extension. For purposes of illustration, a PCB as defined by a "struct" statement in the "C" language is shown in Table 14, below, along with the PCBEXT.

TABLE 14

```
typedef struct_PCB
BEGIN
    struct_PCB    *lckowner;  /* PCB address of owner      */
    struct_PCB    *head;      /* Pointer to chain head     */
    struct_PCB    *prev;      /* Pointer to previous entry */
    struct_PCB    *next;      /* Pointer to next entry     */
    WORD          lock;       /* Lockflag                  */
    WORD          status;     /* Entry status              */
    char          uid(!32!);  /* Logical UID               */
    char          token(!32!);/* User token                */
    BYTE          puid(!32!); /* Pseudo physical ID        */
    char          convid(!16!);/* Waiting conversation     */
    struc_SCB     *wos;       /* Pointer to waiting server */
    struct_TOQ    *toq;       /* Pointer to timeout entry  */
    struct_PCBEXT *ext;       /* Pointer to extension      */
    BYTE          type;       /* Participant type          */
    BYTE          convstat;   /* Wait status               */
    WORD          free;       /* Free                      */
END PCB;
typedef struct_PCBEXT
BEGIN
    struct_PCB    *lckowner;  /* PCB address of owner      /*
    struct_PCBEXT *head;      /* Pointer to chain head     /*
    struct_PCBEXT *prev;      /* Pointer to previous entry /*
    struct_PCBEXT *next;      /* Pointer to next entry     /*
    WORD          lock;       /* Lockflag                  /*
    WORD          status;     /* Entry status              /*
    struct_SCB    *scb:       /* Pointer to SCB            /*
END PCBEXT
```

Each PCB also includes pointers to the first PCB in the list, and pointers to the next and previous entries. Each PCBEXT includes a pointer to an SCB. The purpose of a PCBEXT is to link the participant with a service (if any) that the participant is currently offering.

A standard header is used to provide a common chaining mechanism. This allows a common search mechanism and a common lock mechanism. It

TABLE 15

```
typedef struct_HEADER
BEGIN
    void    *owner;   /* PCB address of owner      */
    void    *head;    /* Pointer to chain head     */
    void    *prev;    /* Pointer to previous entry */
    void    *next;    /* Pointer to next entry     */
    WORD    lock;     /* Lockflag                  */
    WORD    status;   /* Entry status              */
END HEADER;
``` also aids in diagnosis in the event of a broker failure. The standard header is shown as a "struct" statement in the "C" language in Table 15, below Each SCB similarly includes a number of fields for each service provided by the participant identified in the corresponding PCB. For purposes of illustration, an SCB as defined by a "struct" statement in the "C" language is shown in Table 16, below. These fields include lockflag, entry status, service name, server name, server class, pointer to the CCBs, pointer to attribute entry,

TABLE 16

```
typedef struct_SCB
BEGIN
    struct_PCB     *lckowner;  /* PCB address of owner         */
    sttuct_SCB     *head;      /* Pointer to chain head        */
    struct_SCB     *prev;      /* Pointer to prevous entry     */
    struct_SCB     *next;      /* Pointer to next entry        */
    WORD           lock;       /* Lockflag                     */
    WORD           status;     /* Entry status                 */
    char           service(!32!);/* Service name               */
    char           server(!32!); /* Server name                */
    BYTE           class(!32!); /* Server class                */
    struct_CCB     *ccb;       /* Pointer to CCB               */
    struct_SAE     *sae;       /* Pointer to attribute entry   */
    struct_SCBEXT  *ext;       /* Pointer to extension         */
    int            nccb;       /* Number of conversations      */
    int            naccb;      /* Number of active conversations */
    int            ne;         /* Number of extensions         */
    int            nae;        /* Number of active extensions  */
    BYTE           conf;       /* Conferencing flag            */
    BYTE           free;       /* Free                         */
    WORD           free2;      /* Free                         */
END SCB;
typedef struct_SCBEXT
BEGIN
```

TABLE 16-continued

```
        struct_PCB    *lckowner;   /*  PCB address of owner       /*
        Struct_SCBEXT *head;       /*  Pointer to chain head      /*
        struct_SCBEXT *prev;       /*  Pointer to previous entry  /*
        struct_SCBEXT *next;       /*  Pointer to next entry      /*
        WORD          lock;        /*  Lockflag                   /*
        WORD          status;      /*  Entry status               /*
        struct_PCB    *pcb;        /*  Pointer to PCB             /*
        int           noccb;       /*  Number of owned CCBs       */
        WORD          free;        /*  Free                       */
END SCBEXT
``` pointer to SCB extension, number of conversations, number of active conversations, number of extensions, and a conferencing flag. The SCB extension includes the fields lockflag, entry status, pointer to PCB, and number of owned CCBs. The purpose of the SCBEXT is to provide the necessary backward links between services available and the servers who are providing them. The SCBEXT mechanism allows the broker to "dispatch" the incoming requests for a particular service to a suitable previously registered server.

Each CCB includes fields for each conversation between a participant (acting as a server) and another participant (acting as a client) involving the corresponding service provided by the server (and identified by the SCB). For purposes of illustration, a CCB as defined by a "struct" statement in the "C" language is shown in Table 17, below. The fields may include a lockflag, entry

TABLE 17

```
typedef struct_CCB
    BEGIN
        struct_PCB    *lckowner;   /* PCB address of owner           */
        struct_CCB    *head;       /* Pointer to chain head          */
        struct_CCB    *prev;       /* Pointer to previous entry      */
        struct_CCB    *next;       /* Pointer to next entry          */
        WORD    lock;              /* Lockflag           */
        WORD    status;            /* Entry status       */
        char    convid(!16!);      /* Conversation ID    */
        struct_SCB    *scb;        /* Pointer to SCB                 */
        struct_CCB    *partner;    /* Pointer to partner conversation */
        struct_PCB    *owner;      /* Pointer to conversation owner  */
        struct_TOQ    *toq;        /* Pointer to timeout entry       */
        struct_MQ     *mqtop;      /* Pointer to message queue head  */
        struct_MQ     *mqbot;      /* Pointer to previous message    */
        int max_m;                 /* Maximum of messages            */
        int nnhm;                  /* Number of none hold messages   */
        int nhm;                   /* Number to hold messages        */
        BYTE    convstat;          /* New conversation?              */
        BYTE    eoc:                /* End of conversation?          */
END CCB;
``` status, conversation ID, pointer to SCB, pointer to CCB partner, pointer to the associated PCB, pointer to timeout entry, pointer to message queue, maximum number of messages, number of none hold messages, number of hold messages, conversation status and EOC. The conversation ID identifies the conversation for this CCB, the SCB pointer points to the SCB for this conversation, the PCB pointer points to the PCB for this conversation. The pointer to the CCB partner identifies the CCB on the other side of the broker. This partner CCB is used to identify the conversation as seen by the other participant.

A message queue (MQ) is created for each of the CCBs. The message queues are preferably arranged as a linked list, like the control blocks. Therefore, in each message queue, there are pointers to the first, next, and previous message queues of the linked list. The message queue also includes the fields lockflag, entry status, a pointer to data and the length of the data, and an option (hold/read/msg).

For purposes of illustration, the Message queue as defined by a "struct" statement in the "C" language is shown in Table 18, below.

TABLE 18

```
typedef struct_MQ
    BEGIN
        struct_PCB    *lckowner;   /* PCB address of owner       */
        struct_MQ     *head;       /* Pointer to chain heed      */
        struct_MQ     *prev;       /* Pointer to previous entry  */
        struct_MQ     *next;       /* Pointer to next entry      */
        WORD          lock;        /* Lockflag                   */
        WORD          status;      /* Entry status               */
        void          data;        /* Pointer to data            */
```

TABLE 18-continued

```
        long     l_data;     /* Length of data       */
        BYTE     option;     /* HOLD/READ/MSG        */
        BYTE     free;       /* Free                 */
        WORD     free2;      /* Free                 */
END MQ;
```

The Message queue is used by the broker to store requests and responses for services for each participant (or CCB). A participant can access the Message queue for one of its conversations with the service broker using the function "RECEIVE." The status of the Message queue (e.g., how many entries are still to be read) can be found by using the broker attendant services, described below.

The interrelationship of the structures described above is further illustrated in FIGS. 7D and 7E. The participant in FIG. 7d is registered as a client (with a client SCB) and a server (with a service SCB). The service that this participant offers is also offered by another participant. Thus, the service SCB has two SCBEXTs, one with a pointer to the illustrated participant, and one with a pointer to the other participant offering the service.

FIG. 7E illustrates the interrelationship between two participants that are communicating with each other. The client has a client SCB with a pointer to the CCB chain that includes a CCB for a conversation with the server. The server has an SCB for the service that the client has requested, and that SCB has a pointer to a CCB chain that includes a CCB for the same conversation. Each participant's CCB for the conversation has a pointer to the CCB of the other participant for that conversation.

SERVER ATTRIBUTE TABLE

Each entry in the Server Attribute Table (SAT) defines the attributes that apply to a particular service identified by the SID structure (name, class, and service) within the SAT entry. In addition to the various attributes that have been determined when the service was registered (from the Attribute file, if one exists, or from defaults), the SAT contains pointers to the SCB currently used to offer the service.

The SAT is illustrated in Table 19, below.

C. Timeout Handling

The broker kernel includes as an autonomous part a Time-out Manager (TOM), which is responsible for detecting and actioning the various time-outs that can occur (i.e., conversation time-outs and participant time-outs). This is done by the use of a Timeout Queue (TOQ), which is maintained in a time-ordered sequence. Time-outs that have been temporarily inhibited while a request is being processed and are subsequently uninhibited and placed on an Uninhibit Queue (UIQ) are reinstated in the correct time sequence by the TOM. Time-outs that have occurred are placed on a Cleanup Queue (CUQ) for further processing by the Cleanup Manager (CUM) after the appropriate flags have been set in the broker structure so that future requests are aware that a timeout has occurred.

The CUM is another autonomous component of the broker kernel. The CUM takes entries for the CUQ (that have been placed in that queue following a timeout by the TOM) and recover for reuse the parts of the broker structure no longer being used. The CUM also replies to any waiting participants that a timeout has occurred. This occurs when the CUM is attempting to recover the structure and a waiting participant is found. CUM also ensures that the internal structures of the broker are dynamically adjusted, acquiring and releasing storage as appropriate.

The TOQ, CUQ, and UIQ are arranged as linked lists, as illustrated in the following tables. The number of entries in any queue is determined by user requirements—the broker adjusts the queue size dynamically.

TABLE 19

```
typedef struct_SAT
BEGIN
    struct_HEADER   header;                 /* standard header               */
    struct_SCB      *scb;                   /* Pointer to SCB                */
    struct_SID      sid;                    /* name, class, service          */
    BYTE            spec(!S_SATSPEC!);      /* Specification flags           */
    char            desc(S_DESC!);          /* Description                   */
    BOOLEAN         astart;                 /* Autostart flag                */
    char            aparms (!S_APARMS!);    /* Autostart parameters          */
    time_t          startt;                 /* Server start time             */
    time_t          endt;                   /* Server end time               */
    long            defto;                  /* Default timeout               */
    long            minto;                  /* Minimum timeout               */
    long            maxto;                  /* Maximum timeout               */
    long            eocto;                  /* Conversation timeout          */
    long            maxmsgl;                /* Max message length            */
    long            maxnm;                  /* Max number of messages        */
    long            maxnccb;                /* max number of ccbs            */
    PFTRANS         trans;                  /* pointer to translation routine*/
    PFMQACC         mqacc;                  /* pointer to Q access routine   */
    PFTERM          term;                   /* Pointer to terminate routine  */
    PFSECUR         secur;                  /* Pointer to security routine   */
    PFLOG           log;                    /* Pointer to logging routine    */
    PFTRACE         trace;                  /* Pointer to trace routine      */
    PFACCNT         accnt;                  /* Pointer to accosting routine  */
END SAT;
```

The SID referred to in the SAT is illustrated in Table 20, below.

TABLE 20

```
typedef struct_SID
BEGIN
    char    server(!S_SERVER!);     /* Server name   */
    char    class(!S_CLASS!);       /* Server class  */
    char    service (!S_SERVICE!);  /* Service name  */
ENDSID;
```

TIMEOUT QUEUE

The timeout and subsequent "clean-up" processing is platform independent and requires no special system services. The TOQ includes entries for participants and for conversations. For purposes of illustration, the TOQ as defined by a "struct" statement in the "C" language is shown in Table 21, below.

TABLE 21

```
typedef struct_TOQ
    BEGIN
        TABID       tabid;      /* table identifier                          */
        LWORD       tabno;      /* table relative number                     */
        struct_PCB  *lckowner;  /* PCB address of owner                      */
        struct_TOQ  *head;      /* Pointer to chain head                     */
        struct_TOQ  *prev;      /* Pointer to previous entry                 */
        struct_TOQ  *next;      /* Pointer to next entry                     */
        WORD        lock;       /* Lockflag                                  */
        WORD        status;     /* Entry status                              */
        void        *owner;     /* CCB or PCB pointer                        */
        time_t      time;       /* Absolute                                  */
        int         counter;    /* User counter                              */
        BYTE        type;       /* Entry type (Conversation or Participant)  */
    END TOQ;
```

CLEANUP QUEUE

The Cleanup queue (CUQ) passes information about conversations or participants that have "timed-out" from the Timeout manager (TOM) to the Cleanup manager (CUM). The Cleanup manager operates independently and uses this information to recover the entries in the various tables (linked lists) for reuse. For purposes of illustration, the Cleanup queue as defined by a "struct" statement in the "C" language is shown in Table 22, below.

TABLE 22

```
typedef struct_CUQ
    BEGIN
        TABID       tabid;      /* table identifier            */
        LWORD       tabno;      /* table relative number       */
        struct_PCB  *lckowner;  /* PCB address of owner        */
        struct_CUQ  *head;      /* Pointer to chain head       */
        struct_CUQ  *prev;      /* Pointer to previous entry   */
        struct_CUQ  *next;      /* Pointer to next entry       */
        LWORD       lock;       /* Lockflag                    */
        LWORD       status;     /* Entry status                */
        VOID        *owner;     /* Pointer to owner            */
        TOQ         *toq;       /* Pointer to TOQ entry        */
    END CUQ;
```

UNINHIBIT QUEUE

The UIQ is used to maintain a list of entries on the TOQ that have been inhibited temporarily from time-out processing and need to be reinstated into the TOQ once they have been uninhibited. For purposes of illustration, the UIQ as defined by a "struct" statement in the "C" language is shown in Table 23, below.

TABLE 23

```
typedef struct_UIQ
    BEGIN
        TABID       tabid;      /* table identifier            */
        LWORD       tabno;      /* table relative number       */
        struct_PCB  *lckowner;  /* PCB address of owner        */
        struct_UIQ  *head;      /* Pointer to chain head       */
        struct_UIQ  *prev;      /* Pointer to previous entry   */
        struct_UIQ  *next;      /* Pointer to next entry       */
        LWORD       lock;       /* Lockflag                    */
        LWORD       status;     /* Entry status                */
        struct_TOQ  *toq;       /* Pointer to TOQ entry        */
        long        time;       /* Relative time               */
    END UIQ;
```

D. Communication and Storage Handling

The broker employs workers to process requests (SEND, RECEIVE, etc.). The number of workers determines the number of requests that the broker can concurrently process (in parallel). Each worker is identical and is capable of doing any of the broker functions.

WORKER QUEUE

The Worker queue (WQ) is used by the internal dispatcher to pass requests to one of the Workers for processing. For purposes of illustration, the WQ as defined by a "struct" statement in the "C" language is shown in Table 24, below.

TABLE 24

```
typedef struct_WQ
    BEGIN
        struct_HEADER  header;  /* standard header                      */
        struct_GAT     *gat;    /* pointer to GAT                       */
        XWQE           *xwqe;   /* pointer to current worker XCOM-WQE   */
        ECB            wecb;    /* ECB for broker-worker                */
        TCB            *wtcb;   /* pointer to worker TCB                */
        struct_DCT     *dct;    /* pointer to OCT                       */
        WKRERP         wkrep;   /* worker error parameter structure     */
        LWORD          status;  /* Entry Status (w, a, d, p, f, u)      */
    END WQ;
```

The relationship between the DCT and the WQ is illustrated in FIG. 7F. The DCT includes a pointer to the WQ chain. Each WQ entry includes a pointer back to the DCT. It also has a pointer to the XWQE, which is the current item of work. The work item is the structure that has the addresses for the parameter string HAPI fields send buffer, receive buffer, and reply address. The WQ entry also has a pointer to the broker structure accessed through the GAT. Each active worker has an active WQ entry. The WQ entries contain the information necessary for each worker to complete the requested function and return an appropriate reply. The WQ is thus the main mechanism used by the internal dispatcher (along with the DCT) to distribute work to appropriate workers.

1. Communication Manager

The Communication manager (COM) handles all necessary communication with the Operator/Administrator when an "internal" server is not available to accomplish the task. It is an autonomous component of the kernel.

2. Virtual Store Manager

The Virtual Store manager is an integral part of the kernel. All components of the kernel have access to this component, which manages the available storage, ensuring efficient use of the available storage in a changing environment.

E. Client/Server Attributes

The broker environment can be customized by the administrator and appropriate participant defaults can be chosen by setting various attributes in the attribute file. The broker can function without a file since important attributes are given default values.

The attributes can be grouped into two categories—broker attributes and participant attributes. The latter category can be further subdivided into defaults and individual overrides.

The broker attributes are specific to the broker and its control of the workload. The participant definitions within the attribute file define both global and individual participant defaults, enabling the administrator to customize and control the environment (e.g., size and rater of conversations, number of conversations, etc.). The broker obtains broker specific and global defaults from the attribute file (if one is available) on startup. Specific overrides are accessed upon Register. The administrator can thus alter specific environments without reloading the broker.

Each occurrence of an attribute definition consists of an attribute name and an attribute value. For some attributes a null value is allowed. The broker uses multiple occurrences of certain attribute definitions to accumulate values for the attribute when this is meaningful. If multiple definitions of the same attribute are not meaningful, the broker treats them as errors. Conflicting settings of different attributes are treated as errors.

The value of an attribute is determined by the following rules: First, values set dynamically by the administrator are taken. Second, the broker takes the values in the attribute file for the particular participant (if one exists). Third, the broker takes the values found in the attribute file for a global default if one is found. Finally, if no file is available, or no setting is found, the broker-supplied default applies.

1. Broker Specific Attributes

The Broker specific attributes are identified in the following table and are described in more detail below.

| ATTRIBUTE NAME | SHORT FORM | DEFAULT | ALLOWED VALUES | DEPENDENT ATTRIBUTES |
|---|---|---|---|---|
| BROKER-ID | (BID) | LOCALBRK | Name | |
| OPERATOR | (OPER) | ASK | ASK, YES(Y), NO(N) | |
| DUMP | (DUMP) | NONE | REL-QUEUES (RELQ) ALL-QUEUES (ALLQ) SYSTEM (SYS) NONE | |
| START | (START) | WARM | COLD(C), WARM(W) | |
| MAX-STORE | (MAXST) | P.D | n, nK, nM | |
| NUM-WORKERS | (NWKRS) | P.D | n | |
| ALLOC-SIZE | (ASIZE) | P.D | n, nK, nM | |
| SPLIT-SIZE | (SSIZE) | P.D | n, Nk, nM | |
| TOTAL-PART | (TOTALP) | P.D | n | |
| NORM-PART | (NORMP) | P.D | n | |
| TOTAL-CONV | (TOTALCV) | P.D | n | |
| NORM-CONV | (NORMCV) | P.D | n | |
| AVE-NMSGS | (AVENM) | P.D | n | |
| AVE-MSGLEN | (AVEML) | P.D | n, nK, nM | |
| ALLOW-REG | (ALLOWR) | NO | NO(N), YES(Y) | |

In the preferred embodiment, the following syntax rules are applied. Spaces are not significant between Keywords and Values. Neither are leading or trailing spaces. However spaces are significant within Keywords and Values (eg. SN=PCOMPLETE, SC=TPMON, SV=UEDIT is acceptable whereas SN=PCOMPLETE, SC=TP MON, S V=UEDIT is not). Commas and equal signs are keyword and value separators and cannot be used with the exception of the 'param string' (see below). Lowercase is allowed in keywords and set values but not mixed case. P.D. indicates a Platform Default selected by the BROKER. An 'n' indicates an unsigned numeric integer. A 'name' indicates an acceptable meaningful name. No conversion is performed on the name so care should be used when mixed case or special characters are used (eg. ABC, abc and AbC are all different). 'Null' indicates a null value is acceptable (e.g. SV=, is a means of specifying a general service. 'Time'—two time formats: a) HH:MM:SS (where HH,MM,SS are Hours, Minutes and Seconds, respectively) and b) n,nH,nM,nS (the number of Hours, Minutes or seconds past midnight).

A 'param string' indicates that the broker accepts a parameter string format as <delimiter> parameter string <delimiter>. A quote has no special meaning, any characters other than space, comma, equals and period can be used as <delimiters>. Parameter strings cannot extend over input records (eg. 'ABC, Name=FRED, custno=1234' and/A= 1234,EP='$STRT',XYZ/are both acceptable parameter strings). N/A indicates Not Applicable.

BROKER-ID is a mandatory parameter and must be the first keyword in the first record of the Attribute file if one exists. If no Attribute file is available then the BROKER-ID will be as specified under DEFAULT below.

OPERATOR informs the broker if the Operator is allowed to use certain Admin functions which apply to the broker specifically. If the attribute has the value ASK—this implies YES and where appropriate the Operator will be asked for a course of action.

DUMP indicates whether to take a dump and what to dump in the event of a shutdown of the Broker.

START indicates the type of Startup the Broker should attempt. If the OPERATOR attribute is set to ASK the Operator will be asked to confirm or to override this default.

MAX-STORE is the MAXimum storage (in bytes) available to the broker below.

NUM-WORKERS is the number of concurrent worker tasks (these can be subtasks, processes or separate address space depending on the platform) that the broker can use. This parameter determines the number of functions (eg. SEND, RECEIVE,REGISTER etc) that are processed concurrently.

ALLOC-SIZE is the amount of storage the broker will try to obtain when he workload increases and more storage is required. The broker obtains 'ALLOC-SIZE' amounts up until 'MAX-STORE'. Extreme care should be used with this parameter as an incorrect setting could severely affect performance.

SPLIT-SIZE is used by the broker to make efficient use of storage. It should usually be set if the workload contains a large number of messages that are shorter than the default. In these circumstances a value equal to the shorter message length will usually provide better performance.

TOTAL-PART is the TOTAL number of concurrent participants. This is used by the broker to make decisions on the size of the workload in order to make the best use of the available resources. If specified the broker will limit the workload to 'TOTAL-PART' concurrent active participants.

NORM-PART is the NORMal number of concurrent participants. This is used by the broker to make decisions on the size of the workload in order to make the best use of the available resources. If the workload is significantly different from the broker default for the platform, use of this parameter is recommended. It does not have any restrictive effect on the broker's ability to support the workload. It would not be advantageous to set the value to some large arbitrary value as this would lead the broker to assume a large normal workload.

TOTAL-SERV is the TOTAL number of concurrent Services. This is used by the broker to make decisions on the size of the workload in order to make the best use of the available resources. If specified the broker will limit the workload to 'TOTAL-SERV' concurrent active Services. Note that this is the number of Services, not servers.

NORM-SERV is the NORMal number of concurrent services. This is used by the broker to make decisions on the size of the workload in order to make the best use of the available resources. It would not be advantageous to set the value to some large arbitrary value as this would lead the broker to assume a large normal workload.

TOTAL-CONV is the TOTAL number of concurrent Conversations. This is sued by the broker to make decisions on the size of the workload in order to make the best use of the available resources. If specified the broker will limit the workload to 'TOTAL-CONV' concurrent active Conversations.

NORM-CONV is the NORMal number of concurrent Conversations. This is used by the broker to make decisions on the size of the workload in order to make the best use of the available resources. It would not be advantageous to set the value to some large arbitrary value as this would lead to the broker to assume a large normal workload.

AVE-NMSGS is the AVErage number of concurrent active messages. Together with the 'AVE-MSGLEN' parameter the broker can make decisions on the size of the workload in order to make the best use of the available resources. It would not be advantageous to set the value to some large arbitrary value as this would lead to the broker to assume a large normal workload.

AVE-MSGLEN is the AVErage length of messages. Together with the 'AVE-NMSGS' the broker can make decisions on the size of the workload in order to make the best use of the available resources. It would not be advantageous to set the value to some large arbitrary value as this would lead the broker to assume a large normal workload.

ALLOW-REGISTER is a simple switch to indicate whether the broker will allow the Servers that are not found in the Attribute file but attempt to REGISTER to do so. It has no meaning to an individual application.

2. Participant Specific Attributes

The participant specific attributes are identified in the following table and are described in more detail below.

| Attrib. Name | ShortForm | Default | Allowed Values (Short) | Dep. Attrib. |
|---|---|---|---|---|
| SERVER-NAME | (SN) | N/A | Name | SERVER-CLASS |
| SERVER-CLASS | (SC) | N/A | Name | SERVER-NAME |
| SERVICE | (SV) | N/A | Name, Null | SERVER-NAME SERVER-CLASS |
| START-TIME | (STARTT) | N/A | Time | END-TIME |
| END-TIME | (ENDT) | N/A | Time | START-TIME |
| SCOPE | (SCDPE) | LOCAL | LOCAL(L), GLOBAL(G) | |
| CONV-SHARE | (CSHARE) | NO | YES(Y), NO(N) | |
| CONV-MODES | (CMODES) | ALL | SYNCHRONOUS (SYNCH) ASYNCHRONOUS (ASYNCH) ALL | |
| CONV-TYPES | (CTYPES) | ALL | NONCONV, CONVERSATIONAL (CONV) ALL | |
| OPERATOR | (OPER) | NO | ASK, YES(Y), NO(N) | |
| DUMP | (DUMP) | NONE | CONV-QUEUE(CONVQ), ALL-QUEUES(ALLQ), NONE | |
| NON-AVAILABLE | (NAVAIL) | DISCARD | DISCARD, KEEP | |
| MQ-ACCESS | (MQACC) | NO | NO(N), Routine Name | |
| TRANSLATION | (TRANS) | NO | NO(N), Routine Name | |
| TERM-ACTION | (TERM) | NO | NO(N), Routine Name | |
| SECURITY | (SECUR) | STD | OFF, STANDARD(STD), Routine Name | |
| LOGGING | (LOG) | OFF | OFF, STANDARD(STD), Routine Name | |
| TRACING | (TRACE) | OFF | OFF, STANDARD(STD), Routine Name | |
| ACCOUNTING | (ACCNT) | STD | OFF, STANDARD(STD), Routine Name | |
| AUTO-START | (ASTART) | NO | YES(Y), NO(N) | SERVER-NAME SERVER-CLASS |
| AUTO-PARMS | (APARMS) | N/A | 'Param string' | AUTO-START |

-continued

| Attrib. Name | ShortForm | Default | Allowed Values (Short) | Dep. Attrib. |
|---|---|---|---|---|
| DESCRIPTION | (DESC) | N/A | 'Param string' | SERVER-NAME SERVER-CLASS |
| DEF-TIMEOUT | (DEFTO) | P.D | n, nS, nM, nH | |
| MIN-TIMEOUT | (MINTO) | P.D | n, nS, nM, nH | |
| MAX-TIMEOUT | (MAXTO) | P.D | n, nS, nM, nH | |
| CONV-TIMEOUT | (CONVTO) | P.D | n, nS, nM, nH | |
| MAX-MSGLEN | (MAXML) | P.D | n, nK, nM | |
| MAX-NMSGS | (MAXNM) | P.D | n | |
| MAX-NCONVS | (MAXNC) | P.D | n | |

SERVER-NAME defines an Application participant name that will be allowed to REGISTER and be given the associated attributes from the Attribute file. The Administrator uses this field to associate specific attribute settings to an individual Application Server. A SERVER-CLASS must also be specified. Server names starting with any of the following are reserved for use by SAG.

SERVER-CLASS defines the Class associated with the SERVER-NAME above. Together a complete ID for the SERVER is formed. Server classes starting with any of the following are reserved for use by SAG.

SERVICE defines one of the Services that is available. Multiple occurrences of this field are used to offer several services from the same Server. At least one occurrence must exist for each SERVER-NAME, SERVER-CLASS combination.

SERVICE-START, used in conjunction with SERVICE-END, specifies the Service interval. The time must be in one of the Broker acceptable time formats and is taken as the time from Midnight. If the time has already passed then the service is offered immediately upon REGISTER. No service is offered at all until REGISTER unless AUTO-START is used.

SERVICE-END is used in conjunction with SERVICE-START to determine the Service interval. The time must be in one of the Broker acceptable time formats and is taken as the time from Midnight. If the time has already passed then the Service is not started until the next SERVICE-TIME occurs. The time must be later than the SERVICE-START time. At the end of the Service time the SERVER will be terminated with DEREGISTER OPTION=QUIESCE.

SCOPE determines the SCOPE of the offered services. The current options are to restrict the services to local use within the BROKER environment or offer them globally outside the BROKER. If associated with an individual Application it applies to the specific Application only.

CONV-SHARE—If a Key value is specified then the Application is taking part in CONFERENCING ie. it is sharing CONV-ID's with other participating applications.

CONV-MODES indicates which modes of running are supported by the Server. If associated with an individual Application it applies to the specific Application only.

CONV-TYPES indicates which type of conversation the Server is capable of dealing with. If associated with an individual Application it applies to the specific Application only.

OPERATOR indicates to the broker whether the Operator is permitted to use the appropriate Administrator function for the SERVER-NAME,SERVER-CLASS. If set as a global default then the Operator has extensive control over the whole environment. If the value is set to ASK then this implies YES and under certain circumstances the Operator will be asked for a course of action eg. when the participant has been inactive longer than the allowed time-out period.

DUMP indicates whether to take a dump and what to dump in the event of a time-out (or other Broker detected event) of the participant.

NON-AVAILABLE indicates to the broker the action to take with the queue entries for conversations for a Server that is not active at present but for which an entry is available in the Attribute file. The queues are still subject to normal time-out processing. If associated with an individual Application it applies to the specific Application only.

TRANSLATION—Translation services can automatically be invoked by the broker by the use of this attribute. One of the translation routines supplied with the broker can be used or the Administrator can choose a User supplied routine. Client/Servers can communicate in different data formats provided a suitable translation routine is available. If associated with an individual Application it applies to the specific Application only.

TERM-ACTION—The broker uses this Attribute to invoke a termination routine (if one has been defined) as part of DEREGISTER. If associated with an individual Application it applies to the specific Application only.

SECURITY—The broker uses this Attribute to invoke the required Security checks. The value STD invokes the standard routine that is supplied with the BROKER. If associated with an individual Application it applies to the specific Application only.

LOGGING—This Attribute is used to control the amount of logging required. Again the value STD invokes the standard routine that is supplied with the broker. If associated with an individual Application it applies to the specific Application only.

TRACING—This Attribute is used to control the amount of Tracing required. Again the value STD invokes the standard routine that is supplied with the BROKER. Multiple occurrences of this Attribute can be used to also set the tracing level. If associated with an individual Application it applies to the specific Application only.

ACCOUNTING—This Attribute is for Accounting control. The value STD invokes the standard routine that is supplied with the BROKER. If associated with an individual Application it applies to the specific Application only.

AUTO-START determines whether a particular Application Server is started by the BROKER automatically under certain conditions. The BROKER will not start a Server outside it's defined Service interval if one has been defined. It is only available on platforms where the possibility to start the relevant Server exist.

AUTO-PARMS are parameters that are passed upon AUTO-START unchanged. Note that parameters cannot be continued over input record boundaries.

DESCRIPTION is a short Administrator defined description that can be retrieved using the BROKER information services.

DEF-TIMEOUT is the Default time-out period used in Synchronous processing. If associated with an individual Application it applies to the specific Application only. Should no entry be found in the File then the BROKER will choose a suitable Platform optimized default. The value that is given can be followed by one of H,M or S standing for Hours, Minutes and Seconds respectively. If none of these are specified then Seconds is assumed.

MIN-TIMEOUT is the MINimum time-out period used in Synchronous processing. The time-out value associated with the field WAIT must fall within the values MIN-TIMEOUT and MAX-TIMEOUT. If associated with an individual Application it applies to the specific Application only. Should no entry be found in the File then the broker will choose a suitable Platform optimized default. The value that is given can be followed by one of H,M or S standing for Hours, Minutes and Seconds respectively. If none of these are specified then Seconds is assumed.

MAX-TIMEOUT is the MAXimum time-out period used in Synchronous processing. The time-out value associated with the field WAIT must fall within the values MIN-TIMEOUT and MAX-TIMEOUT. If associated with an individual Application it applies to the specific Application only. Should no entry be found in the File then the broker will choose a suitable Platform optimized default. The value that is given can be followed by one of H,M or S standing for Hours, Minutes and Seconds respectively. If none of these are specified then Seconds is assumed.

CONV-TIMEOUT is the End-Of-Conversation time-out value. It must be greater than MAX-TIMEOUT. If associated with an individual Application it applies to the specific Application only. Should no entry be found in the File then the BROKER will choose a suitable Platform optimized default. The value that is given can be followed by one of H,M or S standing for Hours, Minutes and Seconds respectively. If none of these are specified then Seconds is assumed.

MAX-MSGLEN is the MAXimum length of a record on the incoming (RECEIVE) queue that is to be allowed. If associated with an individual Application it applies to the specific Application only. Should no entry be found in the File then the broker will choose a suitable Platform optimized default. The value that is given can be followed by one of K,M standing for Kbytes or MegaBytes respectively. If none of these are specified then n is taken in Bytes. is assumed.

MAX-NMSGS is the MAXimum number of messages allowed to reside on the queue waiting to be RECEIVED. If associated with an individual Application it applies to the specific Application only. Should no entry be found in the File then the BROKER will choose a suitable Platform optimized default. The value that is given can be followed by one of K,M standing for Kbytes or MegaBytes respectively. If none of these are specified then n is taken in Bytes. is assumed.

MAX-NCONVS is the MAXimum number of conversations that are to be supported simultaneously. If associated with an individual Application it applies to the specific Application only. Should no entry be found in the File then the BROKER will choose a suitable Platform optimized default. The value that is given can be followed by one of K,M standing for Kbytes or MegaBytes respectively. If none of these are specified then n is taken in Bytes. is assumed.

3. The Attribute File

The broker does not need an attribute file to function. The purpose of the attribute file is to store information about the availability and characteristics of clients and servers. The entries in the attribute file typically apply more to servers than to clients.

The choice of storage media, access method, and file layout is not important to the broker—it is contemplated that brokers located on different platforms will use the appropriate choices according to customer requirements.

The broker can run without an attribute file and can continue if the attribute file becomes unavailable—the broker does not rely on the file to create and support a viable environment. If not attribute file is available on broker initialization, the broker uses built-in defaults. If the broker was "warm" started, it uses previously-used settings. The administrator can dynamically alter important application settings (such as security) by using the administrator functions.

The attributes can be placed on a variety of storage media supported and accessed by a variety of access methods, such as flat-file, VSAM file, DA file, DOS fixed disk, optical disk, etc. The administrator can use the default access method and file placement provided by the broker for the appropriate platform or one of the other routines provided or use a customer-written version. The broker is only concerned with the logical entries, which are the attribute definitions.

Broker specific entries apply only to the broker. The first attribute definition must be the Broker_ID (BID). Participant global defaults apply to all participants for which a specific override is not specified. They are identified for convenience under SERVER-NAME=DEFAULTS with SERVER-CLASS=BROKER. Participant-specific entries apply to a specific SERVER-NAME and SERVER-CLASS, which identifies the individual application. They override the defaults that the broker would otherwise normally apply.

The attribute definitions should appear to the broker in the logical order given in Table 25, below.

TABLE 25

BROKER-ID = MYBROKER
.
Broker specifics
.
SERVER-NAME = DEFAULTS
SERVER-CLASS = BROKER
.
Global defaults
.
SERVER-NAME = ASERVER
SERVER-CLASS = ACLASS
.
Overrides for ASERVER, ACLASS
.
SERVER-NAME = ANOTHER
SERVER-CLASS = ABC
.
Overrides for ANOTHER, ABC
.
ETC.
.
END Blank records and comment records are ignored.
A sample file definition is shown in Table 26, below.

TABLE 26

/* I am a comment followed by a blank line
/* Broker Specifics
BROKER-ID = TEST-BROKER
MAXST = 4M, NWKRS = 5, ASIZE = 100K
TOTALP = 200, NORMP = 50
TOTALSV = 4, NORMSV = 2
TOTALCV = 30, NORMCV = 10
AVENM = 200
/* Global Defaults - override broker built-in defaults TABLE 26-continued

```
SERVER-NAME = DEFAULTS, SERVER-CLASS = BROKER
DEFTO = 10S, MINTO = 1S, MAXTO = 5M, CONVTO = 10M
MAXML = 32K, MAXNM = 20, MAXNC = 100
/* Overrides for SERVER1, CLASS = DB
SN = SERVER1
SC = EDITOR
SV = EDIT, SV = BROWSE, SV = LIST
DEFTO = SS, MAXTO = 1-M, CONVTO = 1H
MAXML = 80, MAXNM = 200, MAXNC = 100
/* Overrides for SERVER2, CLASS = DB
SERVER-NAME = SERVER2, SC = DB
SV = FIND, SV = PROCESS, SV = , CMODES = ASYNCH
ASTART = YES, APARMS = "WARM,NUSERS = 100",
CTYPES = CONV
/* Overrides for LASTSERV, CLASS + PRINTER
SN = LASTSERV, SC = PRINTER, SV = PRNT1, SV = PRNT2,
NAVAIL = KEEP, CMODES = ASYNCH
END
```

IV. BROKER COMMUNICATION FUNCTIONS

The service broker uses the data structures described above to process clients' requests for services and servers' responses to those requests. Each communication from a participant to the service broker via the LAPI must specify the function that the participant is invoking. The functions that they invoke can be referred to as "user functions." In addition, the administrator of the service broker can invoke other functions, referred to as "administrator functions." The user and administrator functions are identified and described below.

A. User Functions

The following user functions are available (and thus represent some of the allowable values for the FUNCTION field in the parameter string HAPI.

1. REGISTER

This function is used by a participant to register with the broker. Supplementary information (for example, attributes or characteristics) concerning the participant is obtained by the broker from the directory service to perform the necessary steps to place the participant into the list of active servers. To register, the participant must have proper authority, which is defined in the directory by the administrator and is verified (if security has been activated).

To register one or more services with the broker, a participant passes a command string via the parameter string HAPI, such as:

ƒ=register, sn=aserver, sc=aclass

The broker's processing of the REGISTER function is illustrated in pseudocode form in Table 27, below.

TABLE 27

```
Search for PCB for this participant
Find PCB?
  Yes (PCB already exists):
    Inhibit PCB
    Is this service's SCB in the PCB-extension chain?
      Yes:
        Refresh attributes
        Uninhibit PCB
        Return
      No:
        (1) Global lock SAT
          Search SAT for the SCB for this service
          Find SCB in SAT for this Service?
            Yes:
              (2) Unlock SAT
                Lock PCB
```

TABLE 27-continued

```
                Add SCB to PCB-extension
                Lock SCB
                Add PCB to SCB-ext
                Unlock SCB
                Refresh attributes
                Uninhibit PCR
                Return
              No:
                Search Directory for SCB
                Find SCB?
                  No (or no directory):
                    Continue!
                      No:
                        Error
                        Uninhibit. PCB
                        Return
                      Yes:
                  Yes:
                    Create SCB
                    Create SAT entry
                    Continue from (2)
        No:
          Create PCB
          Inhibit PCB
          Continue from (1)
```

The broker first attempts to locate the participant's PCB. If this is successful (i.e., the participant previously registered with the broker as a server or implicitly as a client by starting a conversation with CONV_ID=NEW), the PCB is inhibited to prevent time-out processing by the Timeout manager while the request is being processed. The PCBEXT chain (which, as described above, contains pointers to any SCBs for this PCB) is searched to determine if the participant is already offering this service. If so, then the attributes that determine the service environment are refreshed from the attribute file, the PCB is uninhibited (i.e., its entry on the Timeout queue is moved into the Uninhibit queue, so that it will once more become subject to time-out processing), and control is passed back to the participant.

If the SCB for the service is not found in the PCBEXT chain, then the SAT is locked and searched to determine if there is an entry with an SCB pointer matching the service to be registered. This indicates that the service is already being provided by another participant. If an entry is found in the SAT, the SAT is unlocked, the PCB is locked, and the SCB pointed to by the SAT entry is added to the PCBEXT chain of the participant, indicating that this participant is now also offering the service. The PCB is then unlocked, and the PCB of the participant is added to the list of participants providing the service by locking the SCB found via the SAT and adding another SCBEXT to the chain. Finally, the SCB is unlocked, the PCB is uninhibited and control is returned to the participant.

If the service is not found in the SAT as already being provided, the attribute file (if one exists) is searched for a corresponding entry. If one is found, processing continues from (2) in the pseudocode to add the SCB to the PCB extension, add the PCB to the SCB extension, refresh attributes, uninhibit the PCB and return control to the participant. An entry is also created in the SAT for the new service. If the SCB is not found in the attribute file or an attribute file is not being used, then a decision is made (based on default broker attributes, which can be overridden by the user) as to whether to continue and allow registration or not and control is returned to the participant. If the decision is to continue, then an SCB is created with default attributes found from a default entry in the SAT and processing continues from (2).

In the case where the PCB does not exist, the PCB is created, the PCB is inhibited, and processing continues from to (1), where the SAT is searched for this SCB.

2. DEREGISTER

This function removes a participant from the "active" list, and the broker performs clean-up and termination services. This function offers two options (specified in the OPTION field). The default option "QUIESCE" causes the broker to reject any new request. Existing conversations are allowed to continue within a time-out period defined by the administrator. Deregistration takes place when all existing conversations have ended. The option "IMMEDIATE" means that no further processing is allowed. New requests are rejected and all conversations are terminated.

A participant deregisters by passing a command string to the broker via the parameter string HAPI such as:

ƒ=deregister, opt=quiesce, sn=aserver, sc=aclass

One of the parameters is "OPTION," which may be set by the deregistering participant to the value "immediate" or "quiesce." "Quiesce" causes the broker to reject any new requests for this service, and existing conversations are allowed to continue within a timeout period defined by the administrator. The deregistration will be completed when all existing conversations have been ended. If Option is set to "immediate," all conversations are terminated immediately and new requests are rejected by the broker. The participant does not need to wait until the deregistering process has been completed, as control is returned by the broker as soon as the request has been actioned.

The service broker's processing of the Deregister function is illustrated in Table 28, below.

TABLE 28

Search for PCB for this participant -- Find PCB?
No:
  Error
  Return
Yes:
  Inhibit PCB
  Is this service's SCB in the PCB-extension chain?
  No:
    Error
    Uninhibit PCB
    Return
  Yes:
    If Option = Quiesce:
      Lock SCB
      Set status in SCB extension
      Set entry for this PCB to indicate Deregister in progress
      Uninhibit PCB
      Unlock SCB
      Return
    If Option = immediate:
      For all conversations owned by this PCB for this SCB:
        Call EOC (w/EOC Deregistration)
      Lock PCB
      Mark SCB entry in PCB extension dead
      Unlock PCB
      Lock SCB
      Mark PCB entry in SCB extension dead
      NAE = NAE - 1
      Unlock SCB
      Return The broker first attempts to locate the PCB for this service. Once found, the PCB is inhibited, and the broker searches the PCBEXT chain to find this service's SCB. If the SCB is found, then the broker performs one of two types of processing depending on whether the option is set to quiesce or immediate. If Option is set to "quiesce" (default), the broker locks the SCB, sets the entry status in the SCBEXT chain extension for this PCB to indicate that deregistration is in progress, so as to deny any future requests for this service.

The status entry is used so that the participant does not need to wait until the deregistering process is complete. Although conversations are terminated after the time-out period automatically, if a participant is either waiting on one of these conversations or sends/receives after deregistering, the participant will receive an immediate response. The timeout periods can be set by the user and could be extremely long.

After the entry status is set, the PCB is uninhibited, the SCB is unlocked and control is then returned. If Option is set by the participant in the command string to "immediate" then for all conversations owned by this PCB using this SCB, an end of conversation (EOC) procedure call is made by the broker to immediately terminate these conversations. The corresponding SCB and PCB entries in the PCB extension and the SCB extension respectively are marked dead to indicate to the clean-up manager that the entries can be processed for re-use.

3. SEND

This function is used by participants to send a service request (or a response to a service request) to the broker for subsequent receive processing. A participant invokes the SEND function by passing a command string to the broker via the parameter string HAPI such as:

ƒ=send, wait=yes, convid=1234 or

ƒ=send, wait=no, sn=aserver, sc=aclass, sv=aservice

To enable synchronous and asynchronous service request processing, the following options in the WAIT field can also be used in the SEND function:

| Value | Action |
|---|---|
| YES | Invokes an implicit RECEIVE after normal action as described above. |
| NO | Is the default and means that control is given back to the sending participant immediately following acceptance of the SEND. |
| MAX | An implicit RECEIVE is invoked up to the maximum value that has been defined by the administrator. |
| n(sec) | An implicit RECEIVE is invoked until a time limit specified by n or MAX has been exceeded. |

Part of the broker's processing of the SEND function is illustrated in pseudocode form in Table 29, below.

For a new conversation (CONV_ID=NEW), the PCB chain is searched to determine if the participant is already conducting conversations (i.e., is an

TABLE 29

SEND
If Conv_id = NEW (new conversation)
  Find or create source PCB and source SCB
  Inhibit source PCB
  Target SCB exist?
    No:
      Error
    Yes:
      Is there at least one registered service in SCB_EXT that is not deregistering?
        No:
          Error
          Return
        Yes:
          Lock last CCB's
          Create CCB's
          Unlock CCB
          Inhibit CCB
          Increment NACCB and NCCB

TABLE 29-continued

```
If Conv_ID = 1234 (existing conversation)
  Find source PCB
  Inhibit source PCB
  Find CCBs
  Inhibit CCB
  Find SCB
  MAX_NMQ = NMH + NM
  Lock CCB
  Check EOC
  Add new message
  Option = hold?
    Yes:
      Increment NHM
    No:
      Increment NM
  Modify CCB pointers
  Unlock CCB
  Uninhibit TOQ entry
Value of WAIT
  No:
    Post Sender OK without data
  Yes:
    Call Receive (implicit Receive)
``` existing client/server). If a PCB is not found, then a PCB and SCB are created for the participant. In this case the SCB is a client SCB, identical to a server SCB except that it can only have one SCBEXT. Time-out processing is initiated for the PCB and the target SCB for the service requested by the participant is found. If the service is not currently being provided, the participant is notified and processing ends. If the service is currently available, a new CCB is created and chained to the existing CCB chain of the target. A message queue is created, and the sender's request is added to the message queue.

If OPTION=HOLD has been specified, the message is marked as being in HOLD status and will only be "sent" (i.e., made available to the receiver) upon a further send request without OPTION=HOLD. A CCB entry is also created and added to the participant's CCB chain and both participant's and target's CCB are linked. If the participant has elected to WAIT, then the PCB is marked to indicate an implicit RECEIVE. If not, the sender is notified that the SEND has been accepted. The worker processing the SEND request then attempts to locate a participant awaiting the request. If found, the message is passed to the waiting participant.

For an existing conversation (i.e. CONV_ID=1234), the processing starts by attempting to find the conversation in the participant's PCB-SCB-CCB chains. If found, the processing is similar to that for a new conversation except that no new PCB, SCB or CCB need be created. If not, the participant is notified of the error.

4. RECEIVE

This function is used to ask the broker for outstanding (queued) requests or responses. A participant invokes the RECEIVE function by passing a command string to the broker via the parameter string HAPI such as:

ƒ=rec, wait=yes, convid=1234

If this a request or response is queued for the receiving participant, the broker will return the queued request or response. If no entry is found in the queue, the broker returns an appropriate error-code. To allow synchronous and asynchronous request processing, the following options in the WAIT field can also be used in the RECEIVE function:

| Value | Action |
|---|---|
| YES | The receiving participant is set in WAIT state until a response is available or a time set by the administrator has been exceeded. |
| NO | Default -- the receiving participant is returned an error code if no response is available. |
| MAX | The receiving participant waits for a response up to the maximum time value that has been defined by the administrator. |
| n(sec) | The receiving participant waits for a response up to a time limit specified by n or MAX has been exceeded. |

The broker's processing of the RECEIVE function is illustrated in pseudocode form in Table 30, below.

TABLE 30

```
RECEIVE
Find source PCB
Inhibit source PCB
For all PCB extension entries
  If SN is specified
    check SN against SCB_ID
  If status = deregister in SCB extensions
    ignore or
    if Conv_id = any
      error
      return
  Check Conv_ID against CCB chain (NM > 0) or EOC set
    If Conf_flag is not set
      check owner
    If valid
      Lock CCB
      Check NM > 0 (again) or
        EOC set and NM = 0
      Inhibit CCB
      Check option = last
      Modify CCB pointers if new flag set
      Unlock CCB
      Post Receiver with data or EOC
      Uninhibit CCB
If any valid SCB not found (no post has been sent back and not a listen
internal API call)
  If SN is specified
    Error
    Return
Lock PCB
Set WS and WC and Optionally WOS pointers
Unlock PCB
Uninhibit PCB
```

5. DELETE

This function is used by a participant to tell the broker to delete entries of the caller from the incoming messages queue. A participant invokes the DELETE function by passing a command string to the broker via the parameter string HAPI such as:

f=del convid=1234

The broker's processing of the DELETE function is illustrated in pseudocode form in Table 31, below.

TABLE 31

```
DELETE
Find source PCB
Inhibit source PCB
Find CCB
Inhibit CCB
Lock CCB
NM = 0
Modify pointers
Free messages
Unlock PCB
```

TABLE 31-continued

Uninhibit CCB
Uninhibit PCB

6. EOC

This function is used by a participant to tell the broker to end the specified conversation(s). A participant invokes the EOC function by passing a command string to the broker via the parameter string HAPI such as:

f=eoc, conv-id=any

The following values can be set in the CONV_ID field:

| Value | Action |
|---|---|
| ANY | The EOC processing applies to all the participant's conversations. |
| "n" | The EOC prooessing applies to a single conversation with CONV_ID of "n." |

The following values can be set in the OPTION field:

| Value | Action |
|---|---|
| IMMED | The action is immediate and further SEND/RECEIVE processing is not allowed. The conversation(s) will be terminated. |
| QUIESCE | No further SEND processing will be allowed. RECEIVE will be allowed until there are not more items or time-out occurs. The conversation(s) will then be terminated. |

The broker's processing of the EOC function is illustrated in pseudocode form in Table 32, below.

TABLE 32

EOC

Find source PCB
Inibit source PCB
Get next SCB in PCB enxtension
   Get next CCB owned by source PCB (1)
      If Conv_id = specified Conv_id or specified Conv_id = ALL
         Go to (1)
      Inhibit CCB
      Lock CCB
      EOC = Y
      Unlock CCB
      Lock partner CCB
      EOC = Y
      Unlock Partner CCB
      Check owner PCB valid (not null)
      Check WS, WC, WOS valid
      Lock PCB
      Check WS/WC/WOS again
      Inhibit PCB
      Unset WS
      Unlock PCB
      Post EOC
      Uninhibit PCB
      Uninhibit CCB
      Specified Conv_id = ALL?
         Yes:
            Go to (1)
         No:
            Return
If no match found
   Error

UNDO

This function is used by a participant to tell the broker to messages already sent to, but not yet received by, the target. Messages sent but that are still in HOLD status can be removed by using the OPTION=HOLD. A participant invokes the UNDO function by passing a command string to the broker via the parameter string HAPI such as:

f=undo, opt=hold, conv-id='n'

If the value of the CONV_ID field is "n," all messages in the queue sent to the CONV_ID and not yet received are deleted. The conversation is not deleted. If the value of the OPTION field is "HOLD," all messages currently in HOLD for the CONV_ID are deleted.

The broker's processing of the UNDO function is illustrated in pseudocode form in Table 33, below.

TABLE 33

UNDO

Find source PCB
Inhibit source PCB
Find CCB
Inhibit CCB
Find partner CCB
Lock partner CCB
If EOC = Y
   Return
If Option = HOLD
   NHM = O
If Option = REST
   NM = O
If Option = ALL
   NM = O
   NHM = O
Modify pointers
Free messages
Unlock partner CCB
Uninhibit CCB
Uninhibit PCB B. Administrator Functions The broker does not require a specialized or dedicated administrator, but it does provide some administrator functions to allow increased control over the setting up and operating of the client/server environment. Additionally, administrator functions can be used to change the environment dynamically to meet changing conditions. Administrator functions include the following:

1. PAUSE

This function is used to stop client/server processing temporarily by interrupting the services supplied. The participant receives no new request or response on the queue, but can continue processing existing queue entries, depending on the setting of the OPTION field, which can have the following values:

| Value | Action |
|---|---|
| IMMED | The PAUSE has immediate effect, no more entries from the queue are received. |
| QUIESCE | Default value: Only existing entries are processed. Services are then suspended until the RESTART or DEREGISTER function is invoked. |

2. RESTART

The administrator can use this function to resume broker processing after a PAUSE. The queue status can optionally be refreshed from the Broker database. The following options are available for the OPTION field on the RESTART function:

| Value | Action |
| --- | --- |
| COLD | Refresh the queues from the database before resuming. |
| WARM | Default value: the queue status is not refreshed, and the Broker resumes processing. |

A participant may make a request for a service, or respond to a request for services to the broker for subsequent receive processing using the SEND. There are three different types of send function processing performed by the broker.

C. Operator Functions

Some of the administrator functions can be used by the operator if there is no administrator or if the administrator has authorized the use of the function under certain conditions by setting OPERATOR=YES in the attribute file. The operator functions and their associated fields are summarized in the following table.

| Function | Applicable Field Names |
| --- | --- |
| START | OPTION |
| STOP | OPTION |
| ABEND | OPTION |

1. START

The administrator sets the default conditions for starting the broker in the attribute file. This allows the operator to override the default. The following options are available for the OPTION field on the START function:

| Value | Action |
| --- | --- |
| COLD | The broker sets up the environment from values in the attribute file. Only reliable conversations will be restored. |
| WARM | Default value: the broker attempts to set up the environment from its last saved state (if one exists). If not, then a COLD start will be performed. |

2. STOP

The administrator sets the default conditions for stopping the broker in the attribute file—the operator can then override the default. The following options are available for the OPTION field on the STOP function:

| Value | Action |
| --- | --- |
| IMMED | Callers waiting for a reply are informed of the immediate shutdown. The broker attempts to save the stat. All calls for further services during the period of shutdown are rejected with an appropriate response. Upon completion, the broker terminates. |
| QUIESCE | Default value: All attempts to start NEW conversations are rejected with an appropriate reply. Existing conversations are allowed to continue and finish normally within a defined timeframe. If the time limit is exceeded for orderly closure, the broker reverts to OPTION = IMMED. |

3. ABEND

The broker will immediately abort regardless of the work in progress. A dump will be taken if OPTION=DUMP has been specified or the default setting in the attribute file indicates. This function must be authorized by the administrator (if one exists).

V. ATTENDANT BROKER FEATURES AND SERVICES

In addition to the client/server communications functions described above, the broker also provides the following features and services to clients and servers.

A. Inherent Broker Features

1. Message Queuing

In case the required server is not available, or too many requests are active at the same time, the broker maintains a request queue. This queue can be held on a selectable reliable media (such as a magnetic disc) for store and forward client requests, which is particularly important for asynchronous processing. This facility can be requested on registration and subsequently switched on and off dynamically. Requests are held pending server action. The queue can be held on a database to facilitate reliable "store and forward" applications. Multiple concurrent conversations between servers and clients is enabled. The size of an individual request queue can be controlled by the server (via the broker). The message queue permits reliable communications (as discussed below) if the server must be restarted. Client requests can also be processed by one of several like servers.

2. Buffering

Buffering is provided to provide checkpointing and recovery. Under some applications conditions, it allows better use of storage resources. Unwanted data can be discarded by the client.

B. Internal Broker Services

1. Directory

A range of directory services provide information on the availability and characteristics of servers. The directory includes the names of the server programs and their locations along with a detailed description of their functions and other parameters. As part of Directory services an Information service is provided. Clients and servers may acquire information about the distributed environment, such as the number of outstanding queue entries, available service or client/server attributes, the number of records buffered, and Conv_IDs for existing conversations. The broker may be run without a directory due to the built-in defaults and the broker's in-core tables (BAT), which have been initialized during the start-up procedure. As part of the directory services, a Naming service is provided by the broker. This service provides a match between the logical server identification given by the client and the real server address.

2. Accounting

Under normal operation, all communications between a client and a server are conducted via the broker. Thus, accounting data can be made available to a variety of user-selectable interfaces either platform dependent or platform-independent. Examples of such interfaces are Software A.G.'s REVIEW and IBM's SMF, or a straightforward serial file.

3. Security

The broker provides access to standard packages according to the platform to enable the administrator to restrict access by participants to facilities controlled by the broker. Access to servers may be restricted to particular clients, and registration of servers can be controlled.

4. Monitoring and Tracing

The broker can be controlled by a dedicated administrator or authorized users, including dynamic server reconfiguration, cancellation of clients/servers. A tracing facility is also provided for maintenance and debugging.

5. Translation

The administrator can use translation services by use of the TRANSLATION attribute in the attribute file. A choice can be made between one of the standard set supplied with the broker or a user-provided routine. Applications can be developed where client and server can communicate using different data formats provided a suitable translation routine is available. The broker will automatically invoke a translation routine if available for a particular application.

C. Implementation of Communication Types

The Service Broker provides for non-conversational or connectionless as well as conversational communications. Both types can be carried out across different platforms by clients/servers without specific knowledge of manufacturer's interfaces or transmission protocols and they are also to some extent shielded against communication breakdown within a timeframe determined by a defined 'time-out' value and by use of the WAIT field. In both cases, a server that is capable of processing multiple requests from different clients in parallel does so by using RECEIVE with CONV-ID='NEW' for each request. The server then uses the CONV-ID returned by the broker to reply to each request individually.

1. Non-Conversational (Connectionless) Communication

This type of communication is defined to be 1 request, 0 or 1 response.) The client issues a SEND with CONV-ID='NONE' and if a response is required specifies WAIT to be one of YES, MAX, or 'N'. If there is to be no reply, then the client continues and the broker will forward the message. If, however, the client opts to WAIT for a reply then the broker performs an implicit RECEIVE with a 'time-out' value dictated by the setting of the WAIT field. There can be only one reply in this mode.

The server obtains this request if there is an outstanding RECEIVE request already with the broker or by issuing a RECEIVE. The broker passes over the client request to the server along with a unique CONV-ID if a reply is required.

After processing the request the server replies by issuing a SEND with the CONV-ID previously given by the broker and this is given to the client as response and the entry deleted from the queue.

2. Conversational Communication

This type of communication is defined to be that the connection between client and server exists for more than 1 'SEND and RECEIVE' sequence.

The client initiates the conversation with a SEND specifying CONV-ID='NEW' and synchronous or asynchronous processing by use of the WAIT field.

The broker assigns a unique CONV-ID to the conversation which is returned to the client. The server gets the same CONV-ID later when the request is RECEIVED.

The conversation continues between client and server by use of the CONV-ID in subsequent SEND/RECEIVE sequences. The conversation can be Synchronous, Asynchronous or a combination depending on the values of the WAIT field that the client and server have specified individually.

The conversation is terminated by the client or server by use of the field OPTION='EOC' or by the function EOC or by a connection 'time-out' value specified by the Administrator being exceeded. Once OPTION="EOC" has been specified, the broker will not accept any more SEND requests for this CONV-ID and once the last queue entry has been RECEIVED (or a default time has expired) the connection is terminated.

3. Conferencing

The service broker is capable of supporting multiple client/server conversations where several registered clients/servers have access to the same set of CONV-ID's.

D. Adapters

Client/server components that have not been written in accordance with the LAPI can be integrated through "adapters." An adapter is a software module that, at run-time, dynamically maps the "foreign" communication into the LAPI. Using different adapters, the broker supports interoperability between programs that are otherwise unable to communicate with each other. For example, this feature allows the broker to mediate requests from a client program that runs on a workstation using DDE (Dynamic Data Exchange) for communication, and to refer these requests to an appropriate server in a UNIX environment that communicates in DCE/RPC.

Figure 8:
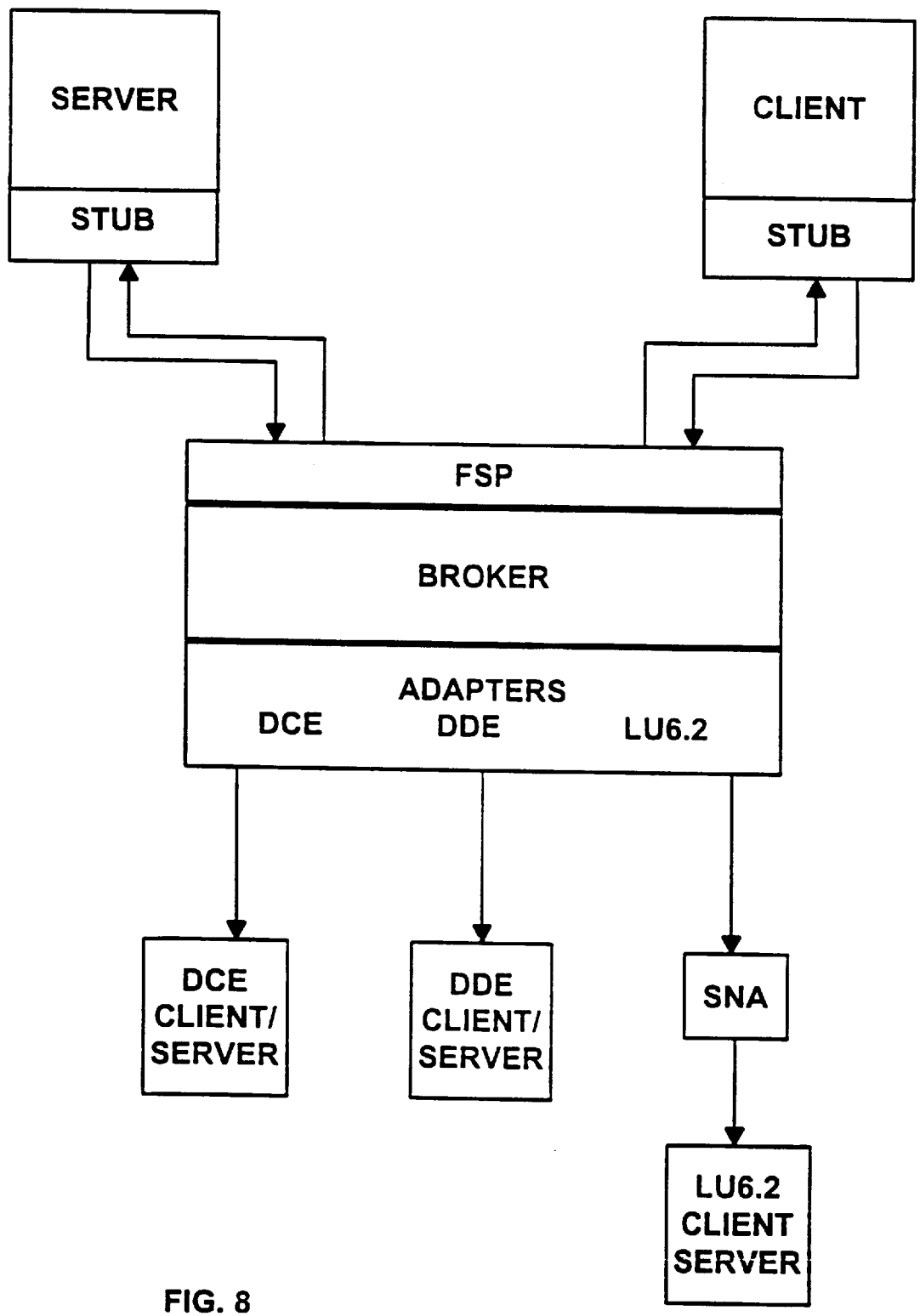
FIGS. 8 and 9 are block diagrams of adapters.
Figure 9:
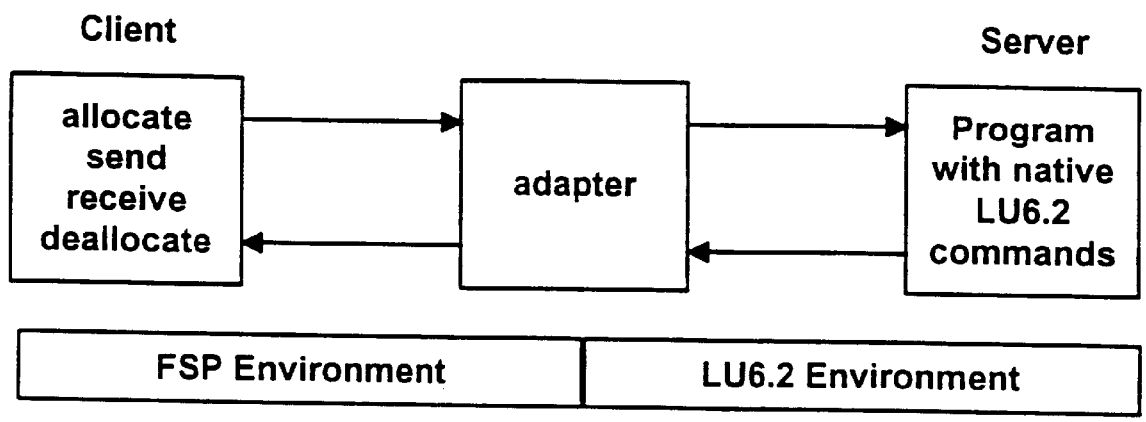

As shown in FIGS. 8 and 9, the adapter can be considered as a broker service that allows participants in the FSP environment to communicate with participants in non-FSP environments. For example, one adapter is for LU6.2. The adapter has fully implemented the LU6.2 verb set. Within the FSP environment, all LU6.2 commands are embedded in FSP. This allows FSP clients using LU6.2 verbs to communicate with native LU6.2 servers, and allows clients that follow the LU6.2 standard to gain access to FSP servers.

Applications written in a 3GL call the broker stub, which will recognize the LU6.2 commands in the parameter list and embed them into the FSP. Pseudo code for such a program in COBOL is given in Table 34, below.

TABLE 34 loop . . .

CALL "BROKER" USING . . . LU6.2 specific parameters loop . . .

Applications written in a 4GL can use a statement such as NATURAL's PROCESS statement to establish communication. The pseudocode example shown in Table 35, below, shows the PROCESS COMMUNICATE statement, where COMMUNICATE represents the service name for the adapter.

TABLE 35

DEFINE DATA

REPEAT

PROCESS COMMUNICATE FUNCTION = "receive"
 . . . LU6.2 spec.parameters . . .

END-REPEAT
END

VI. OTHER FEATURES

A. Reliable Operation

The broker has features that enable the development of reliable client/server applications. These features apply only to conversational applications. The broker allows the automatic securing of conversational queue entries on a variety of selectable non-volatile media under the administrator's control. This can be controlled on an individual application basis. To have a reliable application, a developer must be able to deal with client, server, and broker interruptions. They must be able to recover to a known point without data loss in all three cases since any one could happen during the course of a conversation.

Features that the application developer would need or normally use in recovering from such abends are listed in the following table.

| Field | Use |
|---|---|
| QUEUE-ACCESS | The administrator must set this field so that secured queue entries will reside for this application on a reliable media. |
| 'OPTION = LAST | This facilitates recovery to a known point - the LAST record. |
| CONV-ID = OLD | Enables reconnection to an existing conversation after an ABEND |
| CONV-ID | Each of its forms helps the broker to determine which conversations need to be reconnected/recovered. The CONV-ID is the primary means of identifying the conversation. |

There is no conversation "time out" for reliable conversations. Clients or servers who "time out" can reconnect to the conversation when they are in a position to do so. The broker allows for reliable conversations that will never be resumed to be terminated under strict control.

The use of broker features in the development of reliable applications is described in the Examples below.

B. Multiple and External Brokers

The broker concept allows for 0, 1, or several individual brokers to be active simultaneously on a single platform. In addition, brokers on different platforms can exchange information on available services. Customization and control can be exercised by the administrator to decide which services are offered on a "local" basis and which are available across platforms/brokers. The customer can decide whether or not a particular broker is allowed to communicate with other brokers or not.

Control can be through the attribute file or exercised dynamically by use of the administrator functions provided by the broker.

Figure 23:
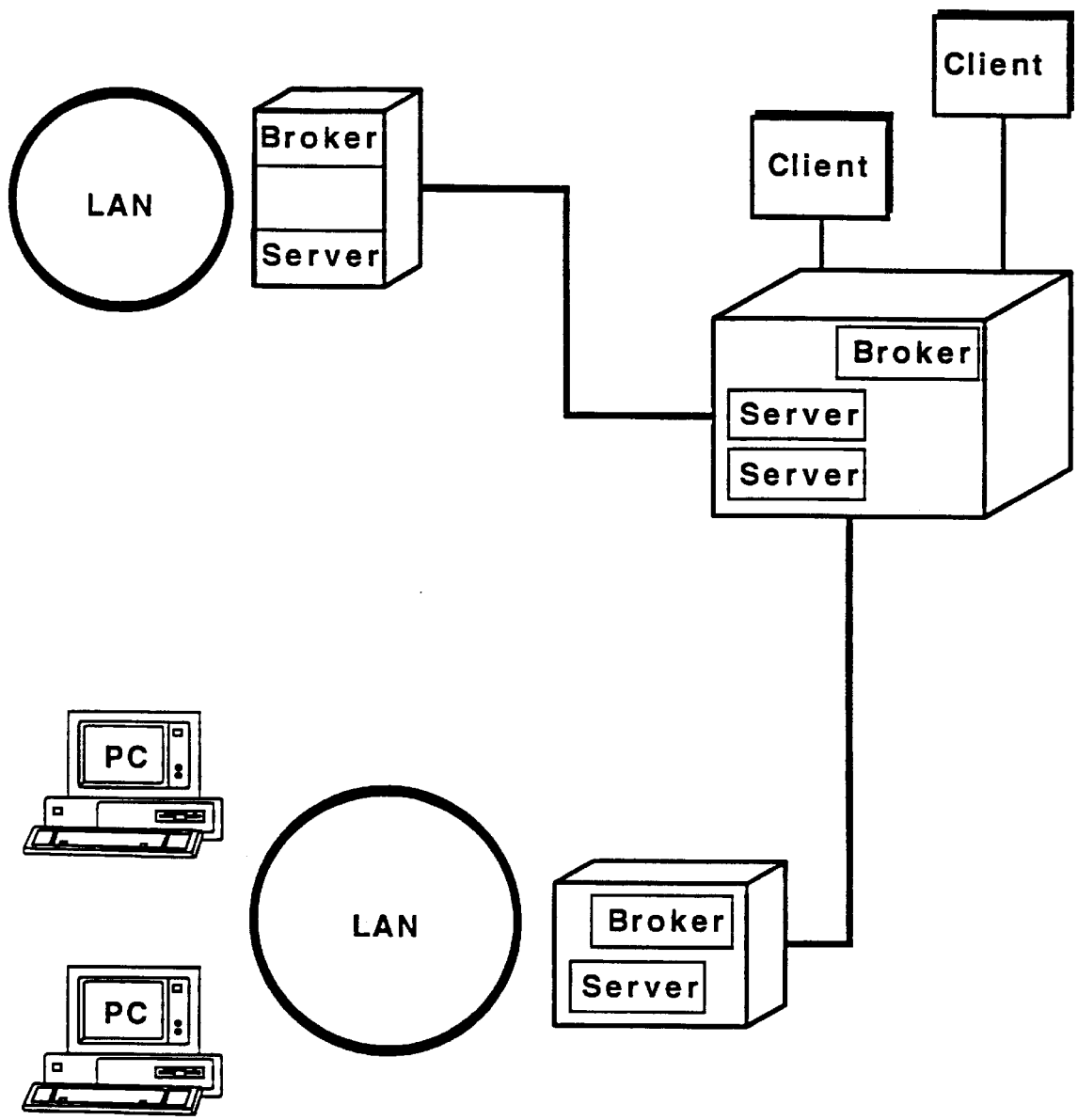
FIG. 23 is a schematic illustration of a heterogeneous environment with multiple brokers.

The functionality described above offers the customer a wide degree of flexibility in customization (e.g., new service testing, distribution, etc.) and provides for the optimal use of the number and different sizes of available platforms. The use of multiple brokers is illustrated in FIG. 23.

While several brokers can co-exist on the same platform, only one of these can be defined as the "Local" or default broker. All other brokers are "Remote" regardless of the platform on which they are active. External brokers (i.e., brokers that differ from the service broker configuration described herein. can also be enabled to communicate with the broker.

C. Service Dispatcher

OLTP environments such as COM-PLETE, CICS, IMS/DC, or TSO are able to run multiple servers in parallel. To activate the services that run in these environments, the broker employs the service dispatcher. The service dispatcher automatically establishes a conversational session with the broker when it is active. If a client request is passed over from the broker, the service dispatcher initiates a server transparently by starting either a batch job or a new process in an OLTP environment.

The service dispatcher also handles the communication with the broker. It receives the client's request for the appropriate services and passes them to the appropriate service routines in a form suitable for these routines. It also receives the processing output from the service routines and passes the data back to the broker, which in turn passes the data back to the respective clients.

Figure 7G:
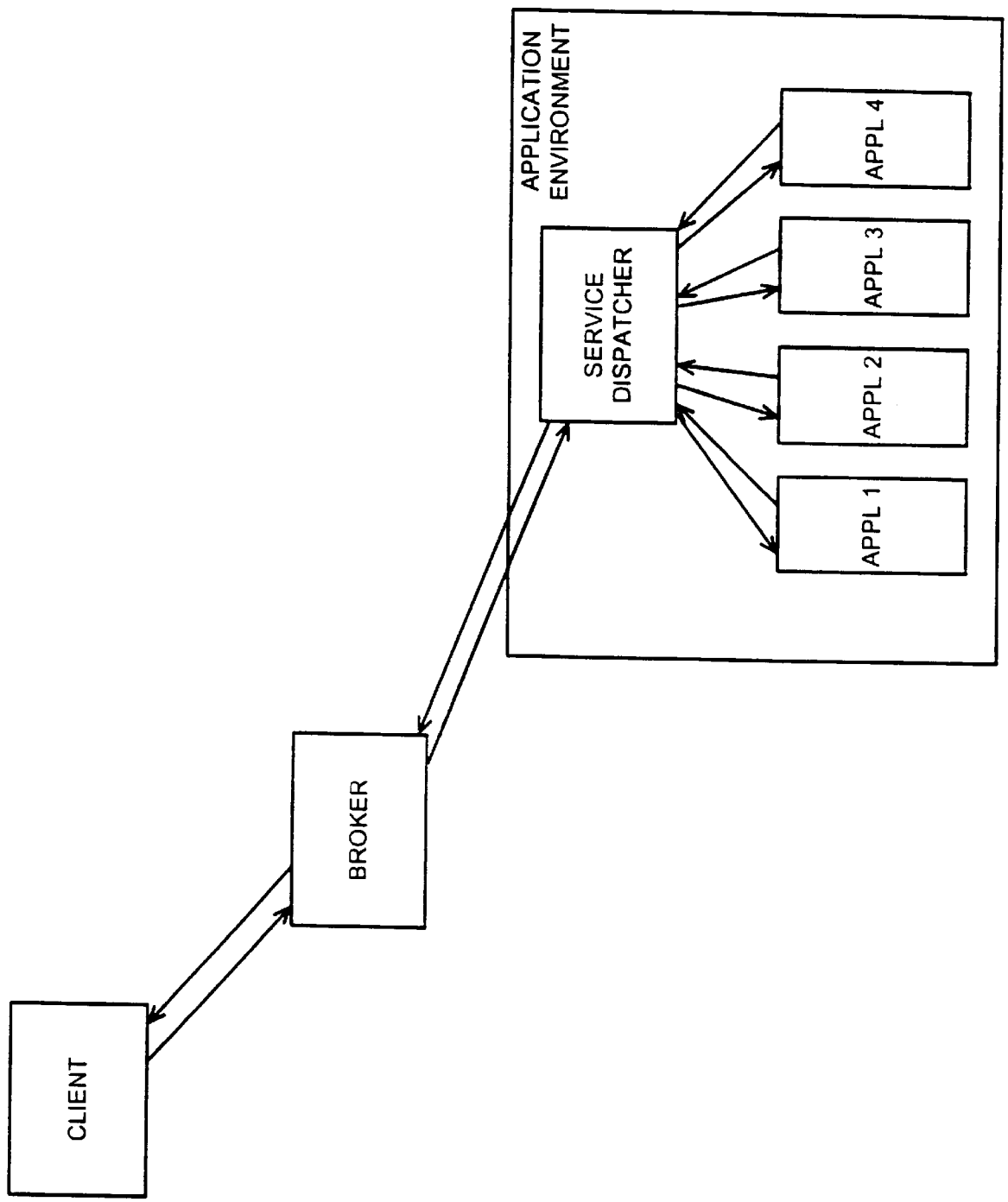

The relationship of the service dispatcher to the clients, the broker, and the applications is shown in FIG. 7G.

In COM-PLETE, the service dispatcher is integrated into the system. Other environments need service dispatchers—in those cases, they are implemented as non-terminal transactions.

D. Session Manager Gateway

The broker can include a gateway to a session manager, such as the NET-PASS product (commercially available from Software A.G.) to integrate existing IBM 3270-based applications into client/server processing without the need to modify those applications.

VII. EXAMPLES

The operation of the service broker is illustrated in the following examples. The following convention has been used in the illustrative figures:

| Symbol | Meaning |
|---|---|
| \| | Separates the actions of the Broker, Client, and Server |
| : | Indicates that processing is continuing. |
| 1234 | Indicates a typical unique Conv_id |
| (...) | Important options in use. The options are not necessarily explicitly specified - they may be defaults. |
| "ok" | Affirmative response. |
| "nodata" | Negative response. |
| "error" | Error response. |
| ----> | Indicates the direction of information transfer. |
| e.g. | Indicates typical actions. |
| <*n> | Label "n" |
| go to ----> | Indicates that sets of actions are typically repeated. |

A. Registration

1. Registering

Figure 10:
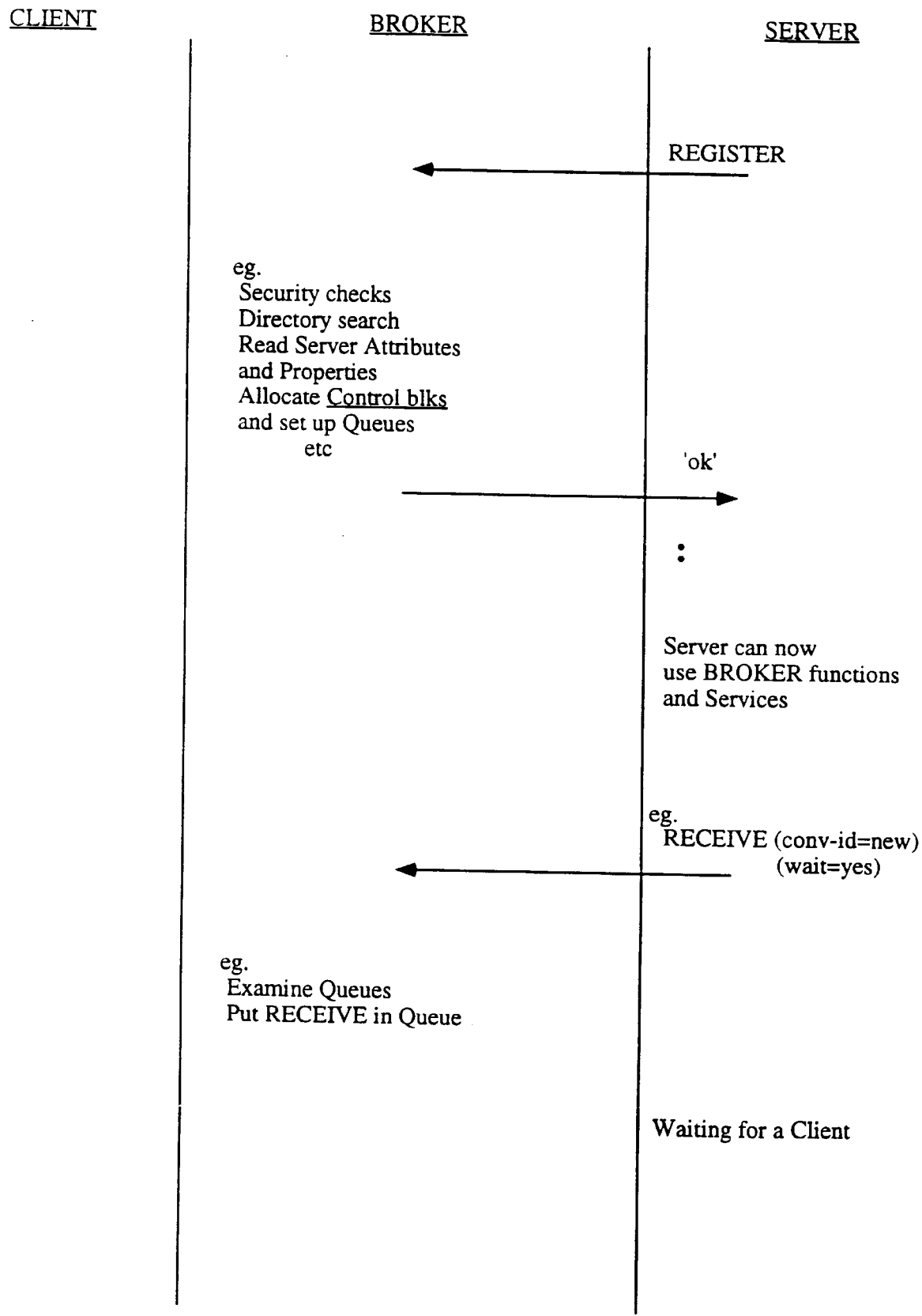
FIGS. 10 to 22 are schematic illustrations of examples of the operation of the service broker.

FIG. 10 illustrates some of the actions performed by the broker when processing the REGISTER function. The server registers with the broker prior to offering services to clients. Upon receipt of the register function, the broker performs security checks to determine if this server is allowed to register, and then makes a procedure call to the directory services to determine if this server (participant) has previously been registered. After either locating the server in the directory or registering the server in the directory, the broker then reads the server attributes and properties. The broker allocates the necessary PCB, SCB(s), queues, and timeout values for the calling participant, and the caller is marked "active." The caller is returned a positive response and may now offer services to clients via the broker.

After being registered, in order to begin receiving client requests via the broker, the server sends a "receive" to the broker to ask for any outstanding (queued) client requests. The broker also sets Conv_ID to "new" to receive new requests, and wait to "yes." The broker would then place "receive" in this server's queues and monitor the queues for any requests for this service.

2. Deregistering

Figure 11A:
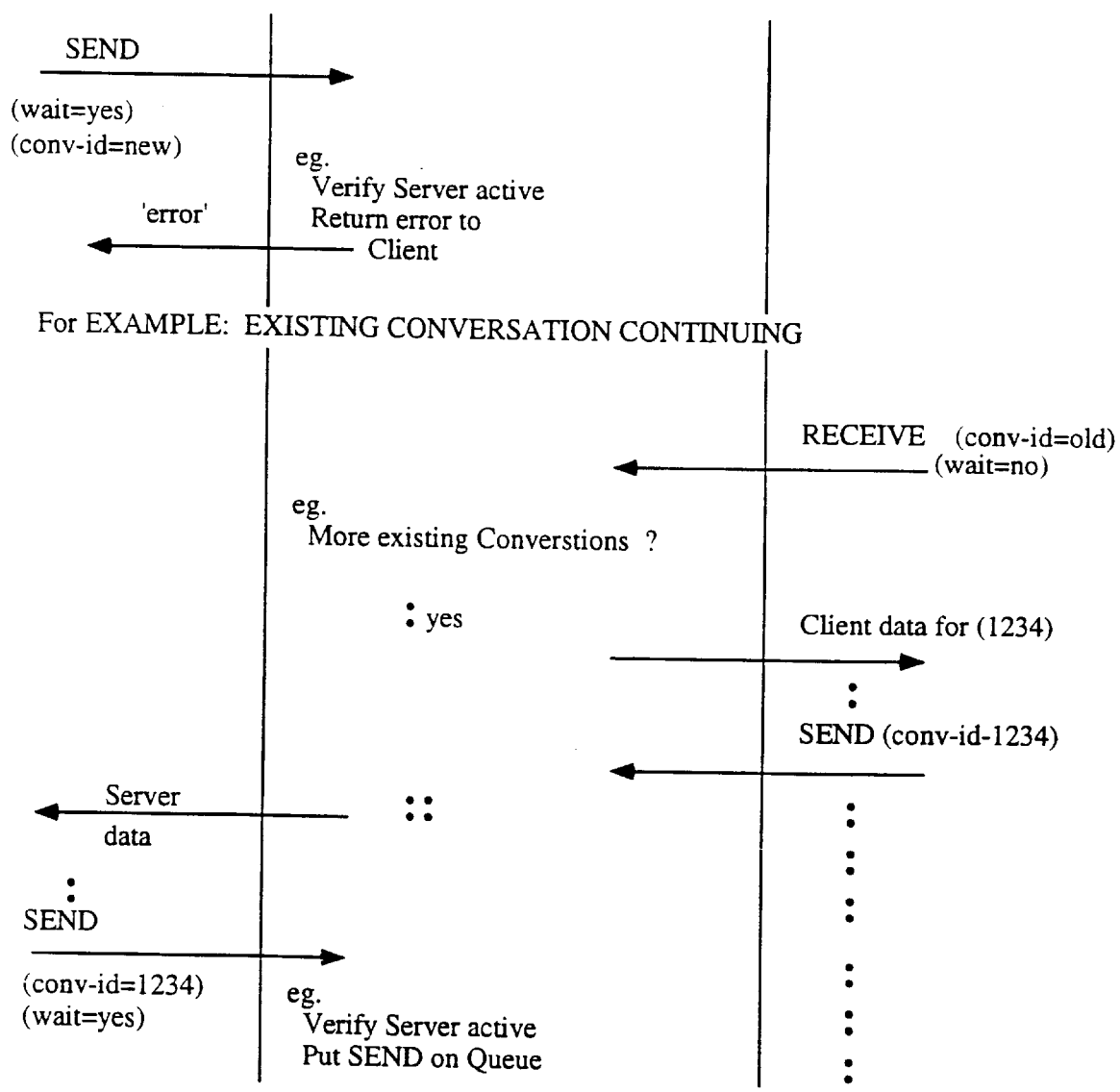
Figure 11B:
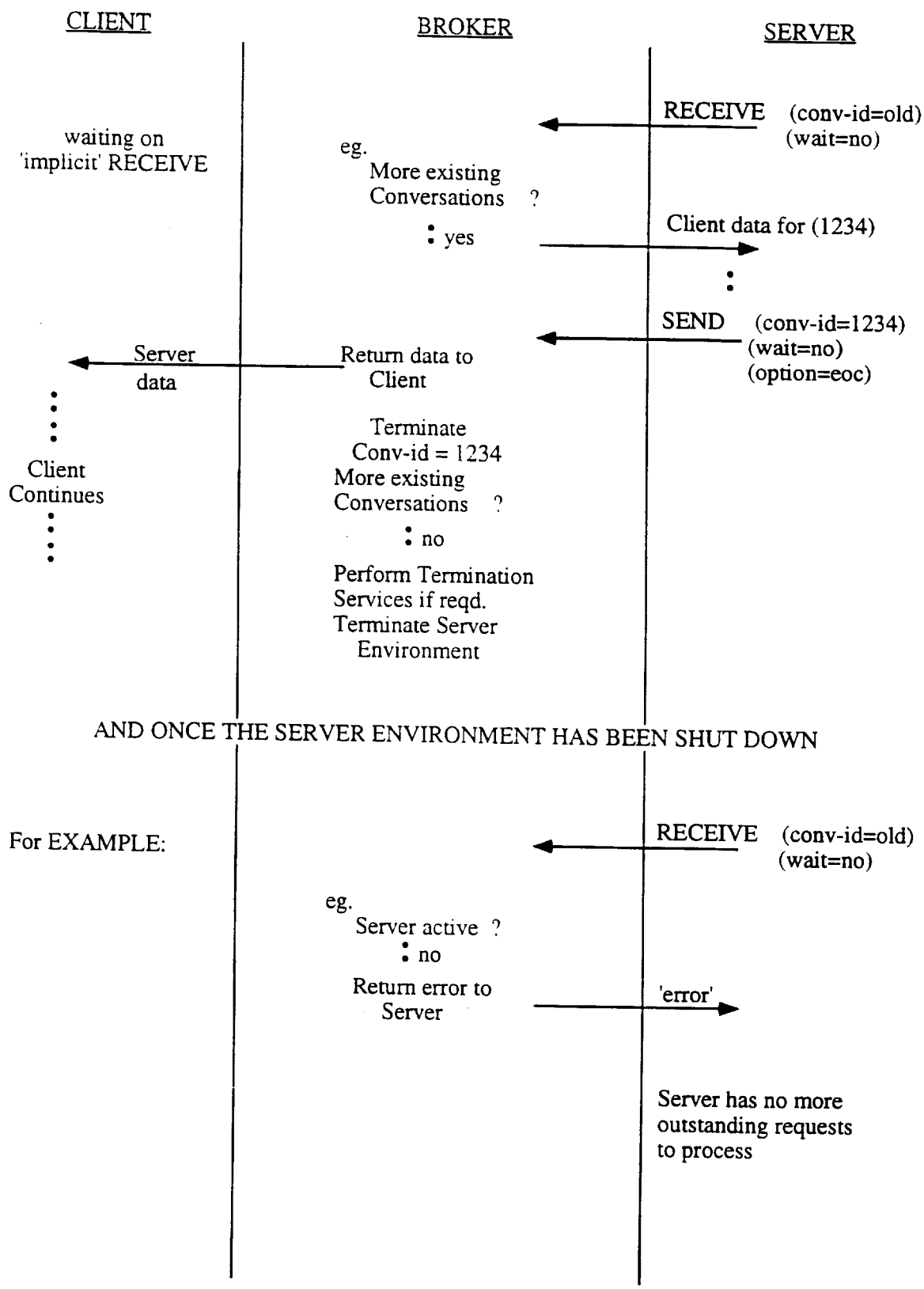

This example (illustrated in FIGS. 11A and 11B) shows a server in the process of performing an orderly shutdown. By using the Deregister function with Option=Quiesce, the server is refusing to accept any new service requests while continuing to complete requests in progress. The broker inhibits the starting of new conversations, returning an "error" response to any prospective clients. Existing conversations and requests are allowed to continue within a defined timeframe as can be seen in the second part of the example. Once all existing tasks have completed, the broker performs any Termination services that have been defined and then proceeds to shut down the server environment. Subsequent calls from both client and server are informed that the server is not active.

B. Non-conversational or Connectionless Request

1. Single Client Request Without Reply

Figure 12:
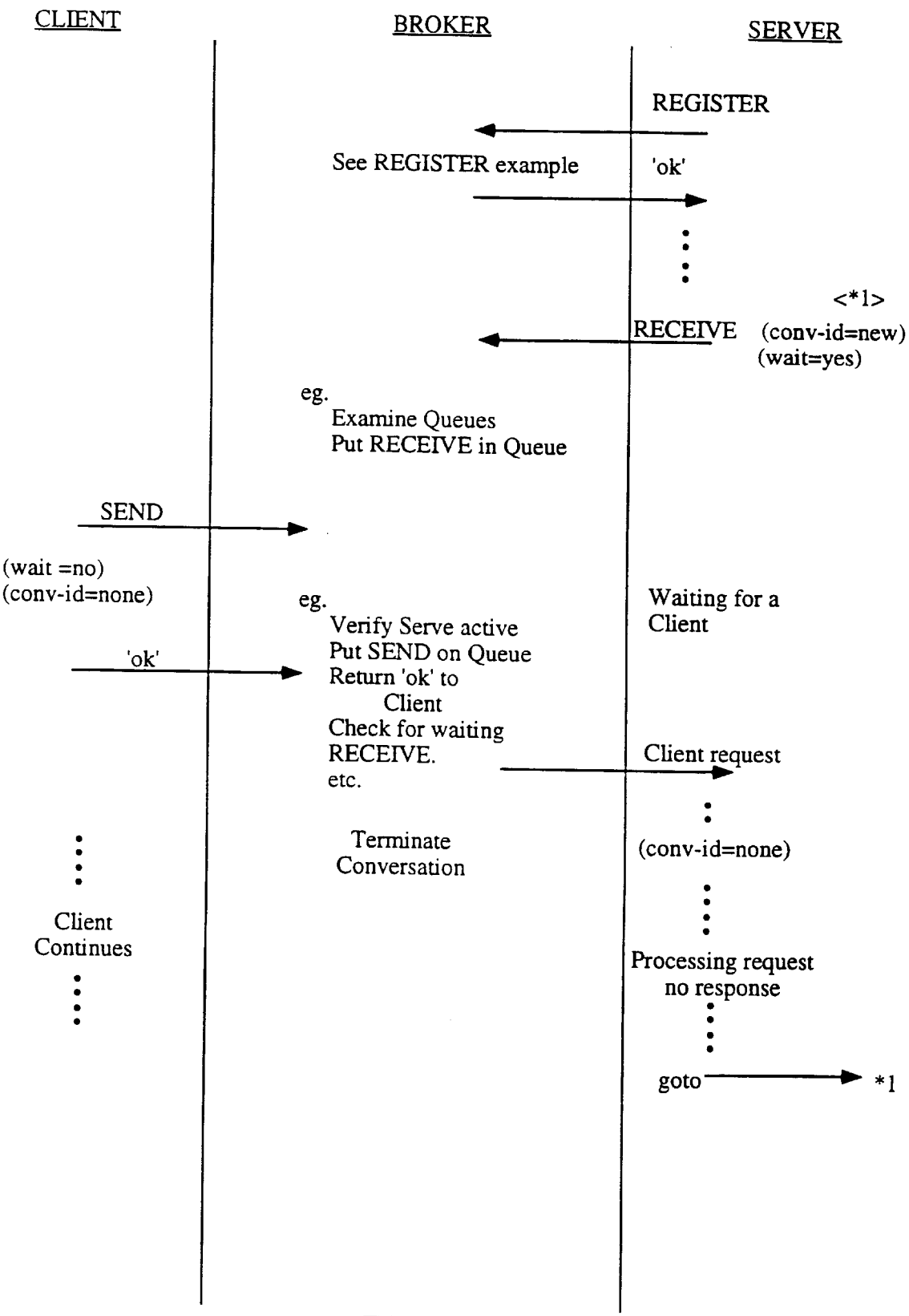

FIG. 12 shows a client sending a message or simple request that requires no reply. The server has previously registered and is currently waiting to Receive requests. There is no need to establish a conversation. There is very little overhead and delay using this form of non-conversational request, which can be useful in the development of efficient platform-independent applications that do not require immediate confirmation. The client can continue with other tasks following acceptance of the request by the broker. The request is forwarded by the broker with an indication (Conv_id=None) that no response is expected.

2. Single Client Request With Reply

Figure 13:
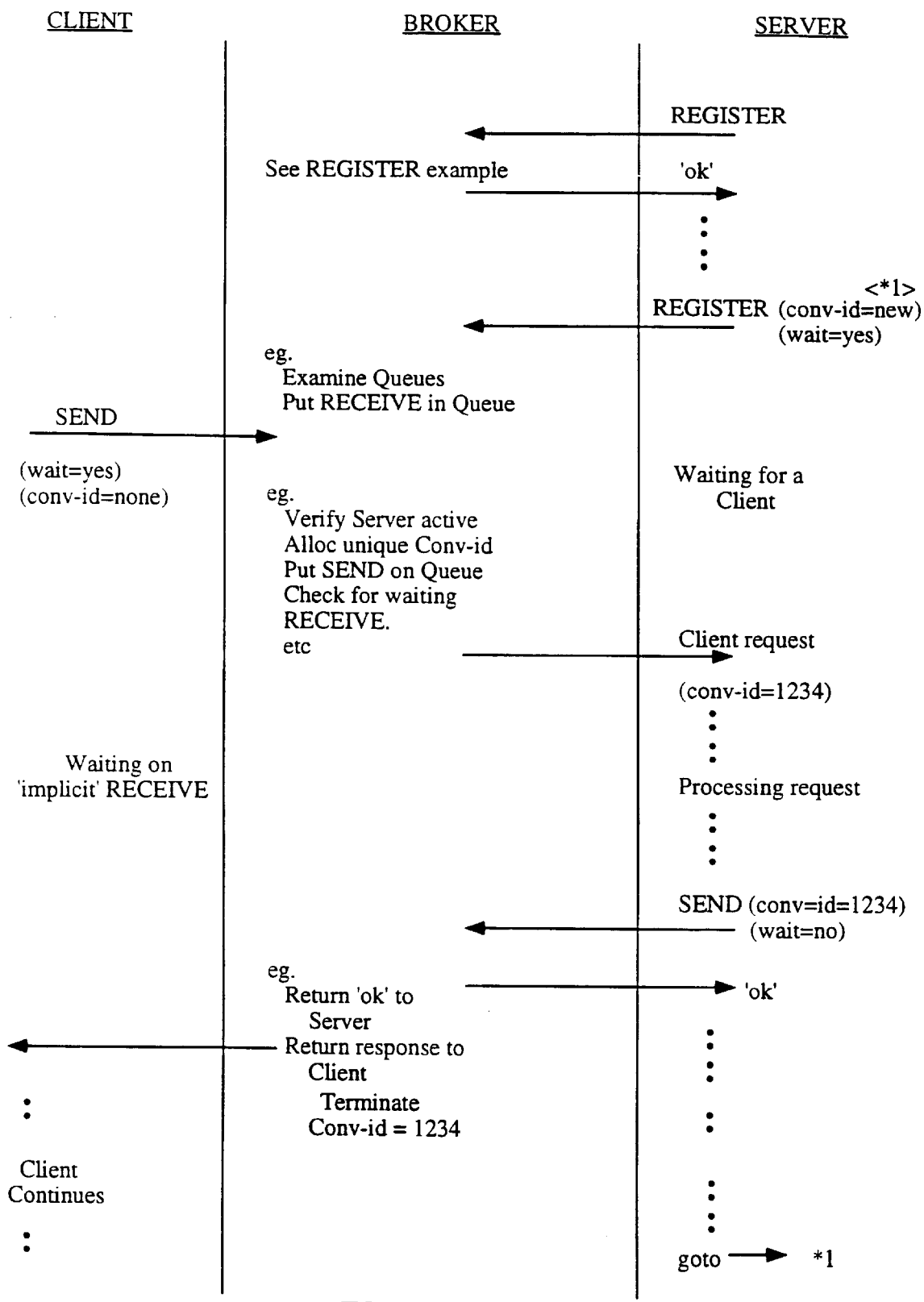

FIG. 13 shows a client sending a message or simple request that requires a single reply. The server has previously registered and is currently waiting to Receive requests. There is a need to establish a conversation (and a Conv_id) to keep track of the response from the server. The client is not interested in establishing a conversation and the unique Conv_id generated by the broker is not returned. The client has elected to wait for the response and the broker creates an "implicit" Receive on behalf of the client. Once the server has processed the request and returned a response to the broker with the relevant Conv_id, the broker returns this to the waiting client and terminates the "conversation." While in this example no Wait time has been specified, the broker has a default for the client that it had previously obtained from the Directory and which is controllable by the Administrator. Should this time be exceeded, the "conversation" will be prematurely terminated and both client and server will receive an appropriate "error" response.

3. Single Client Request, Asynchronous Server

Figure 14:
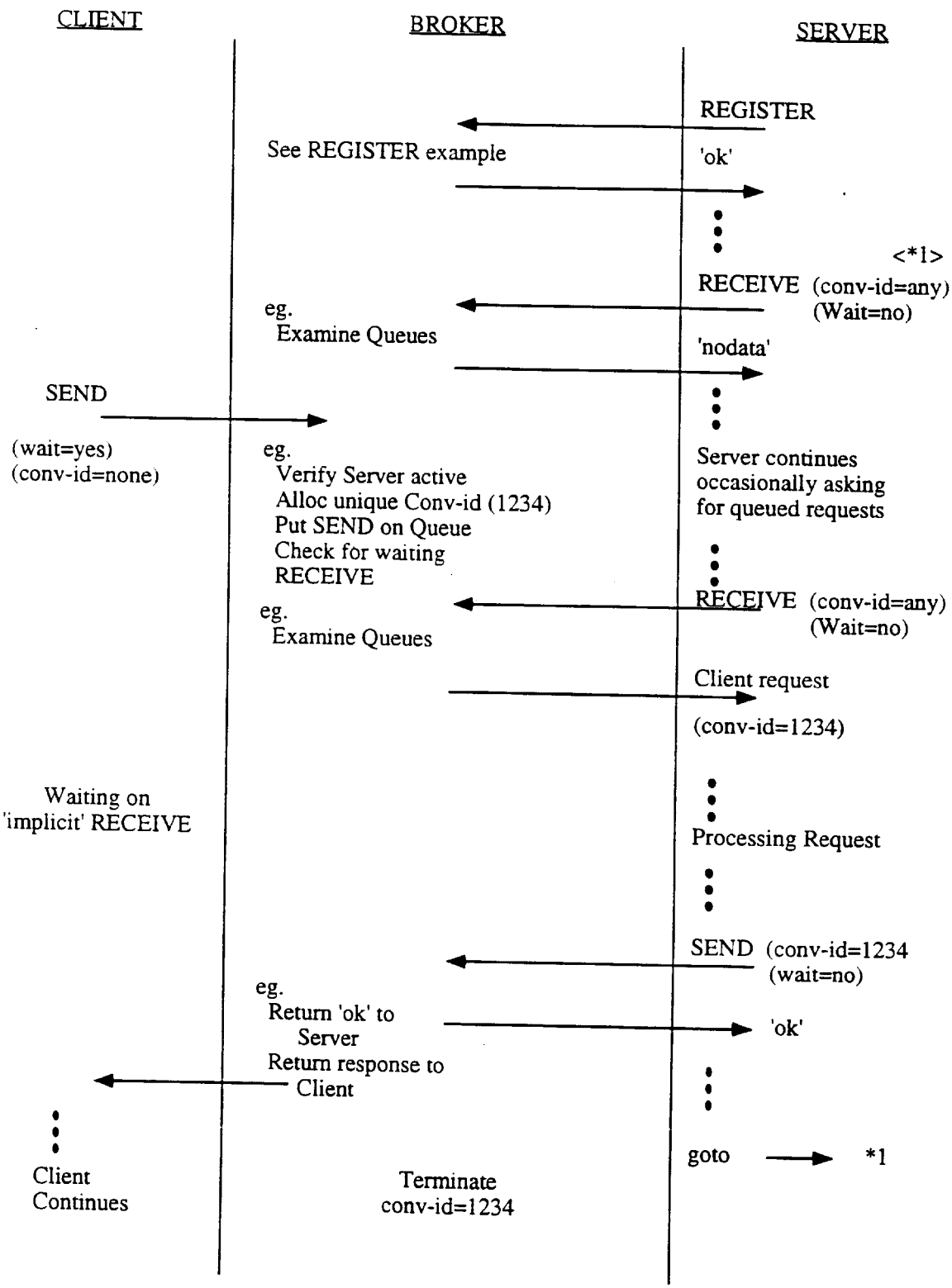

FIG. 14 shows a client sending a message or simple request for an asynchronous server. After the server uses the register function to register with the broker and the receive function to ask the broker for any outstanding (queued) client requests, the client uses the send function to request this service from the broker. The client has chosen to wait (synchronous processing) for a response or until timeout, and has set the Conv_ID to "none" to instruct the broker not to set up a conversation because only one request is being made. If the client was making more than one request and server response, conv_ID would be set to "new" by the client to establish a conversation (a dialogue between the client and server). This request is assigned the conv_ID "1234", to allow the broker and the server to keep track of this request, even though no conv_ID will be returned to the client with the response. Setting wait to "yes" invokes an implicit receive function to the broker. Therefore, the client does not use the receive function to ask the broker for all outstanding (queued) responses to its request.

Instead of waiting for the next client, the server "polls" the broker at regular intervals for queued requests. The broker returns a "nodata" or negative response if the server's queues have no pending requests.

4. Multiple Clients, Single Server with Reply

Figure 15A:
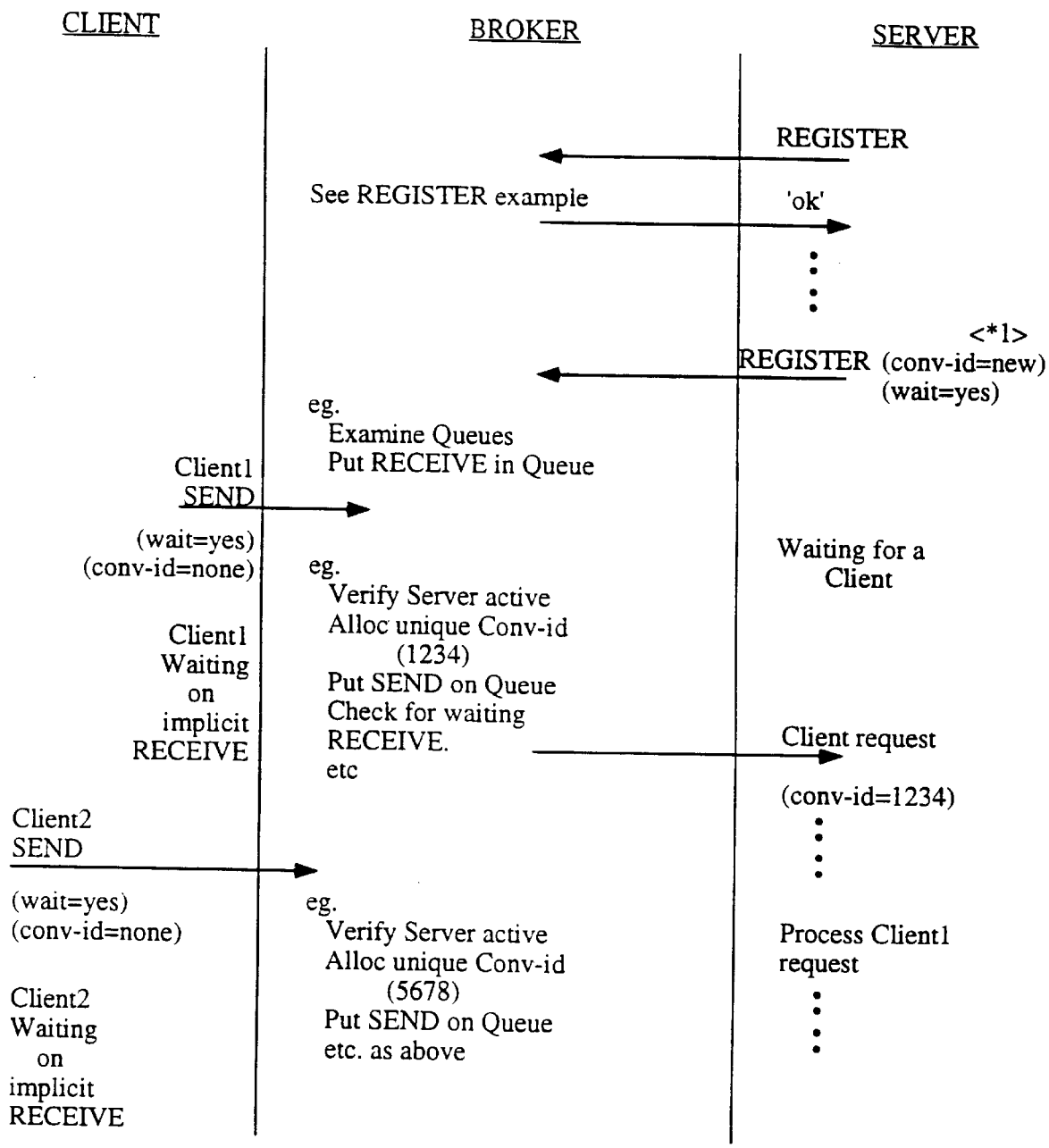
Figure 15B:
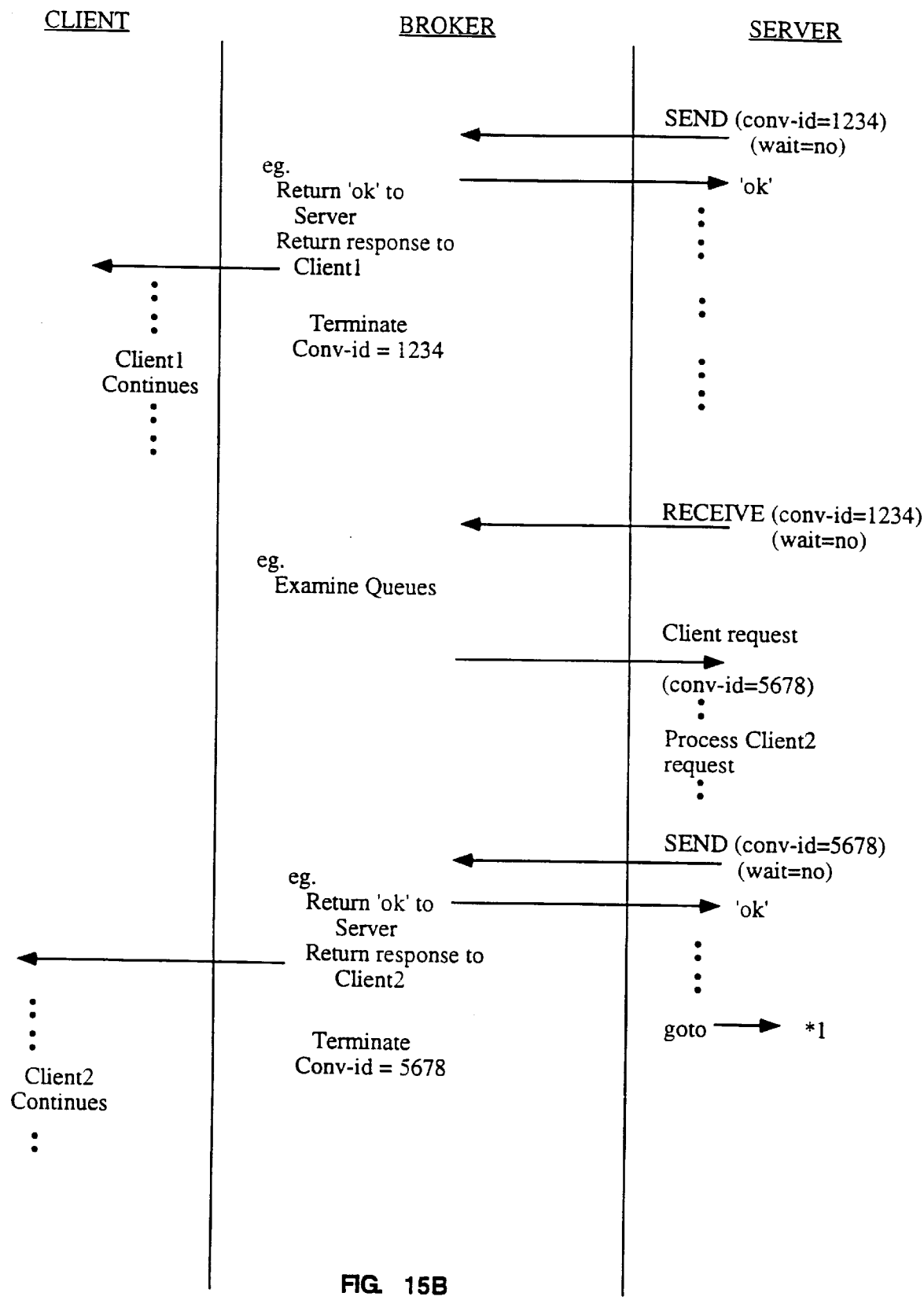

FIGS. 15A and 15B illustrate how a serial or synchronous server could deal with multiple clients using the broker. The example is similar to the previous ones in that both clients are conducting connectionless conversations. However, in this example the server could just as easily deal with a combination of non-conversational and conversational clients. The broker's use of unique Conv_id's allows it both to deep track of each request/response and to distinguish them.

C. Conversational Request

1. Single Client, Single Server

Figure 16A:
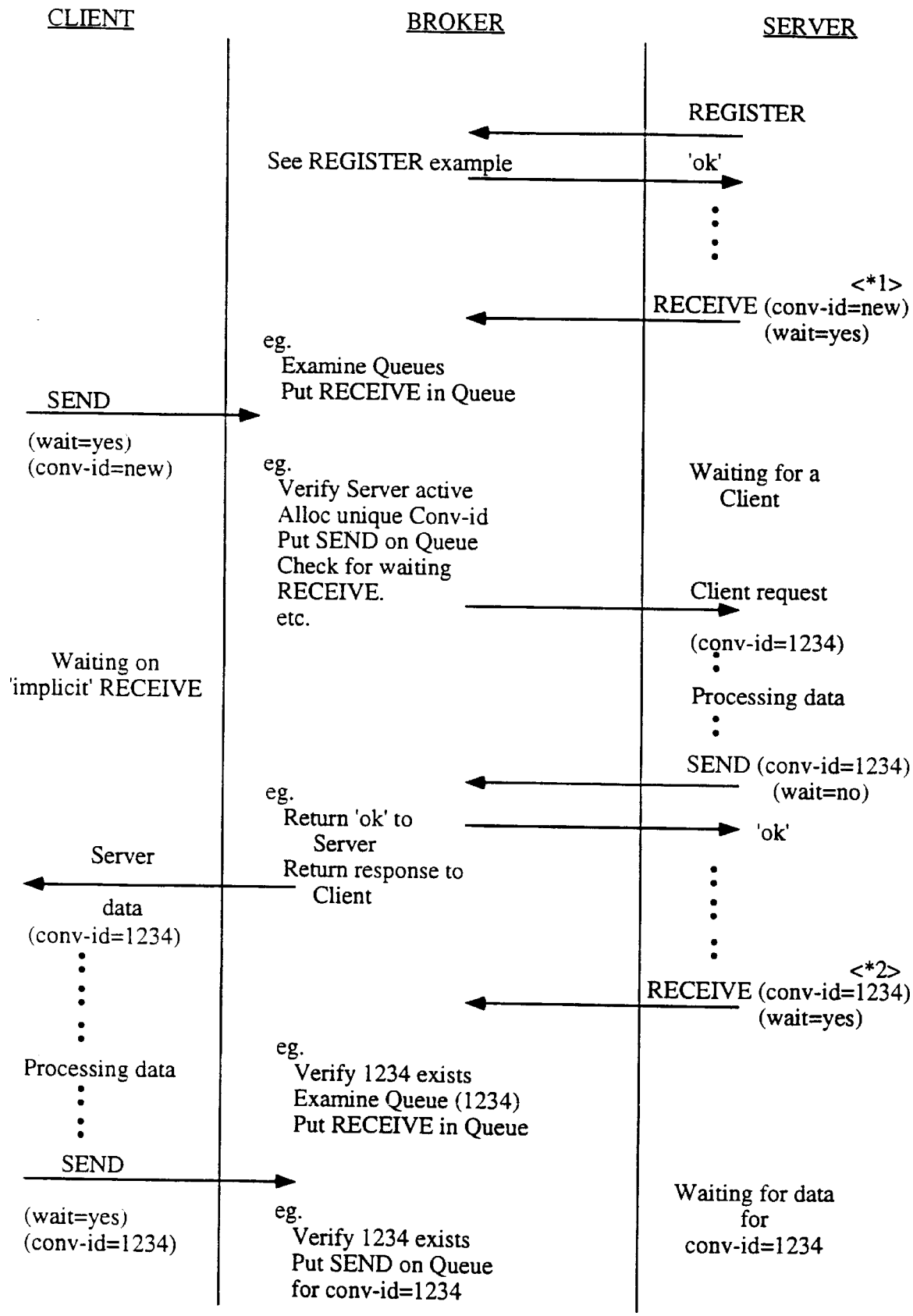
Figure 16B:
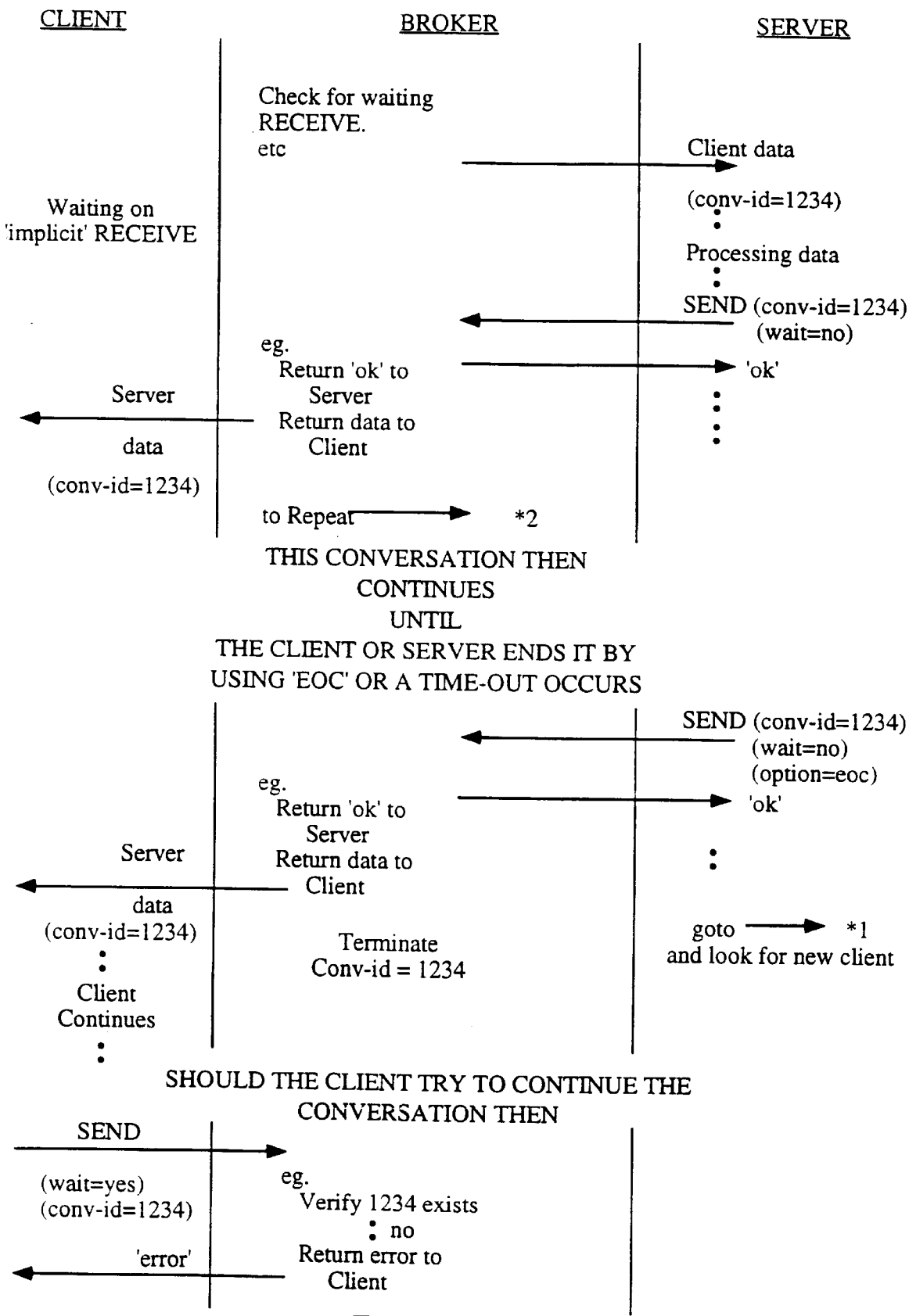

FIGS. 16A and 16B an example of a conversation conducted between a single client and a single server. Both have elected to conduct the conversation synchronously (i.e. wait for their replies). Neither has specified an explicit wait time value to be used for the time-out value, so the broker uses the default value. The client uses the send function and sets conv_ID to "new" to establish a conversation. The broker verifies that the server is active, allocates a unique conv_ID for this conversation, puts "send" on queue, and checks the server for "receive" to determine if the server has requested all outstanding requests. Because the server was waiting to receive outstanding requests, the broker then transfers the request to the server using the unique conv_ID.

The server processes the request and transfers a response back to the broker including the requested data using the SEND function. The broker then transfers the data received from the server to the client and the conversation continues until either one of the client or server elects to end it or a time-out occurs. In this example, the server ended the conversation by using the SEND function with Option= EOC, but the conversation could have been ended using the EOC function. After receiving the EOC indication, the broker transfers the data received from the server to the broker and terminates the conversation. Because the conversation has been terminated, any additional attempt to use that conv_ID to communicate will result in the broker generating an error back to the client.

2. Multiple Clients, Single Server with Reply

Figure 17A:
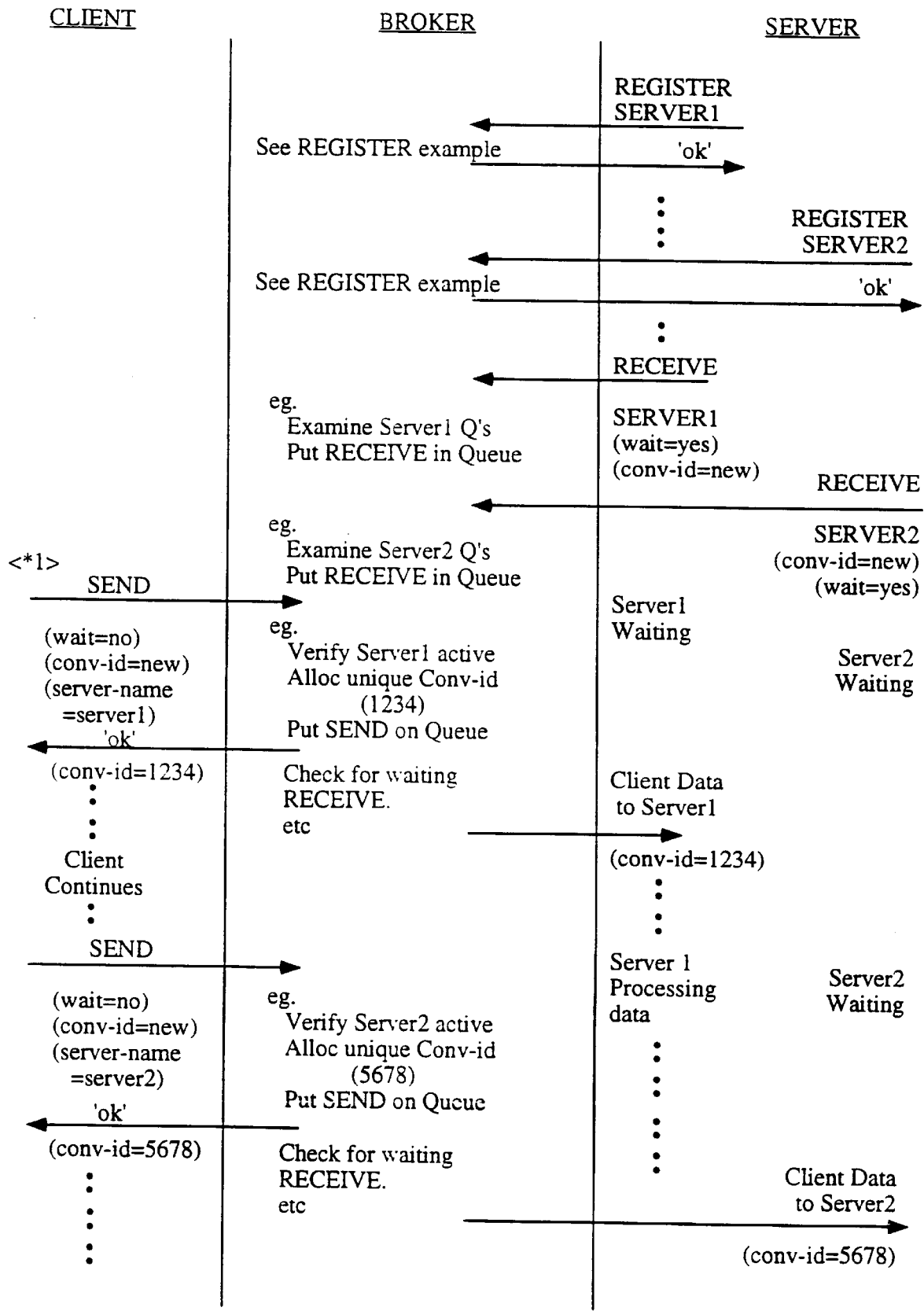
Figure 17B:
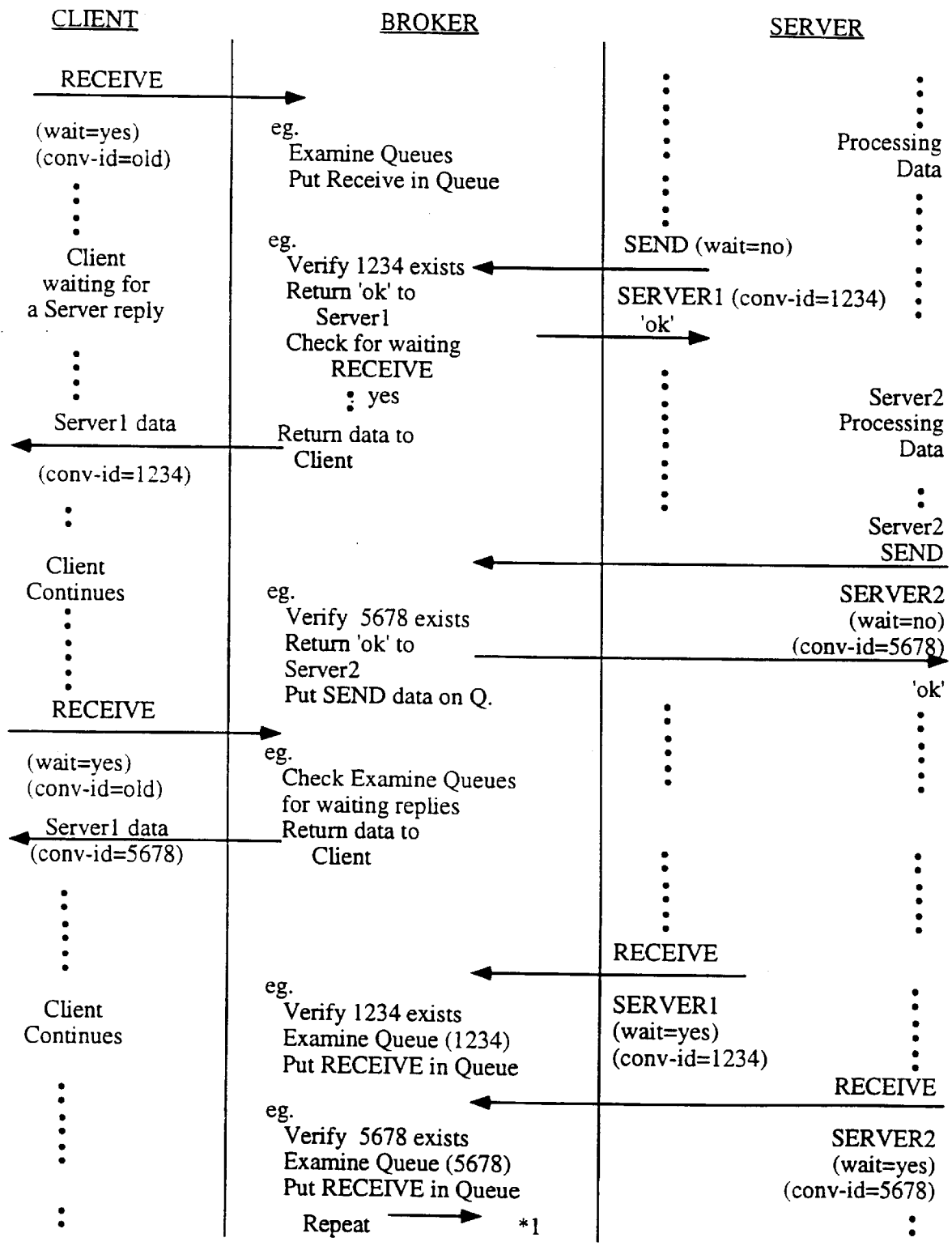

FIGS. 17A and 17B illustrate how a client can conduct conversations with multiple servers in parallel. The client begins by initiating conversations (Conv_id=New) with both servers a synchronously and then switches to wait on a Receive (with Conv_id=Old) for the first server that replies. As in the previous examples, unique Conv_id's have been generated to keep track of the separate conversations but in other respects the example proceeds as before.

D. Time Out

1. Client Time-Out Value Exceeded

Figure 18:
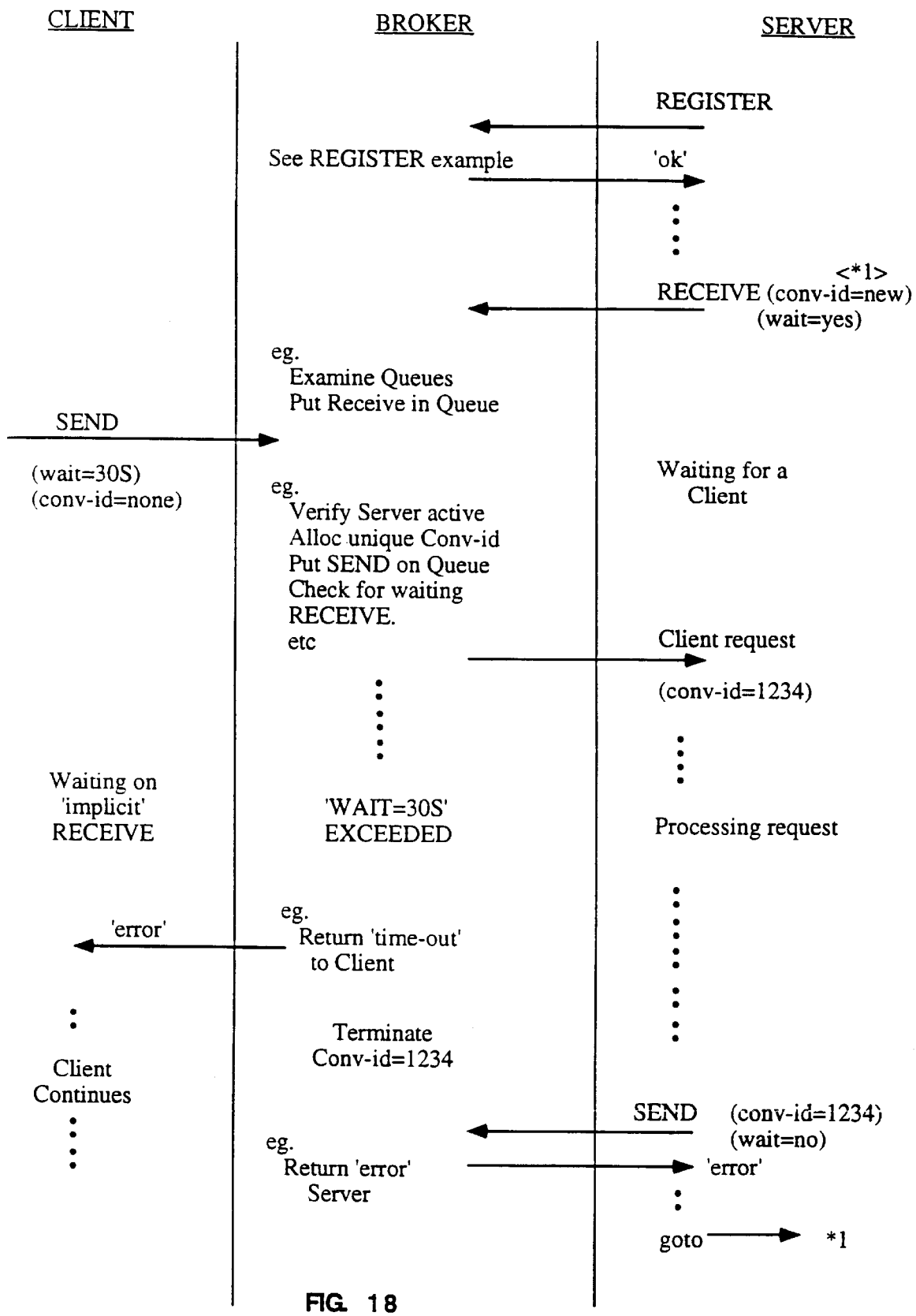

FIG. 18 illustrates the action taken by the broker when a WAIT value has been specified explicitly by the client and this value has been exceeded, causing a "time-out." In this case the client has specified that the response should come back from the server within 30 seconds. Once the 30 seconds have elapsed, the broker returns a "time-out" error response to the waiting client and, in this case, terminates the conversation. If and when the server replies to the request and appropriate "error" is returned to signal that the "conversation" no longer exists. In this case the response has not been passed to the client. The server can take appropriate action such as logging if needed.

2. Client Time-Out Value Exceeded

Figure 19:
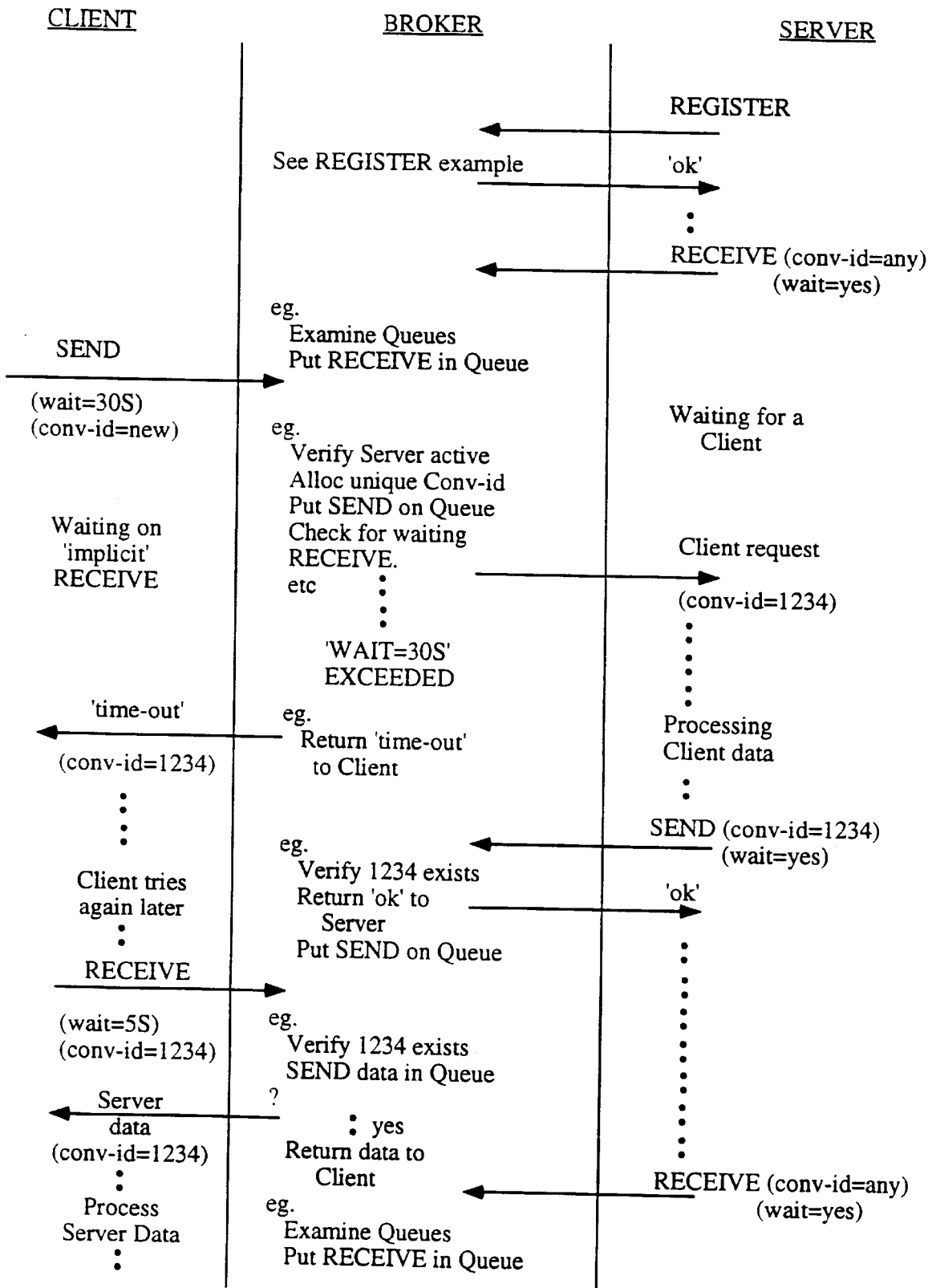

FIG. 19 illustrates how the client is able to re-connect to an established conversation in which a "time-out" has occurred by means of the returned Conv_id. This is possible since the conversation itself has not been "timed-out." The client WAIT time has been altered on the Receive to demonstrate that it can be dynamically changed.

E. Reliable Conversations

1. Client Recovery

Figure 20:
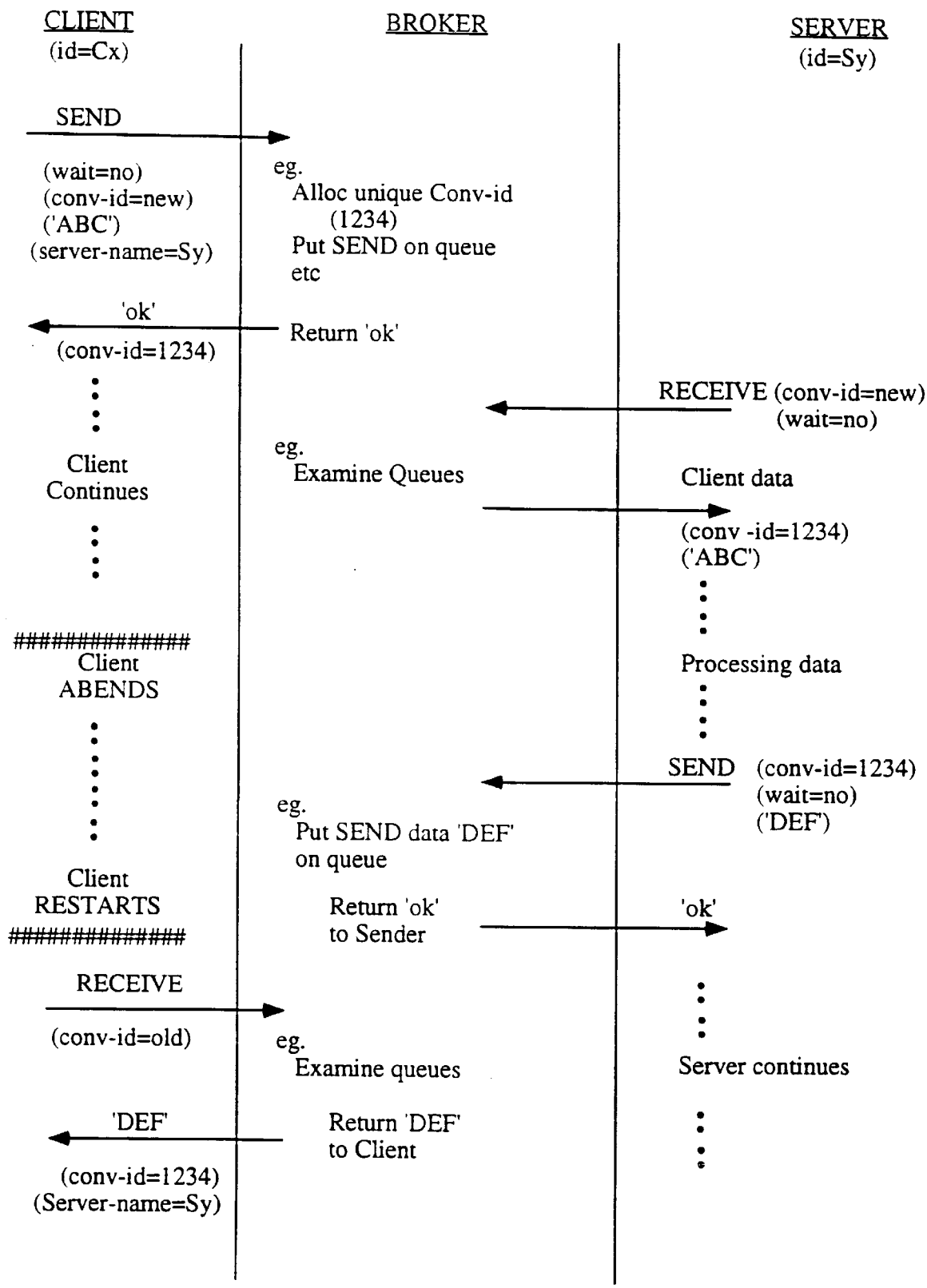

FIG. 20 illustrates how the broker features can be used on the client side of an application to recover to a defined state following a program interruption of the client.

By specifying CONV-ID=OLD on the Receive following the abend, the client can re-connect to a ongoing conversation. The entry from the server has been preserved in the queue and the client is able to continue without data being lost or skipped. The client would normally attempt this action on start-up since normally there is no knowledge of an abend. In the case of initial start-up the client wold receive an error response from the broker if there was no waiting conversational data.

2. Server Recovery

Figure 21:
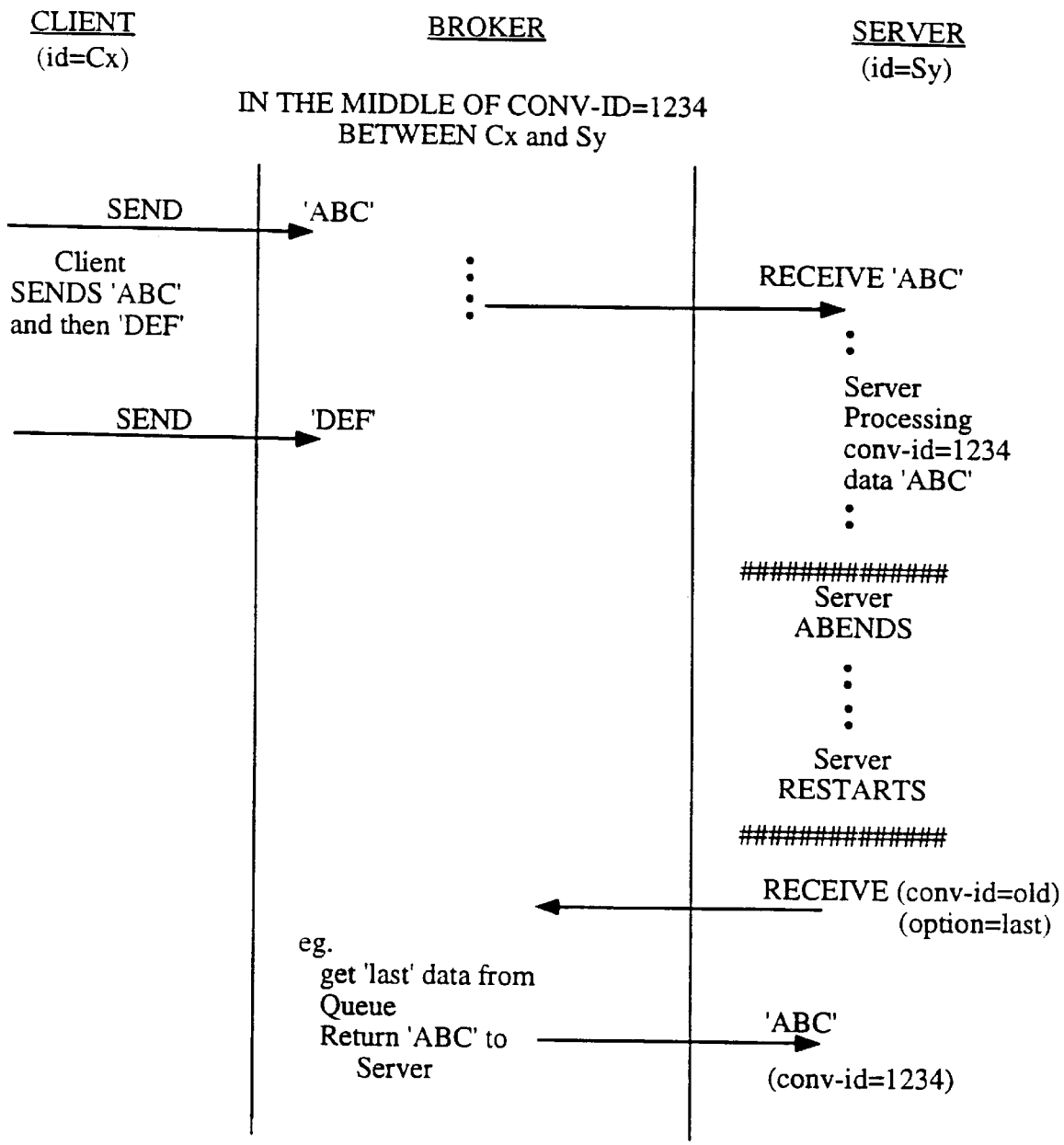

In the example illustrated in FIG. 21, the server recovers the situation before the interruption by use of RECEIVE with OPTION=LAST. No data that existed before the abend or subsequently arrived in the queues has been lost and the server restarts processing with the data that was being processed at the time of the failure.

The server would normally attempt this action on start-up since normally there is no knowledge of an abend. In the case of initial start-up the client wold receive an error response from the broker if there was no waiting conversational data. If the server handles multiple parallel conversations with clients. the recommended recover procedure would be first to use the INFORMATION services of the broker to identify the number and CONV-IDs of the conversations in progress at the break.

3. Broker Service Interruption

Figure 22:
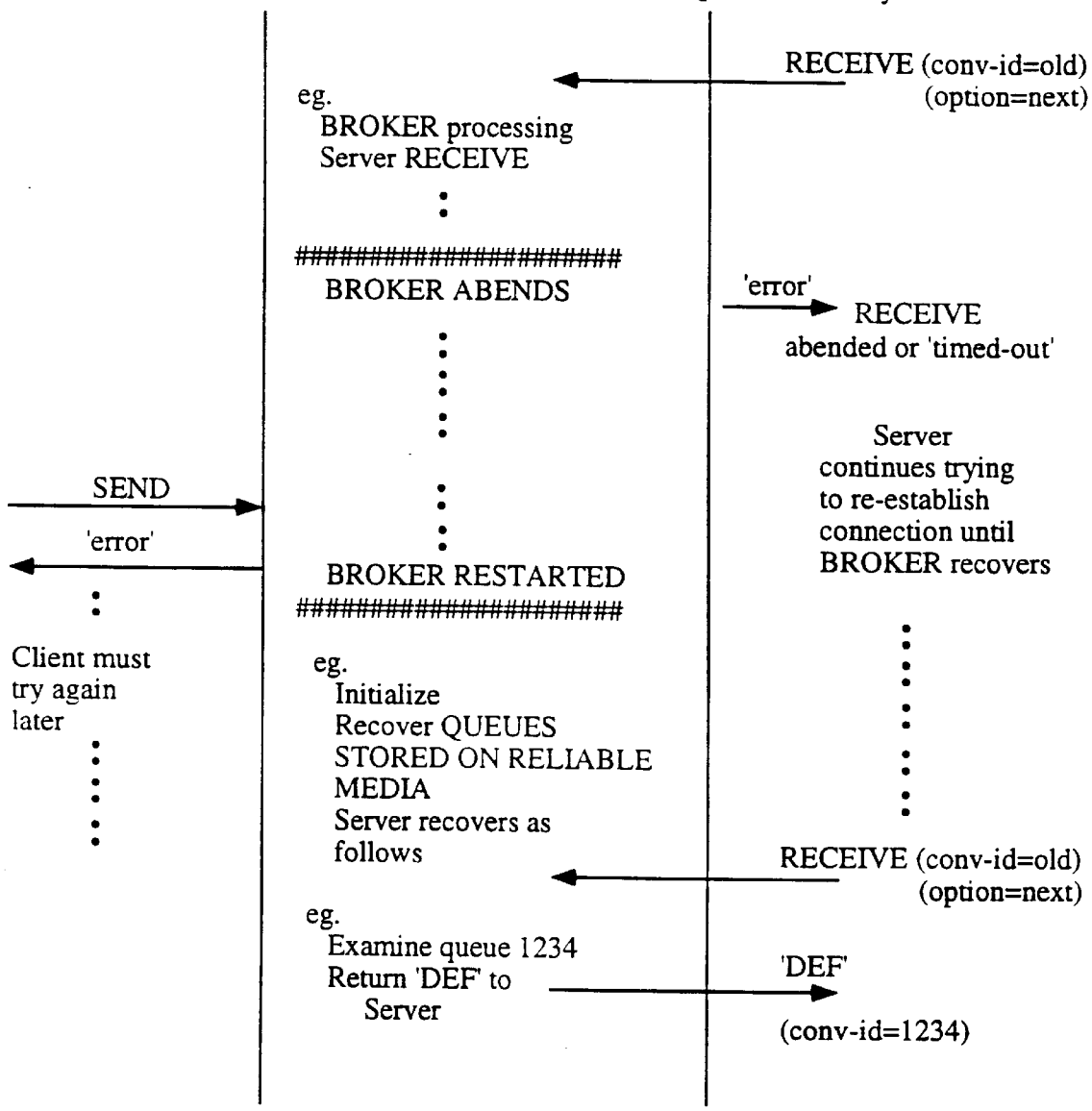

FIG. 22 illustrates the typical actions that would occur if the broker service is interrupted while existing reliable conversations are in progress. Clients and servers currently waiting on the broker at the time of the interruption are notified. Once the broker has been restarted with a start-up option other than COLD, reliable conversations are recovered to the state before the break. Calls for broker services during the interruption are rejected in "error." A subsequent call after broker services have been resumed by a client or server that had been conducting a reliable conversation and waiting at the time of the break allows the caller to re-establish the conversation at a known point without loss of data or place. Non-reliable conversations are only recovered in a defined state if the broker has been shut-down and restarted in an orderly fashion.

What is claimed is:

1. A brokered adaptor service on a service broker allowing a client application program executing on a first computer and using a function service protocol to access a server application program executing on a second computer using a foreign communication protocol, said brokered adaptor service comprising:

a client application program executing on a first computer, said client application program communicating a service request to a service broker in a function service protocol, said service request in said function service protocol embedding specific commands of a foreign protocol;

a service broker connected to said client application program through said function service protocol; and a brokered adaptor, said brokered adaptor connected between said service broker and a server application program on a second computer, said brokered adaptor communicating to said server application program with said foreign protocol, said service broker tracking and controlling the allocation of said brokered adaptor, said service broker receiving said service request from said client application program and determining from said embedded specific foreign protocol commands if the adaptor service provided by said brokered adaptor matches said foreign protocol, and, if so allocating said brokered adaptor to remove the function service protocol from said service request and communicate said specific commands of said foreign protocol to said server application program in said foreign protocol.

2. The brokered adaptor service of claim 1 wherein said service broker includes means for accumulating information about said service request for said adaptor service to calculate the total number of service requests processed by said service broker over a predetermined time span for said adaptor service.

3. The brokered adaptor service of claim 1 wherein said foreign protocol is LU6.2.

4. The brokered adapter of claim 1 wherein said foreign protocol is DCE/RPC.

5. The brokered adaptor service of claim 1 wherein said foreign protocol is DDE (Dynamic Data Exchange).

6. The brokered adaptor service of claim 1 wherein said foreign protocol supports an IBM 3270 application.

7. The brokered adaptor service of claim 1 further comprising:

a second brokered adaptor, said second brokered adaptor connected between said service broker and a second server application program on a third computer, said second brokered adaptor communicating to said second server application program with a second foreign protocol, said service broker tracking and controlling the allocation of said second brokered adaptor, said service broker receiving said service request from said client application program and determining from said embedded specific commands of a second foreign protocol if a second adaptor service provided by said second brokered adaptor matches said second foreign protocol, and, if so allocating said second brokered adaptor to remove said function service protocol from said service request and communicate said second specific commands of said second foreign protocol to said server application program through said second foreign protocol.

8. The brokered adaptor service of claim 1 wherein said service broker includes means for storing and forwarding said service request to provide asynchronous communication between said client application program and said server application program.

9. The brokered adaptor service of claim 1 wherein said service broker includes means for establishing a reliable communication session that can be recorded without loss of any messages upon interruption caused by termination of said client application program or said server application program of said service broker.

10. A method for dynamically connecting a client application program on a first computer with a server application program on a second computer using a service broker and a dynamically allocated adaptor program wherein said client application communicates a request for a service in a first communication protocol and wherein said server application program communicates using a second communication protocol, said method comprising the steps of:

generating a request for a service at a client application program on a first computer, said request for a service in a first communication protocol, said request for a service embedding a command in a syntax of a second communication protocol in said first communication protocol;

transmitting said request for a service in said first communication protocol from said first computer to a service broker;

detecting at said service broker said syntax of said second communication protocol embedded in said request for a service;

determining an appropriate adaptor program from said step of detecting;

allocating said adaptor program to remove said first communication protocol to extract said second communication protocol if said adaptor program is available at said service broker;

transmitting said command in said syntax of said second communication protocol from said service broker to a server application program.

11. The method of claim 10 wherein said first communication protocol is a function service protocol and said second communication protocol is LU6.2.

12. The method of claim 10 wherein said first communication protocol is a function service protocol and said second communication protocol is DDE (Dynamic Data Exchange).

13. The method of claim 10 comprising further the steps of:

storing said request for a service at said service broker; and forwarding said request for a service to said server application program to provide asynchronous communication between said client application program and said server application program.

\* \* \* \* \*